United States Patent [19]
Jain et al.

[11] Patent Number: 5,805,577
[45] Date of Patent: Sep. 8, 1998

[54] ERICA: EXPLICIT RATE INDICATION FOR CONGESTION AVOIDANCE IN ATM NETWORKS

[76] Inventors: Raj Jain, 4591 Lanercost Way, Upper Arlington, Ohio 43220; Rohit Goyal, 1170 Chambers Rd. Apt. 4C, Columbus, Ohio 43212; Shiv Kalyanaraman, Dept. of CIS, Ohio State University, Columbus, Ohio 43210-1277; Ram Viswanathan, 14557 36th St., NE. Apt. J11, Bellevue, Wash. 98007; Sonia Fahmy, 101 Curl Dr. Apt. 772, Columbus, Ohio 43210

[21] Appl. No.: 683,871

[22] Filed: Jul. 19, 1996

[51] Int. Cl.⁶ .................................................. H04Q 11/04
[52] U.S. Cl. ........................... 370/234; 370/253; 370/465
[58] Field of Search ..................... 370/229, 230, 370/231, 232, 233, 234, 235, 236, 237, 238, 252, 253, 395, 397, 399, 468, 477, 465; 395/200.01, 200.02, 200.03, 200.11, 200.13

[56] References Cited

U.S. PATENT DOCUMENTS

| | | | |
|---|---|---|---|
| 5,280,470 | 1/1994 | Buhrke et al. | 370/232 |
| 5,367,523 | 11/1994 | Chang et al. | 370/235 |
| 5,457,687 | 10/1995 | Newman | 370/232 |
| 5,515,359 | 5/1996 | Zheng | 370/231 |
| 5,633,859 | 5/1997 | Jain et al. | 370/234 |
| 5,646,943 | 7/1997 | Elwalid | 370/230 |

*Primary Examiner*—Alpus H. Hsu
*Assistant Examiner*—Kwang Bin Yao
*Attorney, Agent, or Firm*—Fay, Sharpe, Beall, Fagan, Minnich & McKee

[57] ABSTRACT

A congestion avoidance scheme for data traffic in ATM networks. The scheme achieves both efficiency and fairness, and exhibits a fast transient response. A congestion avoidance scheme for ATM networks is described which has its optimal operating point at 100% utilization and a fixed, non-zero queue delay. The scheme improves control of end-to-end delay and keeps link utilization of expensive links high despite idle periods in the input load.

36 Claims, 47 Drawing Sheets

ERICA: EXPLICIT RATE INDICATION FOR CONGESTION AVOIDANCE IN ATM NETWORKS

This application claims the benefit of U.S. Provisional patent application Ser. No. 60/001,259 (filed Jul. 20, 1995) and U.S. Provisional patent application Ser. No. 60/001,286 (filed Jul. 20, 1995).

BACKGROUND OF THE INVENTION

This invention relates a method and apparatus for congestion management in computer and/or telecommunications networks using explicit rate indication for congestion avoidance in ATM networks—hereinafter referred to as "ERICA" or, in at least one alternative embodiment "ERICA+". More particularly, the invention is directed to a method (and apparatus) wherein switches provide feedback to data sources for controlling the rate at which the data sources send data to the switches.

While the invention is particularly directed to the art of data congestion management, and will thus be described with specific reference thereto, it will be appreciated that the invention may have usefulness in other fields and applications.

Asynchronous Transfer Mode (ATM) is a technology of choice for Broadband Integrated Services Digital Networks (B-ISDN). ATM is proposed to transport a wide variety of services, such as voice, video and data, in a seamless manner. In this mode, user information is transferred in a connection oriented fashion between communicating entities using fixed-size packets, known as ATM cells. ATM cells are fifty-three bytes long, consisting of a five byte header and a forty-eight byte information field, sometimes referred to as payload.

The ATM cells flow along predetermined paths called Virtual Channels (VCs). End systems must set up Constant Bit Rate (CBR), Variable Bit Rate (VBR), Available Bit Rate (ABR) or Unspecified Bit Rate (UBR) virtual channels (VCs) prior to transmitting information. Bandwidth is dynamically divided among the active VCs. Data traffic, which is highly "bursty" and does not have strict delay requirements, is usually transported by the ABR service. Supporting the ABR traffic class requires congestion management at intermediate switches in the network.

Congestion occurs whenever a total input rate exceeds the available link capacity (as illustrated below). Σ Input Rate>Available Link Capacity.

Congestion is a dynamic problem arising due to dynamic changes in the network load. Congestion control schemes need to provide feedback to the traffic sources asking them to readjust their loads. The ATM forum has adopted the rate-based paradigm as its standard for congestion control. In a rate-based scheme, source end systems send data at specific rates, and switches react to overload or underload conditions by asking sources to decrease or increase their rates respectively. The feedback in rate-based schemes can consist of a single bit indicating congestion, or an explicit rate (ER) at which the source must send data. The explicit rate (calculated by the switches) is indicated in special cells called Resource Management (RM) cells which are periodically sent by the source.

Objectives of Rate-Based Congestion Control

Congestion control is a difficult problem. A rate-based congestion control scheme attempts to achieve the objectives discussed below.

Efficiency and Minimal Delay

There is a tradeoff between the link utilization and an end-to-end delay. For low utilization, the queues at the switches are small and the delay is small. Once utilization is very high, queues grow, and cells are dropped when the queue size exceeds the available buffer size. The delay varies according to the load, but there is always a non-zero queueing delay. FIGS. 1A and 1B show throughput and delay for various loads in a network. The operating point which has a utilization close to 100% and moderate delays is called a knee of the delay-throughput curve. This is a good choice for an optimal operating point, and congestion control schemes which operate at this point are called congestion avoidance schemes. FIGS. 1C and 1D show link utilization and queue length as a function of time at the optimal operating point.

Fairness

Fairness and efficiency are measured by a criterion called a max-min allocation. Mathematically, this criterion is defined as follows. Given a configuration with n contending sources, suppose the ith source is allocated a bandwidth $x_i$. An allocation vector $\{x_1, x_2, \ldots, x_n\}$ will be feasible if all link load levels are less than or equal to 100%. The total number of possible vectors will then be infinite. Given any allocation vector, the source getting the least allocation may be called an "unhappiest source." It is necessary to find the feasible vector that gives the maximum allocation to the "unhappiest source." The number of such vectors is also infinite. Once the "unhappiest source" receives its maximum allocation, the problem remains only to the remaining n-1 sources operating on the network with reduced link capacities. Again, the "unhappiest source" among these n-1 sources is identified. The "unhappiest source" among these n-1 sources is given the maximum allocation. This process is repeated until all sources have been allocated the maximum allocation possible.

Good Steady State as Well as Transient Response Characteristics

Persistent sources always have cells to send. Steady state characteristics can be tested using these sources. These sources can consistently overload or underload the system and maintain a steady state. Schemes attempt to exhibit little oscillations during steady state conditions. Most real world traffic is bursty because most sources are transient. A transient response can be tested using transient sources which start after other sources have started and/or stop before the other sources have stopped. Good schemes must be able to respond rapidly to these load transients and achieve optimal performance.

Scalability to ATM Networks that Cover a Wide Range of Speeds, Distances, Number of Switches and Number of VCs The same scheme should perform well for Local Area Networks (LANS) as well as Wide Area Networks (WANs). LANs and WANs differ in their round-trip delay times. LANs have a round-trip delay of a few microseconds while WANs may have round-trip delays of a few milliseconds. The time taken for feedback to reach the source from a switch clearly depends on the distance between them. The scheme must exhibit an optimal behavior under these widely varying conditions without excessive need for parameter adjustment.

Adaptation to the presence of multiple traffic classes and variant demands

Both VBR and CBR traffic are delay sensitive and have a higher priority than ABR traffic. When VBR and CBR sources are active, the available ABR capacity may be reduced significantly. The ABR Capacity may be illustrated using the following equation:

ABR Capacity=Link Capacity-VBR Capacity-CBR Capacity

Moreover, ABR capacity is no longer fixed, but varies according to the VBR and CBR load. Congestion control schemes must respond quickly to dynamic changes in ABR capacity.

ABR congestion control also needs to perform optimally for high variance in the demand (bursty and greedy traffic, as well as bottlenecked sources).

Fair scheduling

Switches usually reserve a minimum bandwidth for each of the four classes: CBR, VBR, ABR and UBR. This prevents starvation of any class regardless of traffic of the higher priority classes. In addition, when the higher priority classes are not using their allocations, it is desirable to divide the excess capacity in a fair manner among competing classes.

Minimal complexity

The time for processing an RM cell and giving feedback does not depend upon the number of VCs. That is, the computational complexity of the algorithm should be order 1 ("O(1)"). Further, the minimum queueing and scheduling requirements of the scheme should be O(1) complexity to allow flexible implementations. In particular, mandatory per-VC queueing and scheduling are undesirable.

Robustness

The scheme should be insensitive to slight mistuning of parameters, loss of control messages. Load measurement errors should not bring down the network. The scheme should also isolate misbehaving users and protect other users from them.

The MIT and OSU Schemes

The so-called MIT scheme (A. Charny, D. D. Clark, R. Jain, "Congestion Control with Explicit Rate Indication," Proc. I.C.C., June 1995) and the so-called OSU scheme (U.S. Ser. No. 08/307,375 filed Sep. 16, 1994) were among the earliest explicit rate schemes to be considered by the ATM Forum.

The MIT Scheme calculates an advertised rate as follows:

Advertised Rate=(Capacity-ΣUnderloading VC's rate)/Number of Bottlenecked VCs

A VC is defined as bottlenecked if its rate is smaller than the calculated advertised rate. Because the advertised rate is a function of number of bottlenecked VC's, the advertised rate is recursive.

The explicit rate calculated at the switch is the minimum of the VC's rate and the advertised rate.

The MIT scheme has the following problems. First, it has an Order N ("O(N)") computation, that is, the amount of computation is proportional to the number of Vcs N. This is expensive to implement. Second, it uses declared rates of the sources alone and does not measure the input load at the switch. Hence, it suffers from inefficiency in cases when the source declares one rate and is bottlenecked at another rate. Since the switch does not measure the load, it assumes that the system is efficient when, in reality, it is not.

The OSU scheme overcomes some of the problems of the MIT scheme. It uses an order one ("O(1)") algorithm as opposed to the O(N) algorithm of the MIT scheme. Further, it uses measured rates as opposed to declared rates used in the MIT scheme. The key innovations of the OSU scheme are: 1) the use of input rate rather than the queue length to measure overload, 2) the use of a target utilization parameter to achieve congestion avoidance for rate-based control, 3) the use of a switch averaging interval to measure quantities to be used in the algorithm, and 4) rules for the correct operation of Backward Explicit Congestion Notification (BECN), some of which have become part of the standard or arts of other switch schemes.

Achieving Efficiency

To achieve efficiency, the OSU scheme simply asks the sources to divide their rates by the current load level, z. The maximum value of z among all the switches reaches the source. The idea behind this step is that, if all sources divide their rates by this factor in the current cycle (round trip), the bottleneck link (the link with the maximum utilization) will reach a load level of 1 in the next cycle. This statement is true if all the round trip times are equal and the sources get feedback at the same time (synchronous operation). Otherwise, the bottleneck moves towards a load level of 1 in every cycle, given that sources can use their allocations to send data.

Achieving Fairness

Observe that, though the bottleneck reaches a load level of 1, the allocation of the available bandwidth among contending sources may not be fair. This is because, for z=1, the switch does not ask sources to change their rates, even if the distribution of rates is unfair.

The first goal is to achieve efficient operation. Once the network is operating close to the target utilization (z=1), steps are taken to achieve fairness.

For fairness, the network manager declares a target utilization band (TUB), say, 90±9% or 81% to 99%. When the link utilization is in the TUB, the link is said to be operating efficiently. The TUB is henceforth expressed in the U(1±Δ) format, where U is the target utilization and Δ is the half-width of the TUB. For example, 90±9% is expressed as 90(1±0.1)%.

We first define a Fair share variable as:

$$\text{Fair share} = \frac{\text{Target Output Cell Rate}}{\text{Number of Active Sources}}$$

A source is said to be active if any cells from the source are seen at the switch during the current averaging interval. To achieve fairness, we treat the underloading and overloading sources differently. Underloading sources are those that are using bandwidth less than the fair share and overloading sources are those that are using more than the fair share.

Specifically, if the current load level is z, the underloading sources are treated as if the current load level is $z/(1+\Delta)$ and the overloading sources are treated as if the load level is $z/(1-\Delta)$.

This algorithm guarantees that the system converges towards fair operation. We also note that all the switch steps are O(1) with respect to the number of VCs.

However, the OSU scheme is not completely compatible with the ATM Forum standards, since it was developed while the standards were being formulated. The present scheme, or ERICA scheme, upgrades the OSU scheme, making its standards compatible, and uses the metrics (current load level (z), number of active sources) and concepts (target utilization, fair share, dividing source rates by z) in a more aggressive fashion to achieve the desired scheme goals.

ERICA differs from the OSU scheme in several aspects. First, the OSU scheme achieves efficiency and fairness in separate steps. It defines a Target Utilization Band (TUB) which represents efficient operation. When the system is outside the TUB, the OSU scheme simply attempts to bring it into the TUB, i.e., bring the system to efficient operation. After the system is inside the TUB, the OSU scheme improves fairness at each step. ERICA uses a new algorithm to improve efficiency and fairness simultaneously, i.e., at every step.

Second, the OSU scheme gives feedback in the forward direction, whereas ERICA gives feedback in the reverse direction. The latter technique allows feedback to be delivered faster to the sources.

Third, the OSU scheme requires the source and switch measurement intervals to be co-related. The ERICA scheme does not require the co-relation of source and switch intervals because it gives exactly one feedback in every switch interval irrespective of the source measurement interval.

Fourth, the OSU scheme requires the sources to send RM cells at fixed time intervals. ERICA allows RM cells to be sent after a fixed count of data cells as required by the ATM Forum standards.

Fifth, ERICA has several other innovations which allow the network to efficiently support bursty input traffic even though the ABR capacity may be highly variable.

The switches indicate their feedback in the RM cells which travel back to the source.

SUMMARY OF THE INVENTION

It is an object of the present invention to provide a method (and apparatus) for congestion management in a computer network.

It is a further object of the present invention to provide congestion avoidance in ATM networks using explicit rate indication.

It is a still further object of the present invention to provide a method (and apparatus) wherein switches provide feedback to data sources for controlling the rate at which the data sources send data to the switches.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope for the invention will become apparent to those skilled in the art.

DESCRIPTION OF THE DRAWINGS

The present invention exists in the construction, arrangement, and combination of the various parts of the device and method herein, whereby the objects contemplated are attained as hereinafter more fully set forth, specifically pointed out in the claims, and illustrated in the accompanying drawings in which:

FIG. 32A is a graphical representation of the transmitted cell rate for the behavior of ERICA on a WAN where the VBR source was active for alternating periods of 1 ms with 1 ms inactive periods in between;

FIG. 32B is a graphical representation of the queue length for the behavior of ERICA on a WAN where the VBR source was active for alternating periods of 1 ms with 1 ms inactive periods in between;

FIG. 32C is a graphical representation of the link utilization for the behavior of ERICA on a WAN where the VBR source was active for alternating periods of 1 ms with 1 ms inactive periods in between;

FIG. 32D is a graphical representation of the cell received for the behavior of ERICA on a WAN where the VBR source was active for alternating periods of 1 ms with 1 ms inactive periods in between;

DETAILED DESCRIPTION OF THE PREFERRED EMBODIMENTS

Reference will now be made in detail to the referred embodiments of the invention, an example of which is illustrated in the accompanying drawings. It is to be appreciated that the present scheme may be implemented on any suitable computer and/or telecommunications network configuration through hardware and/or software configurations that will be apparent to those skilled in the art.

Source, Destination and Switch Behaviors

Figure 1A:
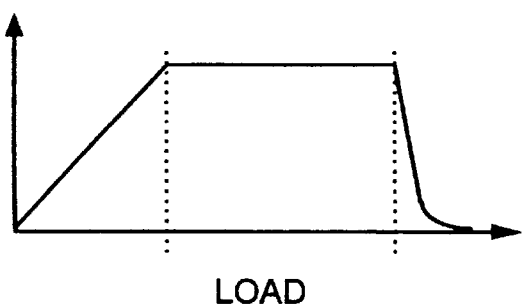
FIG. 1A is a graphic representation of throughput versus load in a network.
Figure 1C:
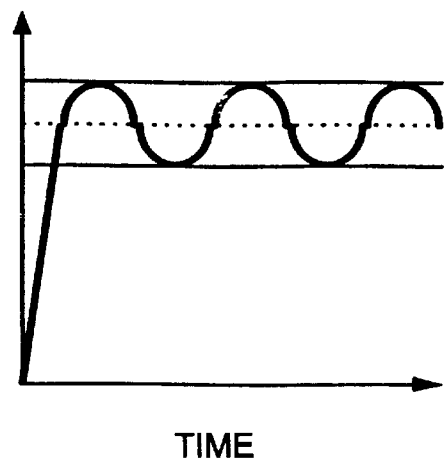
FIG. 1C is a graphic representation of link utilization versus time in a network.
Figure 1B:
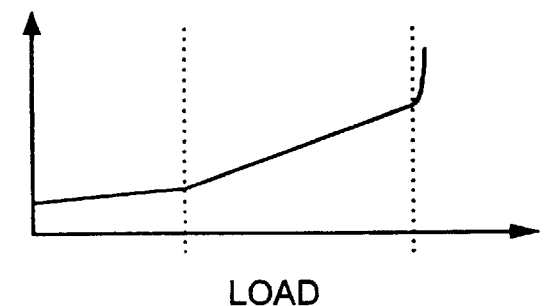
FIG. 1B is a graphic representation of delay versus load in a network.
Figure 1D:
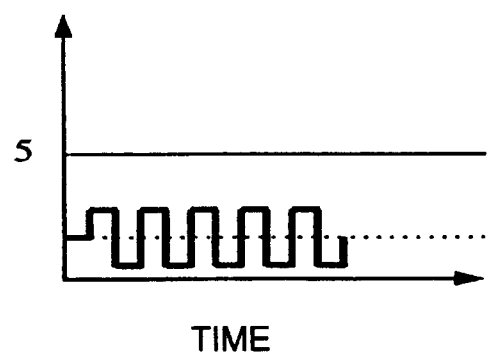
FIG. 1D is a graphic representation of queue length versus time in a network.
Figure 2:
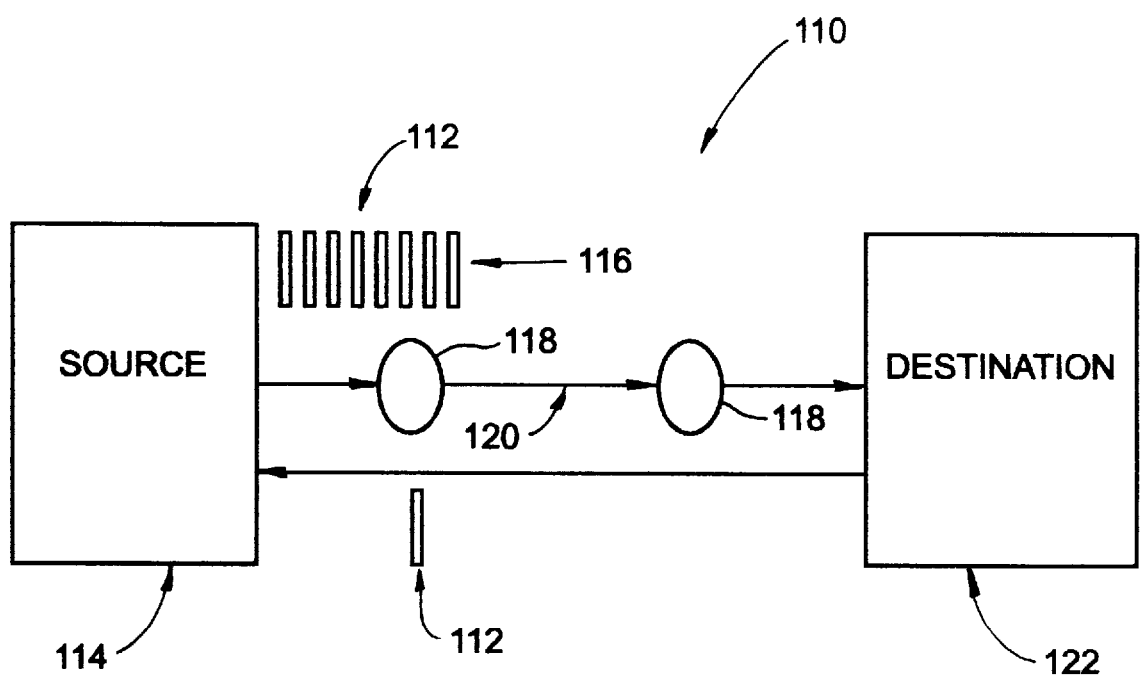
FIG. 2 is a graphic representation of an RM cell path.

FIG. 2 shows the path of a network 110 and the path of a Resource Management (RM) cell 112 through the network 110. A source end system 114 ("SES") sends data cells 116 at a rate called a Current Cell Rate (CCR). Every Nrm th cell sent from the source end system 114 will be an RM cell 112. The RM cell 112 contains information describing the CCR and an Explicit Rate (ER). Based on optimality and other considerations, switches 118 may calculate and set the ER field in the RM cells 112. The ER field indicates the rate the network 110 can support for a particular VC 120 at that time. A destination end system 122 ("DES") simply returns the RM cells 112 to the source 114 (possibly reducing the ER field). When the source 114 receives its RM cell 112, it adjusts its CCR to the value specified in the ER field of the RM cell 112.

The SES 114 also performs interoperability functions (for bit-based feedback), handles the scheduling of data and RM cells 112 in both directions, and performs some open-loop control functions which control the behavior during the time of the first round-trip, before the first feedback is received.

The Switch Algorithm

This section briefly summarizes the source 114, destination 122 and switch 118 behaviors and then examines ERICA switch scheme, or algorithm, in detail. The switch algorithm is executed for every queueing point. In most switches, such queues occur at the outgoing link (output port). The switch 118 periodically monitors the load on each link and determines an overload factor, z, the available capacity, and the number of currently active VCs (N).

Pseudocode for the switch algorithm is illustrated below:
Notes:
   All rates are in the units of cell/s
   The following pseudocode assumes a simple fixed-time averaging interval
   The variable "Overload factor" is used instead of z
1. Initialization:

```
ABR_Capacity ←Target_Utilization X Link_Bandwidth −
   VBR_Capacity
Aggregate_Received_Cell_Count ←0
Clear VC_Seen_Bit for all VCs
ABR_Cell_Count ←ABR_Capacity X Averaging_Interval
Num_Active_VCs ←Some Initial Value
FairShare ←ABR_Capacity/Num_Active_VCs
MaxAllocPrevious ←0 for all VCs
MaxAllocCurrent ←FairShare for all VCs
IF (Per_VC_CCR_Option)
   THEN NumberOfCells ←0 for all VCs
END (* IF *)
```

2. A cell of "VC" is received:

```
Increment Aggregate_Received_Cell_Count
Mark VC_Seen_Bit
IF (Bidirectional_Counting_Option AND (Cell is a BRM
   cell))
   THEN Mark VC_Seen_Bit in the Reverse Direction
END (* IF *)
IF (Per_VC_CCR_Option)
   THEN Increment NumberOfCells[VC]
END (* IF *)
```

3. The averaging interval timer expires

```
Num_Active_VCs ←max (Σ VC_Seen_Bit, 1)
Seen_VC_In_Last_Interval_Bit ←VC_Seen_Bit for all VCs
ABR_Capacity ←Target_Utilization X Link_Bandwidth −
   VBR_Capacity
ABR_Cell_Count ←ABR_Capacity X Averaging_Interval
FairShare ←ABR_Capacity/Num_Active_VCs
Overload_Factor←Aggregate_Received_Cell_Count/ABR_
   Cell_Count
MaxAllocPrevious ←MaxAllocCurrent for all VCs
MaxAllocCurrent ←FairShare for all VCs
Reset all VC_Seen_Bits
```

```
Reset all Seen_RM_Cell In This Interval bits
Aggregate_Received_Cell_Count ←0
IF (Per_VC_CCR_Option)
THEN BEGIN
   For all VCs:
      CCR[VC] ←NumberOfCells[VC]/Averaging_Interval
      NumberofCells ←0 for all VCs
END (* IF-THEN-BEGIN *)
Restart averaging interval timer
```
4. A Forward RM (FRM) Cell of "VC" is received:
```
IF (NOT Per_VC_CCR_Option)
   THEN CCR[VC] ←CCR in FRM cell
```

5. A Backward RM (BRM) cell of "VC" is received:
   The information for feedback is accessed from the corresponding forward direction port.

```
IF (Bidirectional_Counting Option AND
Bursty_Source_Counting_Option)
THEN BEGIN
   IF (NOT Seen_VC_In_Last_Interval)
   THEN BEGIN
      Set Seen_VC_In_Last_Interval bit
      Increment Num_Active_VCs
      FairShare ←ABR_Capacity/Num_Active_VCs
   END
END
IF (NOT Seen_RM_Cell_In_This_Interval)
THEN BEGIN
   VCShare ←CCR[VC] / Overload factor
   (* Max-Min Fairness Algorithm *)
   IF (Overload factor > 1 & &)
   THEN ER_Calculated ←Max (FairShare, VCShare)
   ELSE ER_Calculated ←Max (FairShare, VCShare,
      MaxAllocPrevious)
   END (*IF-THEN-ELSE*)
   MaxAllocCurrent ←Max (MaxAllocCurrent,
      ER_Calculated)
   ER_Calculated ←Max (FairShare, VCShare)
   (* Avoid Unnecessary Transient Overloads *)
   IF ((CCR[VC] <FairShare) AND (ER_Calculated ≧
      FairShare))
   THEN ER_Calculated ←FairShare
   (* Optionally Disable Feedback To This VC For An
         Averaging Interval *)
(* Ensure One Feedback Per Switch Averaging Interval *)
   Latest_Advertised_Rate[VC] ←ER_Calculated
   Seen_RM_Cell_In_This_Interval ←1
END (* IF-THEN-BEGIN *)
ELSE ER-Calculated ←Latest_Advertised_Rate[VC]
   (* Give Feedback In BRM Cell *)
ER_in_BRM_Cell ←Min (ER_in_BRM_Cell, ER_Calculated)
```

The Basic Scheme

The basic scheme represents a first embodiment of the present invention. In the first embodiment, the overload factor, z, is calculated as the ratio of the measured input rate, at a port to the switch 118, to the target capacity of an output link. The overload factor is, therefore, calculated as:

$$Z = \frac{\text{Input Rate}}{\text{ABR Capacity}}$$

where,

ABR Capacity=Target Utilization (U) X Link Bandwidth

The Input Rate is measured over an interval called the switch averaging interval. The above steps are executed at the end of the switch averaging interval.

Target utilization (U) is a parameter which is set to a fraction (close to, but less than 100%) of the available capacity. Typical values of target utilization range from 0.9 to 0.95.

The overload factor, z, is an indicator of the congestion level of the link. High overload values are undesirable because they indicate excessive congestion. Low overload values are also undesirable because they indicate link underutilization. The optimal operating point is at an overload value equal to one. The goal of the switch 118 is to maintain the network 110 at unit overload.

The fair share of each VC 120 is computed as follows:

$$\text{Fair share} = \frac{ABR \text{ Capacity}}{\text{Number of Active Sources}}$$

The switch 118 allows each source 114 sending at a rate below the fair share to rise to fair share every time it sends a feedback to the source 114. If the source 114 does not use all of its fair share, then the switch 118 fairly allocates the remaining capacity to the sources 114 which can use it. For this purpose, the switch 118 calculates the quantity:

$$VCShare = \frac{CCR}{z}$$

If all VCs 120 changed their rate to their VCShare values then, in the next cycle, the switch 118 would experience unit overload (z would equal one).

Hence VCShare aims to bring the system to an efficient operating point, which may not necessarily be fair, and fair share allocation aim to ensure fairness, possibly leading to overload (inefficient operation). A combination of these two quantities is used to rapidly reach optimal operation as follows:

$$ER\_Calculated = Max\{FairShare, VCShare\}$$

Sources 114 are allowed to send data at a rate of at least fair share within the first round-trip. This ensures minimum fairness between sources 114. If the VCShare value is greater than the Fair share value, the source 114 is allowed to send at VCShare, so that the link is not underutilized. This step also allows an unconstrained source to proceed towards a max-min rate. Thus, the ERICA scheme improves fairness at every step, even under overload conditions.

The calculated ER value cannot be greater than the ABR Capacity which has been measured earlier. Hence, ER_Calculated is determined as follows:

$$ER\_Calculated = Min\ (ER\_Calculated, ABR\ Capacity)$$

Since every output port is a queuing point through which a VC 120 passes, every source 114 ought to send at no more than the ER_Calculated at its bottleneck queuing point. To ensure that the bottleneck ER reaches the source 114, each switch 118 computes the minimum of the ER it has calculated as above and the ER value in the RM cell. This value is inserted in the ER field of the RM cell 112. The ER in the RM Cell 112 is computed as follows:

$$ER\ in\ RM\ Cell = Min\ (ER\ in\ RM\ Cell, ER\_Calculated)$$

Figure 3:
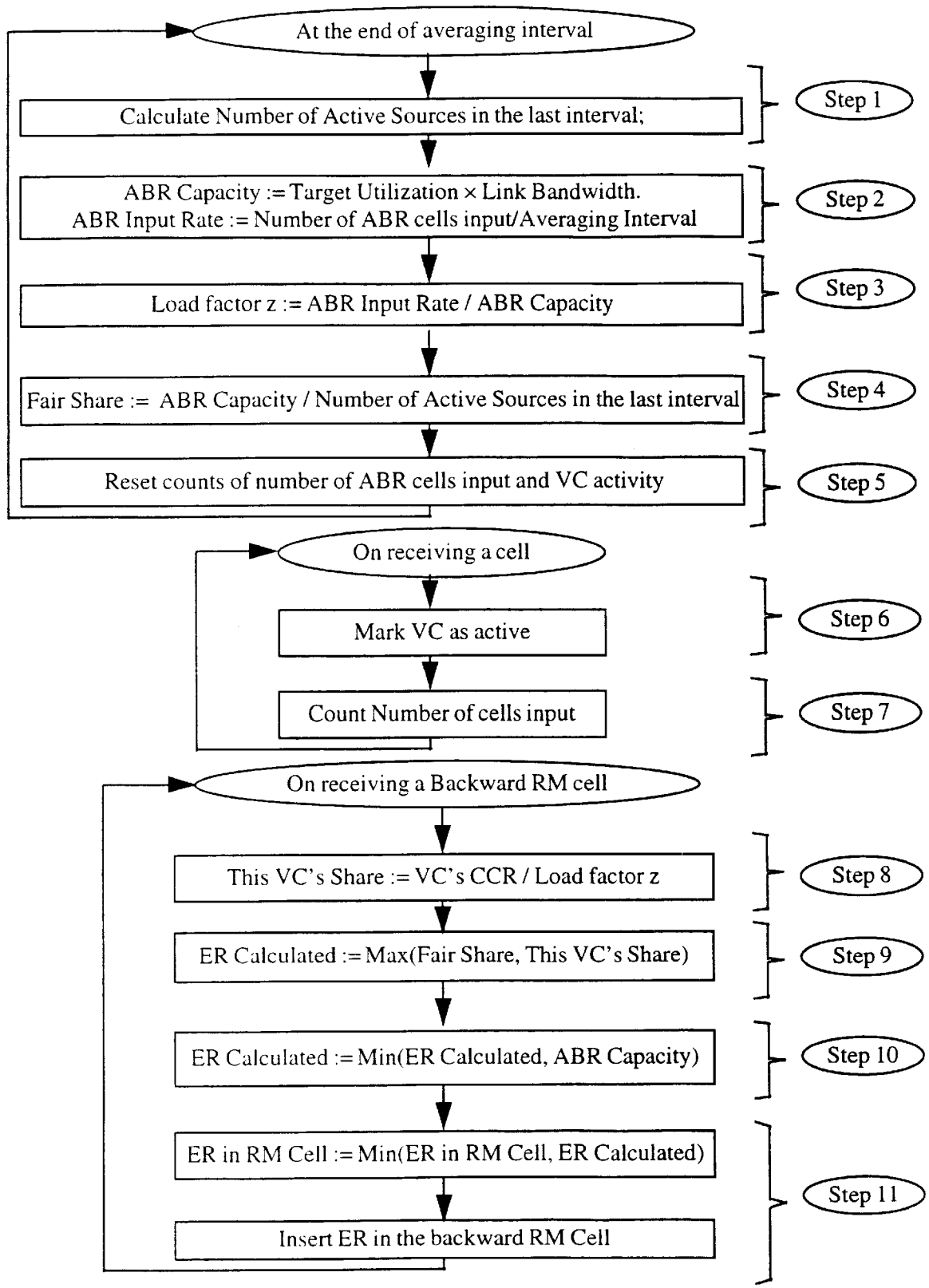
FIG. 3 is a flow chart representing the basic scheme.

Thus, referring to FIG. 3, at the end of an averaging interval, the number of active sources in the last interval are calculated (Step 1), ABR capacity and ABR input rate are calculated (Step 2), the load (or overload) factor is calculated (Step 3), the fair share is calculated (Step 4), and number counts are reset (Step 5). When a cell is received by the switch, the virtual channel VC is marked as active (Step 6) and the number of input cells are counted (Step 7). When a backward RM cell is received the VC share is calculated (Step 8), the ER Calculated is calculated (Steps 9 and 10), and the explicit rate to be inserted in the RM cell is selected and inserted (Step 11).

Achieving Max-Min Fairness

Assuming the measurements do not suffer from high variance, the above algorithm is sufficient to converge to efficient operation in all cases and to the max-min fair allocations in most cases. The convergence from transient conditions to the desired operating point is rapid, often taking less than a round-trip time. However, the above algorithm is not sufficient to converge to max-min fair allocations. In cases where the CCR is greater than the fair share, and z becomes one, the system remains in its current state. This final state may be unfair in the max-min sense.

Max-min fairness is achieved when the measured overload factor is one, and the sources still contending for bandwidth converge to the same ER feedback. To achieve max-min fairness, the algorithm is extended by adding the variable MaxAllocPrevious which stores the maximum allocation given in the previous interval, and the variable MaxAllocCurrent which accumulates the maximum allocation given during the current switch averaging interval. The step:

$$ER\_Calculated = Max\{FairShare, VCShare\}$$

is then replaced by:

```
IF (z > 1 + δ) THEN
    ER_Calculated = Max{FairShare, VCShare}
ELSE ER_Calculated = Max{FairShare, VCShare,
MaxAlloPrevious}
```

MaxAllocCurrent = Max (MaxAlloCurrent, ER_Calculated)

The new variables are initialized as:

MaxAllocPrevious=0

MaxAllocCurrent=FairShare and refreshed at the end of the switch averaging interval:

MaxAllocPrevious=MaxAllocCurrent

MaxAllocCurrent=FairShare

Basically, for $z > 1+\delta$, where $\delta$ is a small fraction, the basic ERICA algorithm is used where the source 114 is allocated as Max (FairShare, VCShare). But, for $z <= 1+\delta$, an attempt is made to make all the rate allocations equal. The ER is calculated as Max (FairShare, VCShare, MaxAllocPrevious).

A key point is that the VCShare is only used to achieve efficiency. Fairness can be achieved only by giving the contending sources equal rates. The solution proposed here attempts to give the sources 114 equal allocations during underload and then divide the (equal) CCRs by the same z during the subsequent overload to bring them to their max-min fair shares. The system is considered to be in a state of overload when its overload factor, z, is greater than $1+\delta$. The aim of introducing the quantity $\delta$ is to force the allocation of equal rates when the overload is fluctuating around unity, thus avoiding unnecessary rate oscillations. One possibility is to simply set the parameter 6 equal to 1-target utilization.

Figure 4:
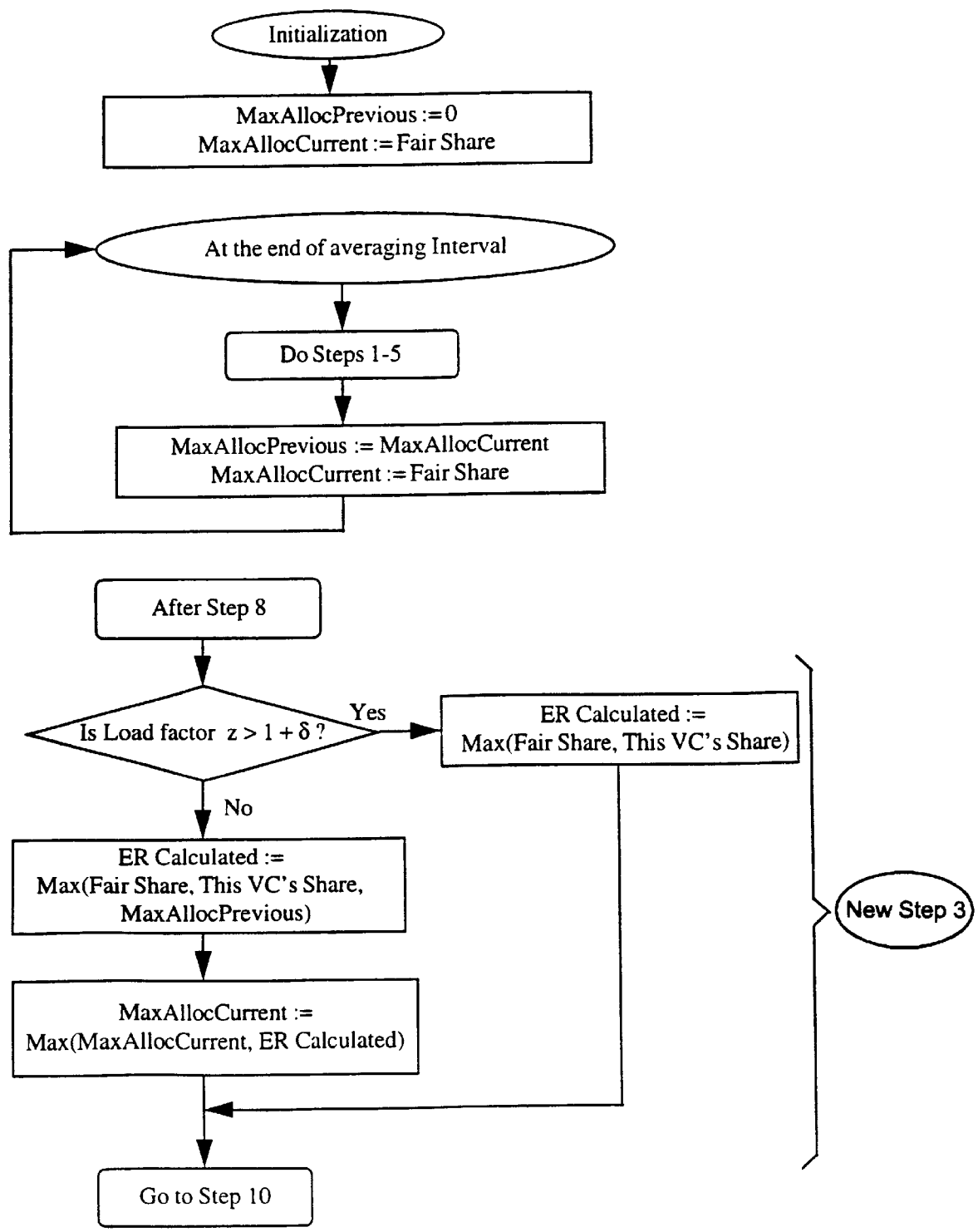
FIG. 4 is a flow chart representing a variation of the basic scheme—achieving max-min fairness.

Thus, referring to FIG. 4, an initialization and subsequent determination of values for MaxAllocPrevious and MaxAllocCurrent are calculated after Steps 1–5, e.g. of FIG. 3. After Step 8, e.g. of the basic scheme illustrated in FIG. 3, a new Step 9 as shown in FIG. 4 is executed. The scheme then proceeds to Step 10.

It is to be recognized that variations of the basic scheme illustrated herein may be utilized with the basic scheme or with variations of the basic scheme. Thus, for example, new Step 9 of FIG. 4 may be implemented to follow, among others, Step 8 of FIG. 3 or Step 8 of FIG. 7. As a further example, new Step 2 of FIG. 10 may be implemented to follow, among others, Step 1 of FIG. 3 or new Step 1 of FIG. 12. As a still further example, the variation of FIG. 5 may be implemented wherever appropriate including between Steps 9 and 10 of FIG. 3 or between new Step 9 and Step 10 (or a variation thereof) in FIG. 4. This flexibility creates a multitude of possibilities—too numerous to practically list but apparent to those skilled in the art—with respect to implementation of the present scheme by users. All such possibilities and variations are intended to fall within the scope of the present invention.

Fair Share First to Avoid Transient Overloads

The inter-RM cell time determines how frequently a source 114 receives feedback. It is also a factor in determining the transient response time when load conditions change. With the basic ERICA scheme, it is possible that a source 114 which receives feedback first can keep getting rate increase indications, purely because it sends more RM cells 112 before competing sources can receive feedback. This may result in unnecessary spikes (sudden increases) in rates and queues with the basic ERICA scheme.

The problem arises when the Backward RM (BRM) cells from different sources arrive asynchronously at the switch 118. Consider a LAN configuration of two sources (A and B), initially sending at low rates. When the BRM arrives, the switch 118 calculates the feedback for the current overload. Without loss of generality, assume that the BRM of source A is encountered before that of source B. Now it is possible that the BRM changes the rate of source A and the new overload due to the higher rate of A is experienced at the switch before the BRM from the source B reaches the switch. The transient overload experienced at the switch may still be below unity, and the rate of source A is increased further (BRMs for source A are available since source A sends more RM cells at higher rates). This effect is observed as an undesired spike in the rate graphs and sudden queue spikes when the source B gets its fair share.

This problem can be solved by incorporating the following change to the ERICA algorithm. When the calculated ER is greater than the fair share value, and the source is increasing from a CCR below fair share, we limit its increase to fair share. Alternatively, the switch could decide not to give new feedback to this source for one measurement interval. This is useful in LANs where the round trip time is shorter than the inter-RM cell gap and the switch measurement interval. The following computation is added to the switch algorithm.

After "ER_Calculated" is computed:

IF ((CCR<FairShare) AND (ER_Calculated>FairShare)) THEN ER_Calculated=FairShare

In addition, feedback can be optionally disabled to this source for one measurement interval. "ER in RM Cell" is then computed as before.

Figure 5:
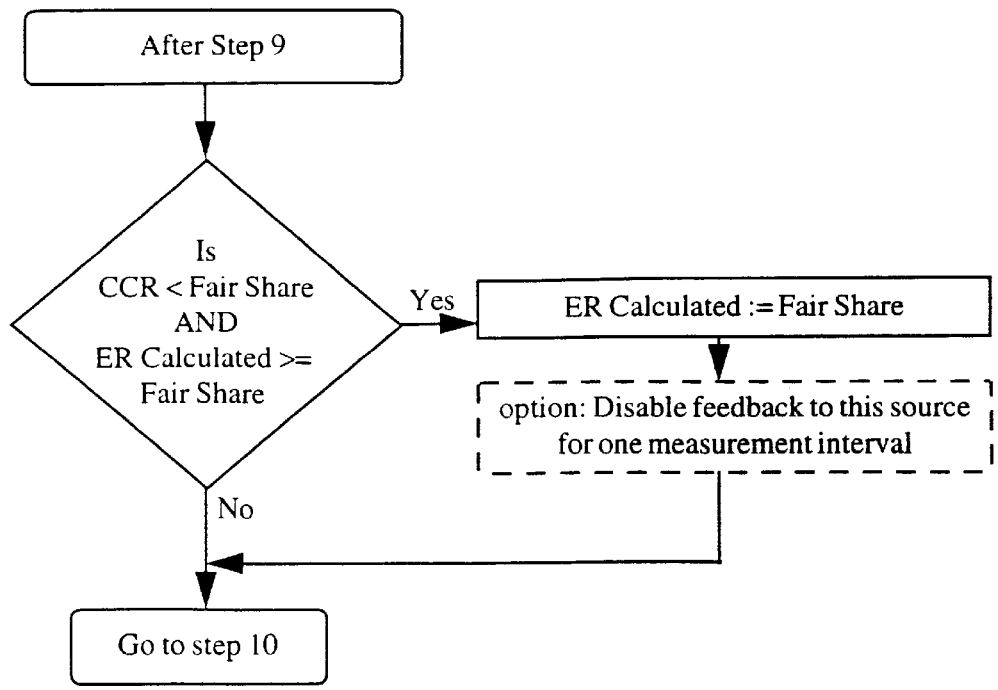
FIG. 5 is a flow chart representing a variation of the basic scheme—fair share first to avoid transient overloads.

Thus, after Step 9 as shown in FIG. 5, a determination is made whether the current cell rate is less than fair share and whether the ER_Calculated is greater than or equal to the fair share. If the answer is Yes, the ER_Calculated is set to be the fair share and, in addition, an option is provided to disable feedback to the source for one measurement interval. If the answer to the initial question is No, Step 10 is simply executed.

Forward CCR used for Reverse Direction Feedback

The original OSU scheme provided its feedback to the RM cells 112 going in the forward direction. This ensured that the CCR in the RM cell 112 was correlated to the load level measured by the switch during that interval. However, the time taken by the forward going RM cell 112 to travel back to the source 114 was long and this slowed down the response of the system.

The only requirement for each switch 118 is to provide its feedback to the sources 114. This can also be achieved if it indicates the feedback in the reverse path of the RM cell 112.

Figure 6:
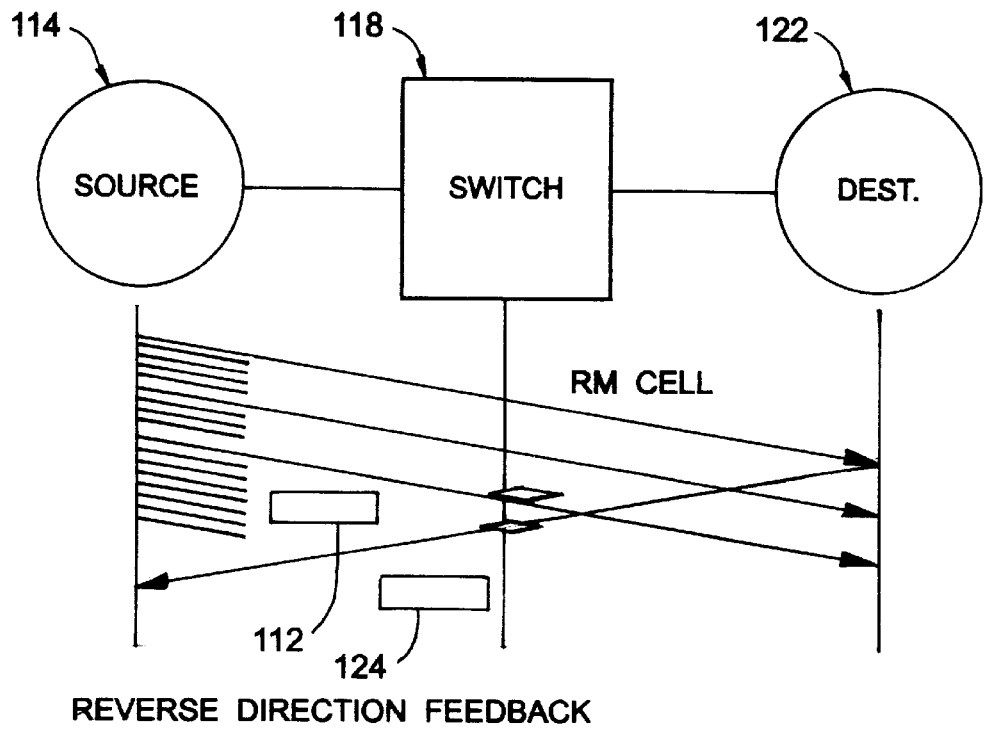
FIG. 6 is a graphic representation of Reverse Direction Feedback.

FIG. 6 illustrates reverse direction feedback. A backward going RM (BRM) cell 124 takes less time to reach the source 114 than the forward going RM (FRM) cell 112 which has to reach the destination 122 first. Thus, the system responds faster to changes in the load level. However, the CCR carried by the BRM cell 124 no longer reflects the load level in the system. To maintain the most current CCR value, the switch 118 copies the CCR field from FRM cells 112, and uses this information to compute the ER value to be inserted in the BRM cells 124. This ensures that the latest CCR information is used in the ER calculation and that the feedback path is as short as possible. FIG. 6 shows that the first RM cell 124 carries (in its backward path), the feedback calculated from the information in the most recent FRM cell 112. The CCR table update and read operations still preserve the $O(1)$ time complexity of the algorithm.

Figure 7:
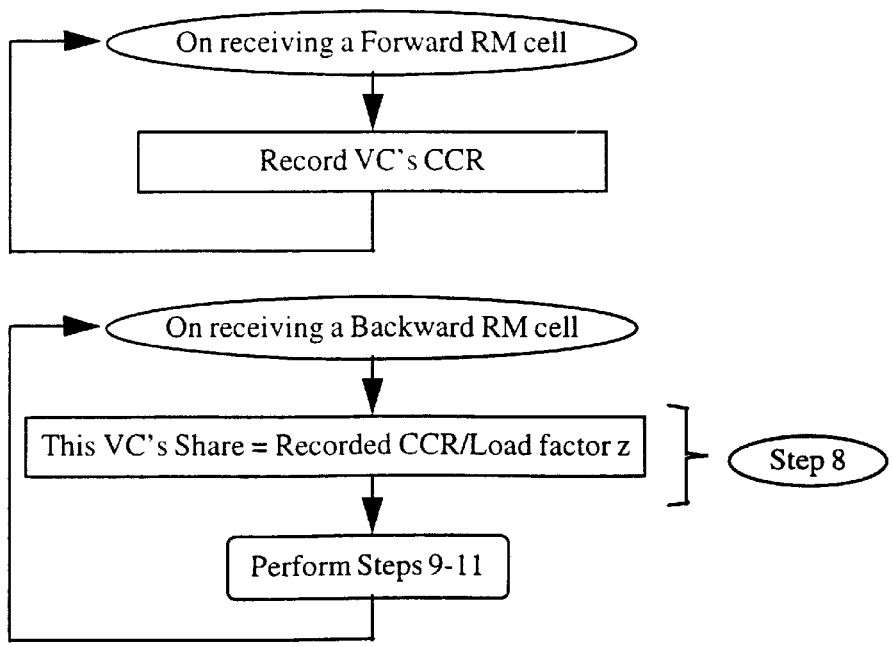
FIG. 7 is a flow chart representing a variation of the basic scheme—forward CCR used for reverse direction feedback.

Thus, referring to FIG. 7, when a forward RM cell is received, the current cell rate of the virtual channel is recorded. When a backward RM cell is received, the VC's share is calculated (Step 8) and Steps 9–11 are then executed.

Single Feedback in a Switch Interval

The switch 118 measures the overload, the number of active sources and the ABR capacity periodically (at the end of every switch averaging interval). The source 114 also sends RM cells 112 periodically (once every Nrm cells). These RM cells 112 may contain different rates in their CCR fields. If the switch 118 encounters more than one RM cell 112 from the same VC 120 during the same switch interval, then it uses the same value of overload for computing feedback in both cases. For example, if two RM cells 112 from the same VC 120 carried different CCR values, then the feedback in one of them will not accurately reflect the overload. As a result, the switch feedback will be erroneous and may result in unwanted rate oscillations. The switch 118 thus needs to give only one feedback value per VC 120 in a single switch interval.

The above example illustrates a fundamental principle in control theory, which says that the system is unstable when the control is faster than feedback. Further, the system is unresponsive if the control is slower than feedback. Ideally, the control rate should be matched to the feedback rate. In our system, the delay between successive feedbacks should not be greater than the delay between successive measurements (controls).

The original OSU scheme solved the problem of matching the feedback and control rate by correlating the source and switch intervals. The source interval is set to the maximum of all the switch intervals in the path. This ensures that no more than one RM cell from each VC is encountered by any switch during a single switch interval. A disadvantage of this approach is that RM cells can be spaced quite far apart if any switch in the path of the VC has a long interval. As a result, switches with shorter intervals may not see any RM cells for many intervals and would be unable to rapidly provide their feedback to the source. This affects the transient response of the system.

Figure 8:
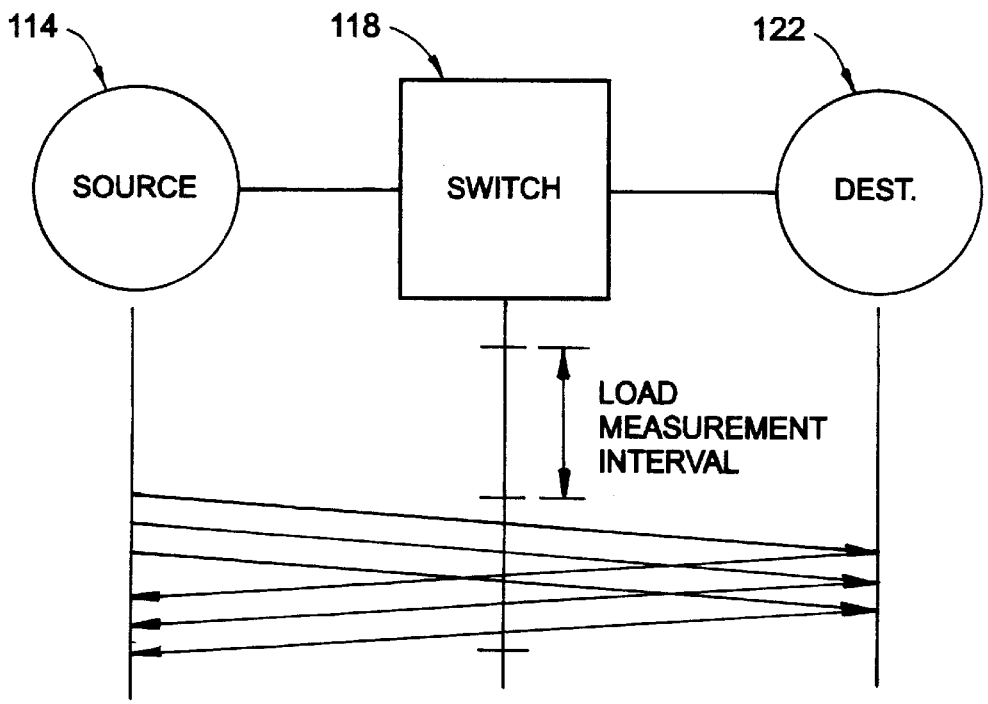
FIG. 8 is a graphic representation of single feedback in a switch interval.

ERICA, the present scheme, adopts a different approach, where the source 114 and the switch intervals need not be correlated. The switch 118 provides only one feedback value during each switch interval irrespective of the number of RM cells it encounters. The switch calculates the ER only once per interval, and the ER value obtained is stored. It inserts the same ER value in all the RM cells it sees during this interval. The source and switch intervals are completely independent. Furthermore, a switch 118 with a smaller interval can now convey its feedback faster and is not dependent on any other switches in the path. The source independently decides the inter-RM cell distance, thus determining the frequency of feedback. In FIG. 8, the switch interval is greater than the RM cell distance. The ER_Calculated in the interval marked Load Measurement Interval is maintained in a table and set in all the RM cells passing through the switch during the next interval.

Figure 9:
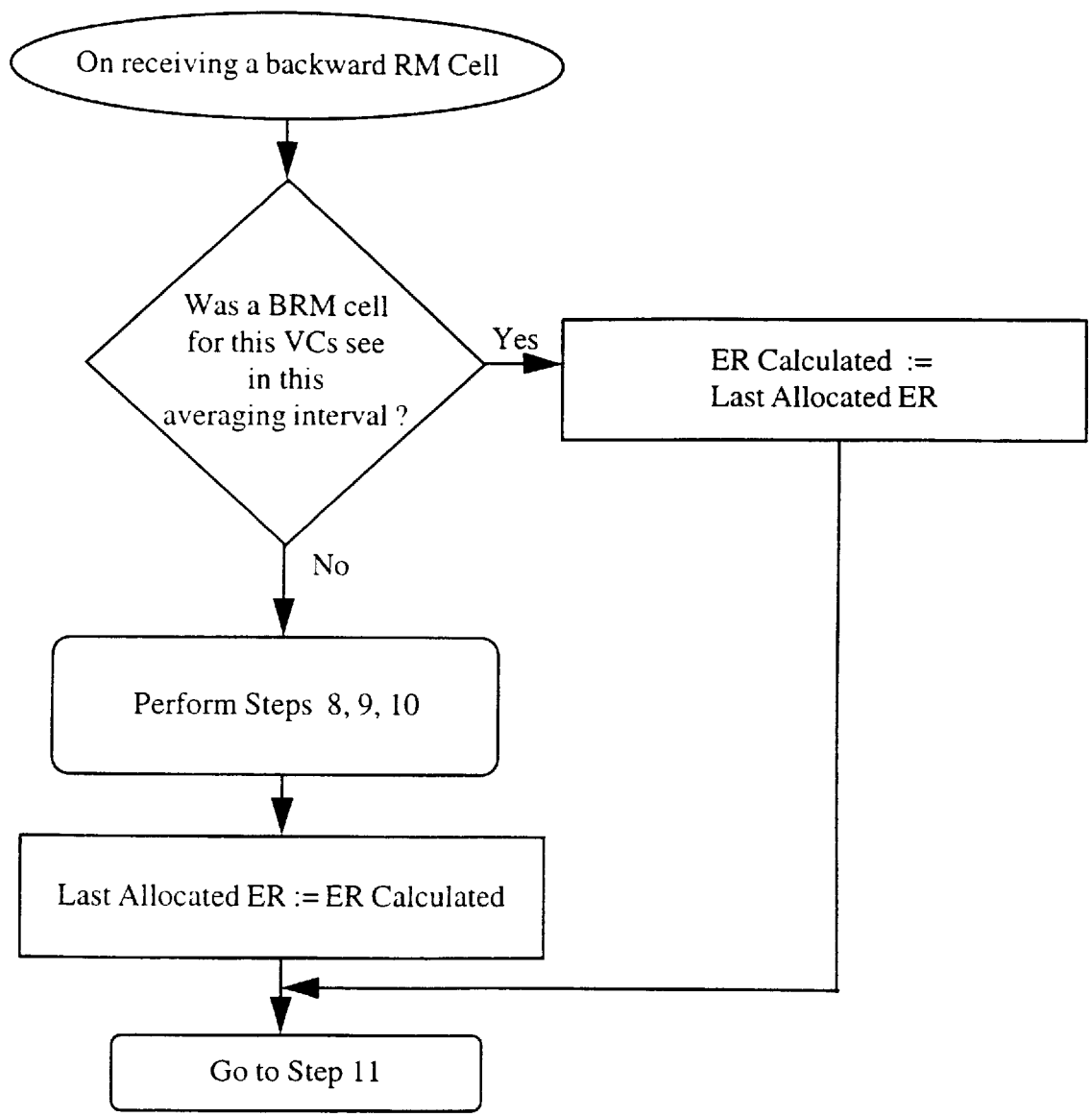
FIG. 9 is a flow chart representing a variation of the basic scheme—single feedback in an averaging interval.

Thus, referring to FIG. 9, a variation is shown. More specifically, the variation includes the following. When a backward RM cell is received, it is determined whether a backward RM cell for that particular virtual channel was seen during that averaging interval. If the answer is yes, the ER Calculated is determined to be the last allocated ER and then Step 11 is performed. If the answer is no, Steps 8, 9 and 10 are performed and the last allocated ER is set to be ER Calculated.

Per-VC CCR Measurement Option

The CCR of a source is obtained from the CCR field of the forward going RM cell 112. The latest CCR value is used in the ERICA computation. It is assumed that the CCR is correlated with the overload factor measured. When the CCR is low, the frequency of forward RM cells 112 becomes very low. Hence, the switch may not have a new CCR estimate though a number of averaging intervals have elapsed. Moreover, the CCR value may not be an accurate measure of the rate of the VC if the VC is bottlenecked at the source, and is not able to use its ACR allocation. Note that if a VC 120 is bottlenecked on another link, the CCR is set to the bottleneck allocation within one round-trip.

A possible solution to the problems of inaccurate CCR estimates is to measure the CCR of every VC during the same averaging interval as the overload factor. This requires the switch to count the number of cells received per VC during every averaging interval and update the estimate as follows:

At the end of a switch averaging interval:

```
FOR VC = 0 TO (NumberOfVCs − 1) BEGIN
    CCR[VC] = NumberOfCells[VC]/
              Averaging_Interval_Length
    NumberOfCells[VC] = 0
END
```

When a cell is received:

NumberOfCells[VC]=NumberOfCells[VC]+1 Initialization:

FOR VC=T0 (NumberofVCs-1) NumberOfCells[VC]=0

When an FRM cell is received, do not copy CCR field from FRM into CCR[VC].

Note that using this method, the switch ignores the CCR field of the RM cell. The per-VC CCR computation can have a maximum error of (one cell/averaging interval) in the rate estimate. Hence the error is minimized if the averaging interval is larger.

The effect of the per VC CCR measurement can be explained as follows. The basic ERICA uses the following formula:

ER_Calculated=Max (FairShare, VCShare)

The measured CCR estimate is always less than or equal to the estimate obtained from the RM cell CCR field. If the other quantities remain constant, the term "VCShare" decreases. Thus the ER_Calculated will decrease whenever the first term dominates. This change results in a more conservative feedback, and hence shorter queues at the switches.

VBR and CBR Background

The discussion so far assumed that the entire link was being shared by ABR sources. Normally, ATM links will be used by constant bit rate (CBR) and variable bit rate (VBR) traffic along with ABR traffic. In fact, CBR and VBR have a higher priority. Only the capacity left unused by VBR and CBR is given out to ABR sources. For such links, we need to measure the CBR and VBR usage along with the input rate. The ABR capacity is then calculated as follows:

ABR Capacity=Target Utilization X Link Bandwidth−VBR Usage−CBR usage

The rest of ERICA algorithm (or variations) remains unchanged. Notice that the target utilization is applied to the entire link bandwidth and not the left over capacity. That is, ABR Capacity≠Target Utilization X {Link Bandwidth−VCR Usage−CBR Usage}

There are two implications of this choice. First, (1-Target Utilization) x (link bandwidth) is available to drain the queues, which is much more that what would be available otherwise. Second, the sum of VBR and CBR usage must be less than (target utilization) x (link bandwidth). Thus, the VBR and CBR allocation should be limited to below the target utilization.

Figure 10:
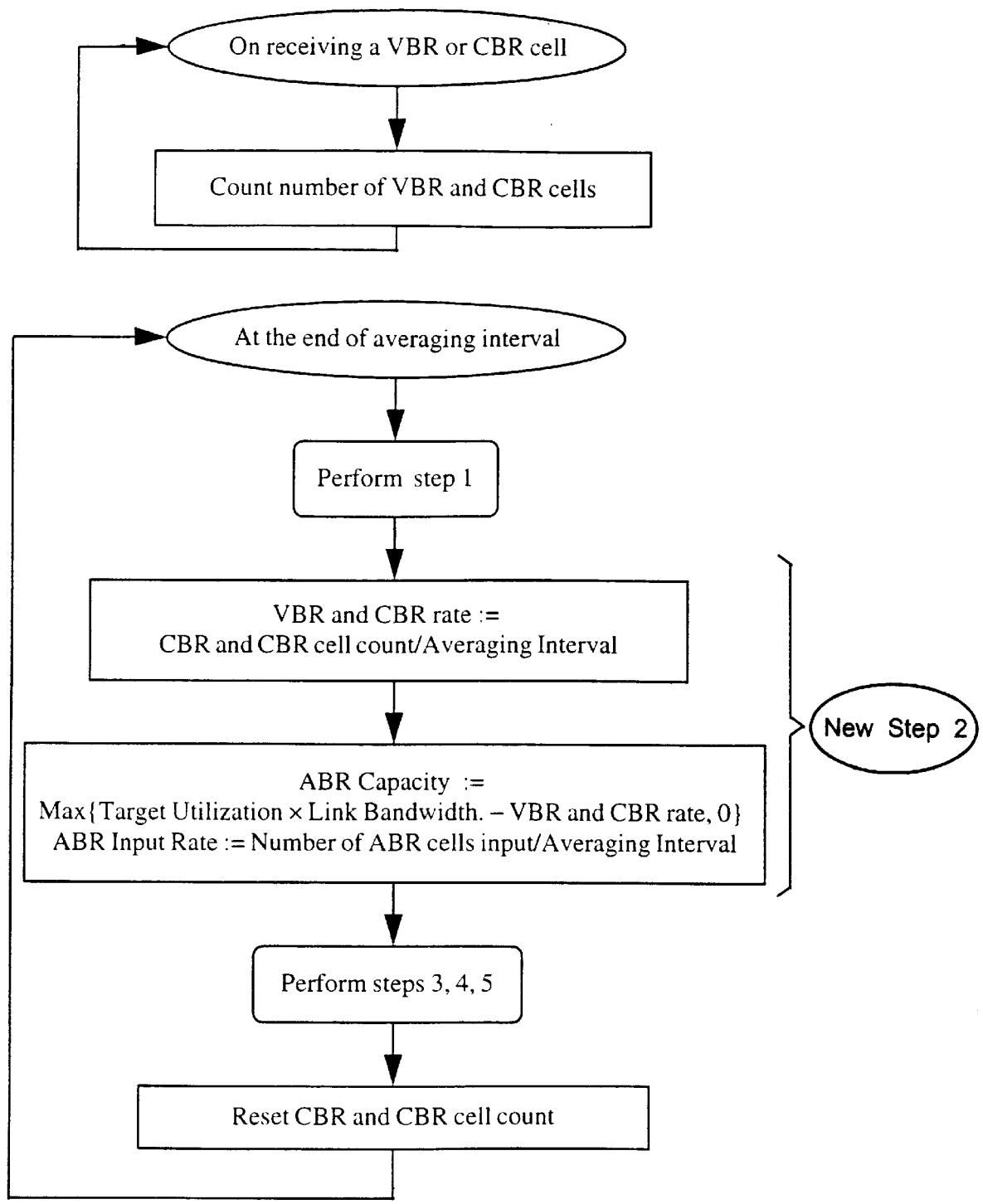
FIG. 10 is a flow chart representing a variation of the basic scheme—operation with VBR and CBR background traffic.

Thus, referring to FIG. 10, when a VBR or CBR cell is received, the number of VBR and CBR cells are counted. At the end of an averaging interval, Step 1 is performed and Step 2 is replaced as shown in FIG. 10. Steps 3, 4 and 5 are then performed and the CBR and VBR cell count is reset.

Bi-directional Counting of Bursty Sources

A bursty source sends data in bursts during its active periods, and remains idle during other periods. It is possible that the BRM cell of a bursty source could be traveling in the reverse direction, but no cells of this source are traveling in the forward direction. A possible enhancement to the counting algorithm is to also count a source as active whenever a BRM of this source is encountered in the reverse direction. We refer to this as the "Bidirectional counting of active VCs".

One problem with this technique is that the reverse queues may be small and the feedback may be given before the Fair share is updated, taking into consideration the existence of the new source. Hence, when feedback is given, one can optionally check to see if the source has been counted in the earlier interval and if the Fair share has been updated based upon the existence of the source. If the source had not been counted, the number of active sources and the fair share is updated before giving the feedback. This enhancement entails the following modifications to the switch algorithm:

BRM processing, before the ERICA feedback calculation:

IF (NOT (Seen_VC_ln_Last_Interval(cell)) THEN BEGIN
Set Seen_VC_ In_Last_Interval (cell)
Num_Active_VCs = Num_Active_VCs + 1
$$FairShare = \frac{ABR\_Capacity}{Num\_Active\_VCs}$$
END We could also reset the CCR of such a source to zero after updating the fair share value, so that the source is not allocated more than the fair share value. The motivation behind this strategy is that the source may be idle, but its CCR is unchanged because no new FRMs are encountered. When the per-VC CCR measurement is used, this option is not necessary, because the switch measures the CCRs periodically. The setting of CCR to zero is a conservative strategy which avoids large queues due to bursty or ACR retaining sources. A drawback of this strategy is that in certain configurations, the link may not be fully utilized if the entire traffic is bursty. This is because all the bursty sources are asked to send at fair share, which may not be the optimal value if some sources are bottlenecked elsewhere. This option can also be enabled and disabled based upon a certain queue threshold.

Figure 11:
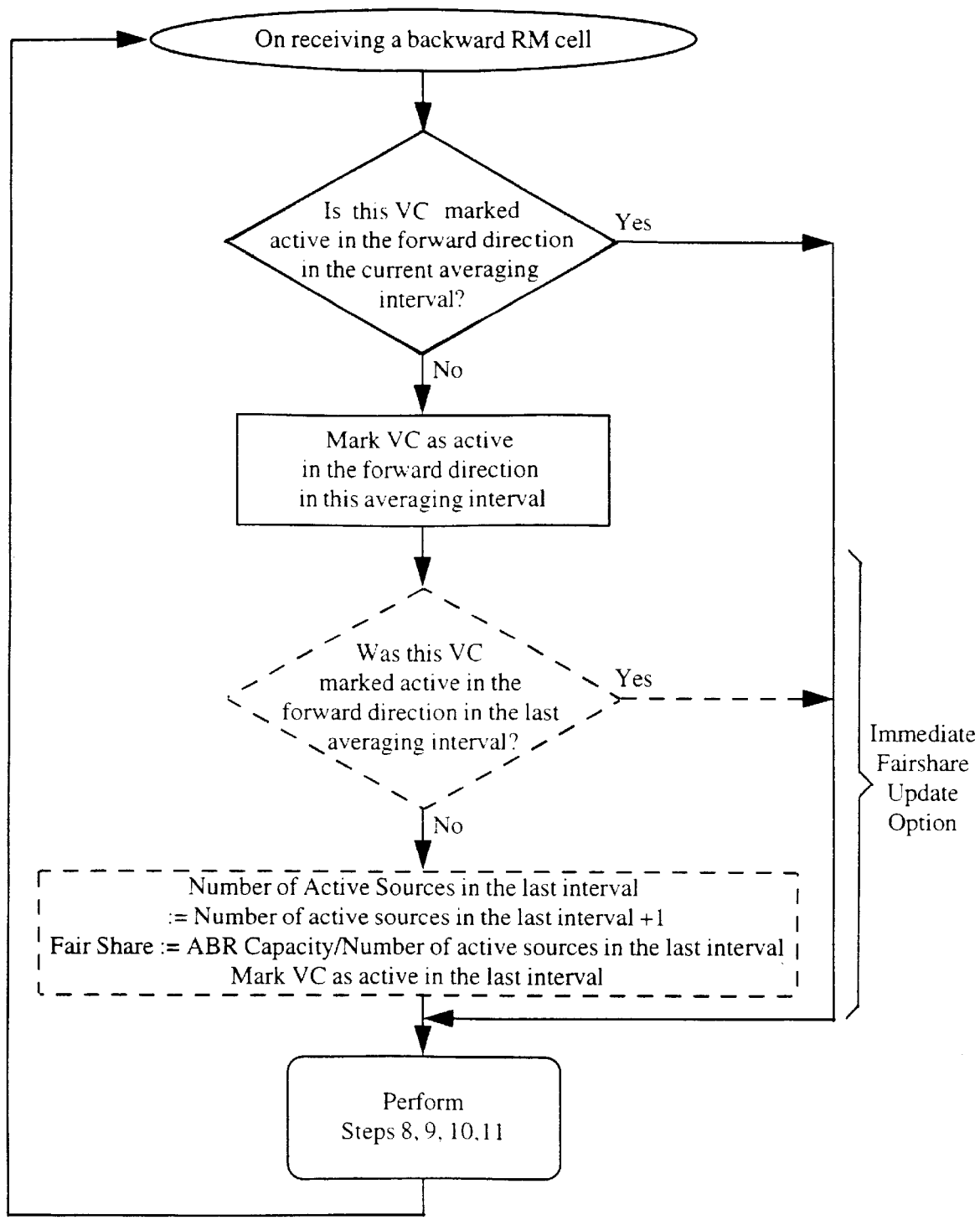
FIG. 11 is a flow chart representing a variation of the basic scheme—bi-directional counting.

Thus, referring to FIG. 11, when a backward RM cell is received, it is determined whether the virtual channel is marked active in the forward direction in the current averaging interval. If it is then Steps 8, 9, 10 and 11 are performed. If not, the virtual channel is marked as active in the forward direction and the immediate fair share update option may be performed. Whether or not the option is performed, steps 8, 9, 10 and 11 of are subsequently performed.

Averaging of the Number of Sources

Another technique to overcome the problem of underestimating the number of active sources is to use exponential averaging to decay the contribution of each VC to the number of active sources count. A motivation behind this idea is that if a source is inactive during the current interval, but was recently active, it should still contribute to the number of active sources. This is because this source might be sending its data in bursts, and just happened to be idle during the current interval.

This technique entails the following modifications to the switch algorithm:

Initialization:

```
FOR ALL VCs DO
    Contribution[VC] = 0
END
```

At the end of each interval:

```
Number of Active Sources in the Last Interval =
    Number of Active Sources in the Current Interval
Number of Active Sources in the Current Interval = 0
FOR ALL VCs DO
    Contribution[VC] = Contribution[VC] *
        Decay_Factor
    Number of Active Sources in the Current Interval =
        Number of Active Sources in the Current
        Interval + Contribution[VC]
END
Cell from virtual channel VC is seen:
Number of Active Sources in the Current Interval =
    Number of Active Sources in the Current
    Interval − Contribution[VC] + 1
Contribution[VC] = 1
```

The factor used in decaying the contribution of each VC is a value between zero and one, and is usually selected to be a large fraction, say 0.9. The larger the value of the Decay_Factor, the larger the contribution of the sources active in prior intervals, and the less sensitive the scheme is to measurement errors. Setting the Decay_Factor to a smaller fraction makes the scheme adapt faster to sources which become idle, but makes the scheme more sensitive to the averaging interval length.

Figure 12:
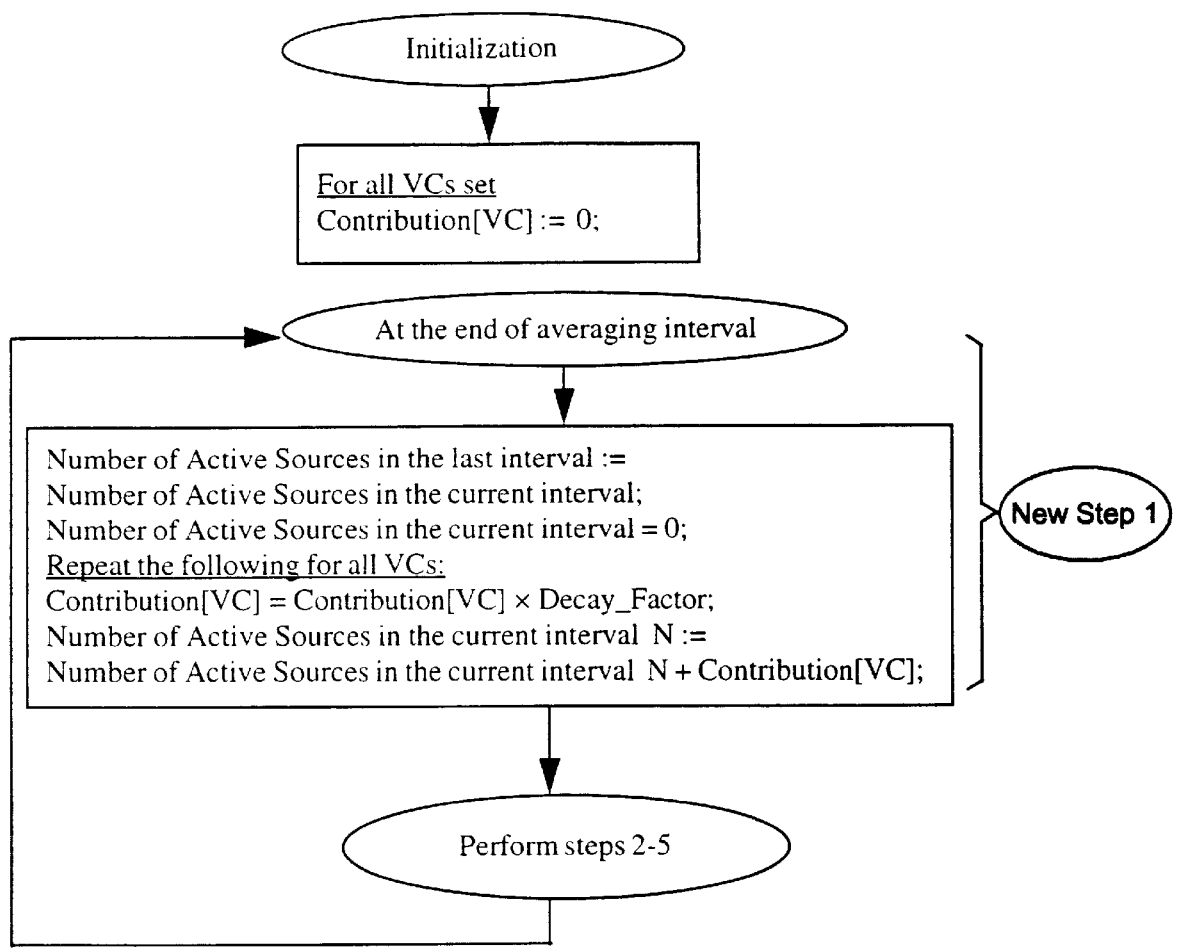
FIGS. 12 and 13 are flow charts representing a variation of the basic scheme—averaging the number of active sources.
Figure 13:
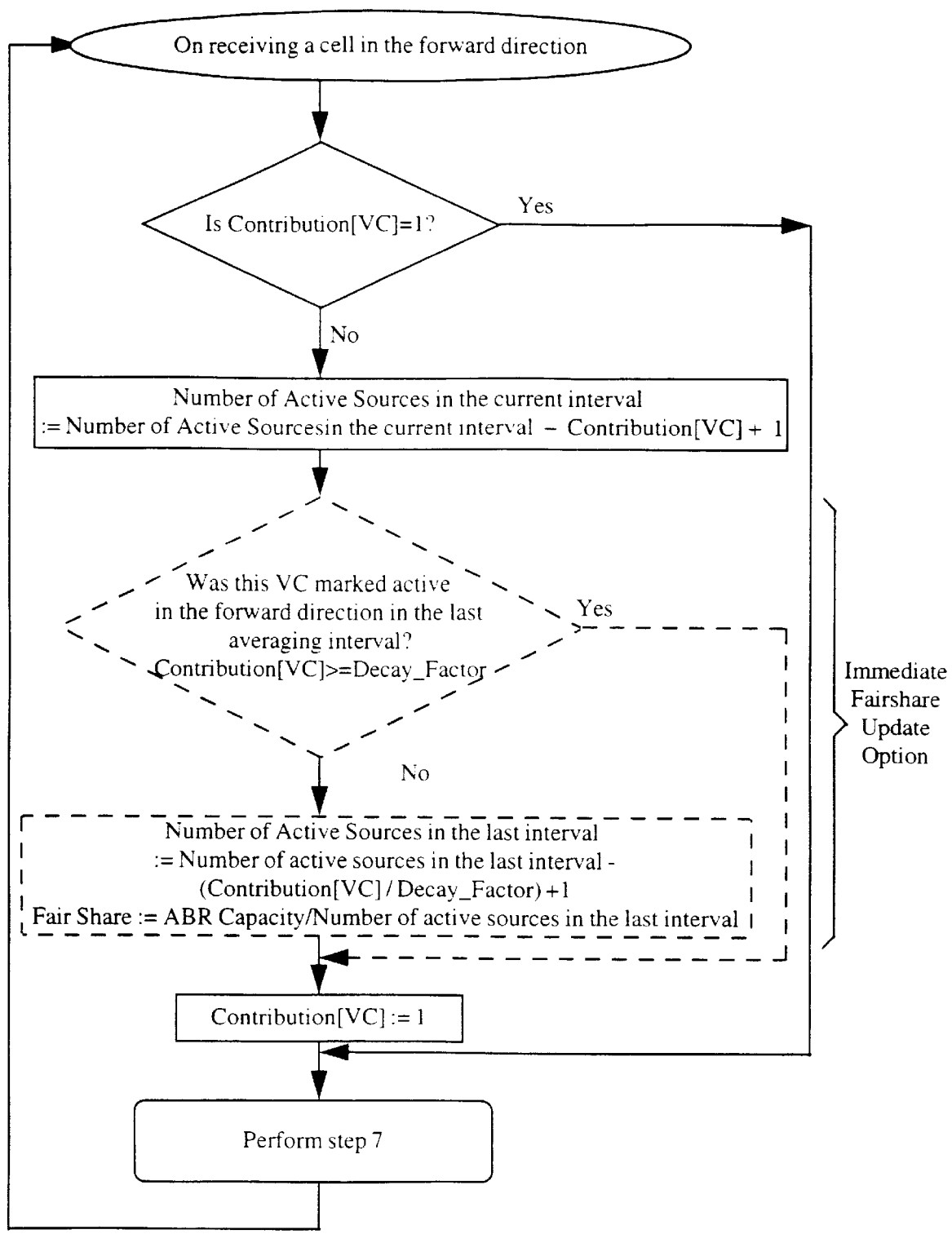

Thus, referring to FIG. 12, the initialization is performed and, at the end of the averaging interval, a new Step 1 is performed prior to Steps 2-5. As shown in FIG. 13, when a cell in the forward direction is received, it is determined whether the virtual channel is active in the current interval (that is, its contribution is 1). If the virtual channel is active, step 7 is performed. If the virtual channel is not active, the number of active sources is calculated based on the formula shown in FIG. 13B and then the immediate fair share update option may be performed. Step 7 is then performed after setting the VC's contribution to 1.

Boundary Conditions

Two boundary conditions are introduced in the calculations at the end of the averaging interval. First, the estimated number of active sources should never be less than one. If the calculated number of sources is less than one, the variable is set to one. Second, the load factor becomes infinity (when the ABR capacity is measured to be zero) or the the load factor becomes zero (when the input rate is measured to be zero). The corresponding allocations are made as follows:

| ABR Capacity | Input Rate I | Over-load | Fair Share | CCR/ Overload | Feedback |
|---|---|---|---|---|---|
| 0 | Nonzero | ∞ | 0 | 0 | 0 |
| Nonzero | 0 | 0 | C/N | 0 | C/N |
| Nonzero | Nonzero | I/C | C/N | CCR*C/I | Max{CCR* C/I, C/N} |
| 0 | 0 | ∞ | 0 | 0 | 0 |

The pseudo code for the boundary cases are:
```
/* Boundary case for N */
IF (N < 1) THEN N := 1;
/* Boundary case for load level, z */
IF ( ABR_Capacity <= 0 ) THEN z:= Infinity;
ELSE z:= (ABR_Input_Rate / ABR_Capacity);
```

Figure 14:
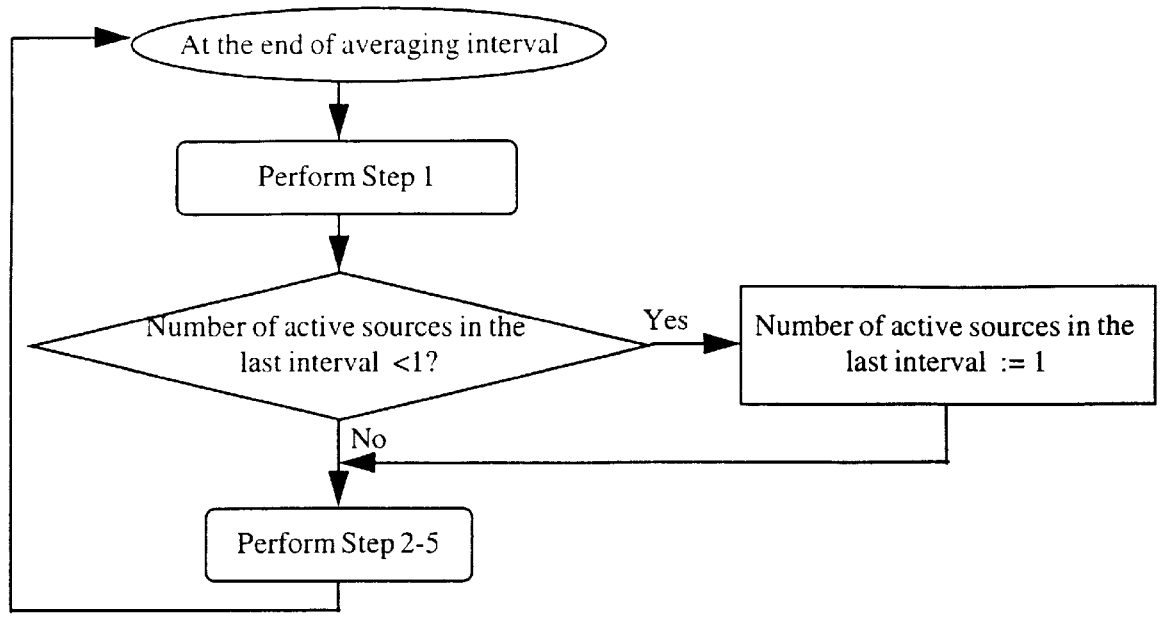
FIG. 14 is a flow chart representing a modification of the basic scheme—boundary case with zero active sources.

Thus, referring to FIG. 14, at the end of the averaging interval, step 1 is performed and then it is determined whether the number of active sources is less than one. If the number of active sources is less than one, then the number of active sources is set to one and steps 2–5 are performed. If the number of active sources is not less than one, steps 2–5 are performed.

Figure 15:
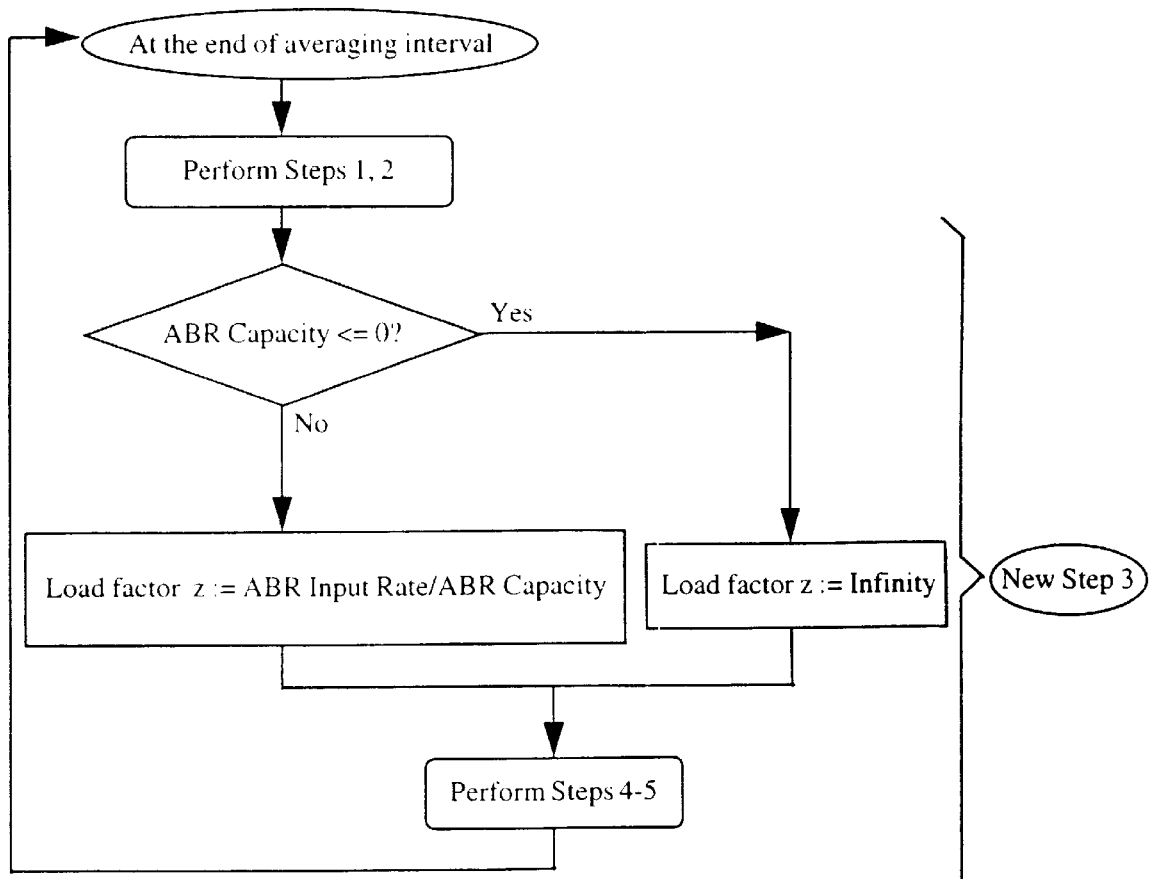
FIG. 15 is a flow chart representing a modification of the basic scheme—boundary case with zero ABR capacity.

Referring to FIG. 15, in a boundary case relating to ABR capacity being zero, at the end of the averaging interval, steps 1 and 2 are performed and then a determination is made whether the ABR capacity is less than or equal to zero. If it is, the load factor is set to infinity and Steps 4–5 are performed. If the ABR is greater than zero, the load factor is calculated as in the basic scheme of FIG. 3 and steps 4–5 are performed. This entails a new step 3 as compared to that of, for example, FIG. 3.

Averaging of Overload Factor

In cases where no input cells are seen in an interval, or when the ABR capacity changes suddenly (possibly due to a VBR source going away), the overload measured in successive intervals may be considerably different. This leads to considerably different feedbacks in successive intervals.

An optional enhancement to smoothen this variance is by averaging the overload factor. This effectively increases the length of the averaging interval over which the load factor is measured.

Method 1

One method of averaging the load factor is given below:

```
IF ( ABR capacity <= 0 ) THEN z:= Infinity;
ELSE
    IF (z = Infinity) THEN
```

```
        z:= ABR Input Rate / ABR Capacity;
    ELSE
        z := ( 1 -α) * z +
              α * (ABR Input Rate / ABR Capacity);
    ENDIF
ENDIF
```

Method 2

The method 1 described above has the following drawbacks. First, the average resets everytime z becomes infinity. The entire history accumulated in the average prior to the interval where the load is measured to be infinity is lost.

For example, suppose the overload is measured in successive intervals as: 2, 1, ∞, 3, ∞, 0.5. Method 1 forgets the history in the fourth interval, and restarts at the new value 3. Similarly in the sixth interval, it restarts at the value 0.5. Note that this method introduces dependencies between the boundary cases and the average value of the load factor.

The second problem with method 1 is that the exponential average does not give a good indication of the average value of quantities which are not additive. In our case, the load factor is not an additive quantity. However, the number of ABR cells received or output is additive.

Observe that the load factor is a ratio of the input rate and the ABR capacity. The correct way to average a ratio, whose numerator and denominator both have additive property, is to find the average (or the sum) of the numerators and divide it by the average (or the sum) of the denominators. That is, the average of x1/y1, x2/y2, . . . , xn/yn is (x1+x2+. . .+xn)/(y1+y2+. . .+yn).

To average load factor, the input rate (numerator) and the ABR capacity (denominator) should be averaged separately. However, the input rate and the ABR capacity are themselves ratios of cells over time. The input rate is the ratio of number of cells input and the averaging interval. If the input rates are x1/T1, x2/T2, . . . , xn/Tn, the average input rate is {(x1+x2+. . .+xn)/n}/{(T1+T2+. . .+Tn)/n}. Here, xi's are the number of ABR cells input in averaging interval i of lengthTi.

Similarly the average ABR capacity is {(y1+y2+. . . +yn)/n}/{(T1+T2+. . .+Tn)/n}. Here, yi's are the maximum number of ABR cells that can be output in averaging interval i of length Ti.

The load factor is the ratio of these two averages. Observe that each of the quantities added is not a ratio, but a number.

Exponential averaging is an extension of arithmetic averaging used above. Hence, the averages like (x1+x2+. . . . xn)/n can be replaced by the exponential average of the variable xi.

The pseudo code describe this averaging is given below:
At the end of averaging interval:

```
(* New Step 2: Calculating Input Rate and ABR Capacity *)
ABR Capacity in cells := Max{(Target Utilization *
    Link Bandwidth * This Interval Length) −
    VBR and CBR cell count, 0}
Average ABR Capacity in cells :=
    (1 −α) * Average ABR Capacity in cells +
    α * ABR capacity in cells
Average Interval Length :=
    (1 − α) * Average Interval Length +
    a * This Interval Length
Average ABR Input Cell Count :=
    (1 −α) * Average ABR Input Cell Count +
    α * ABR Input Cell Count for this Interval
Average ABR capacity :=
    Average ABR Capacity in cells /
        Average Interval Length;
Average ABR Input rate :=
    Average ABR Input Cell Count /
        Average Interval Length
(* -- Step 3: Load Factor Calculation -- *)
IF ( Average ABR capacity <= 0 ) THEN z := Infinity;
ELSE z:= Average ABR Input rate / Average ABR capacity;
```

Average ABR Input rate:

Observe that the overload factor thus calculated is never zero or infinity unless the input rate or ABR capacity are always zero. If the input rate or the ABR capacity is measured to be zero in any particular interval, the boundary cases for overload are not invoked. The load level increases or decreases to finite values.

Figure 16:
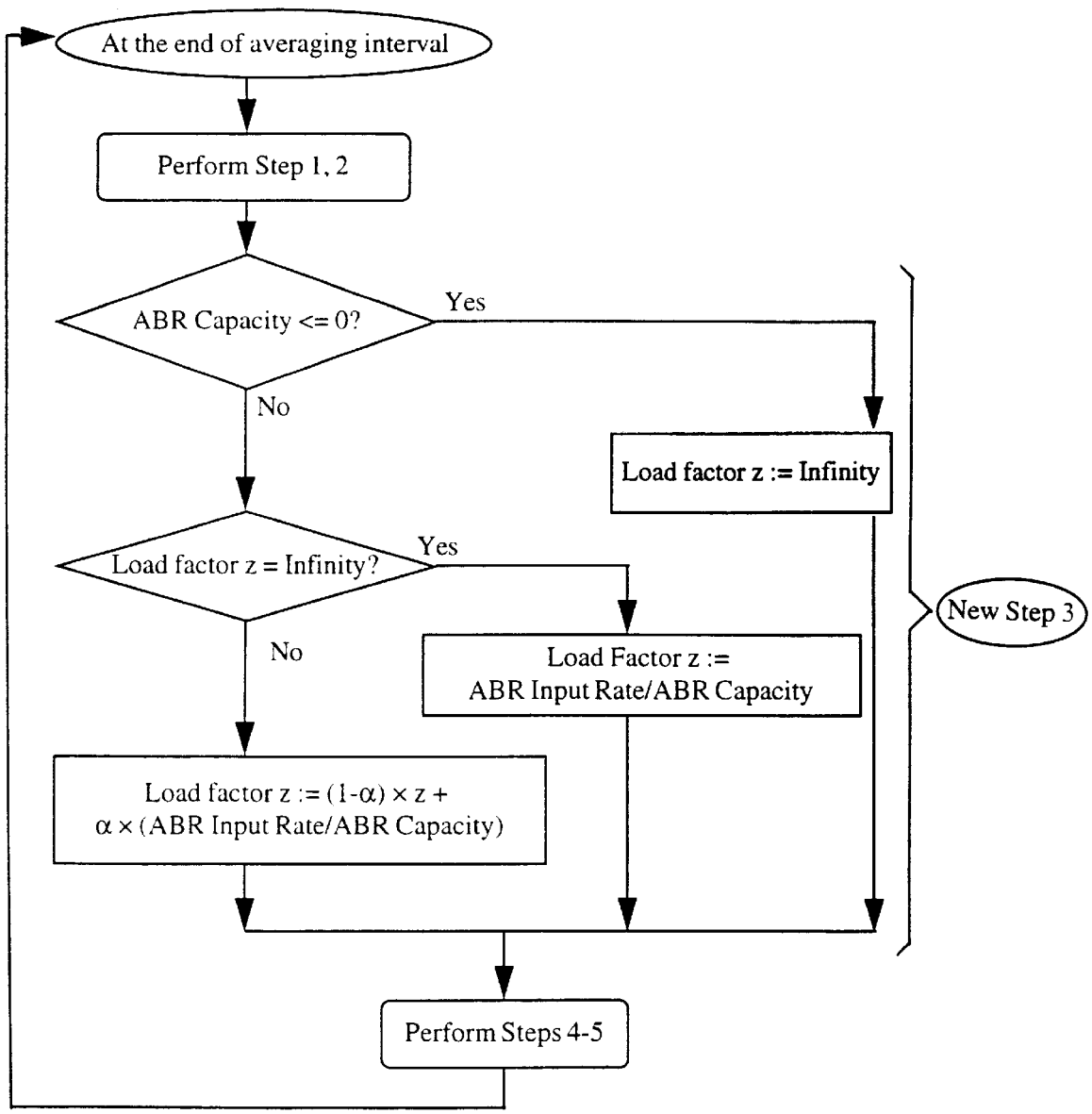
FIG. 16 and 17 are flow charts representing a variation of the basic scheme—exponential averaging of load factor.
Figure 17:
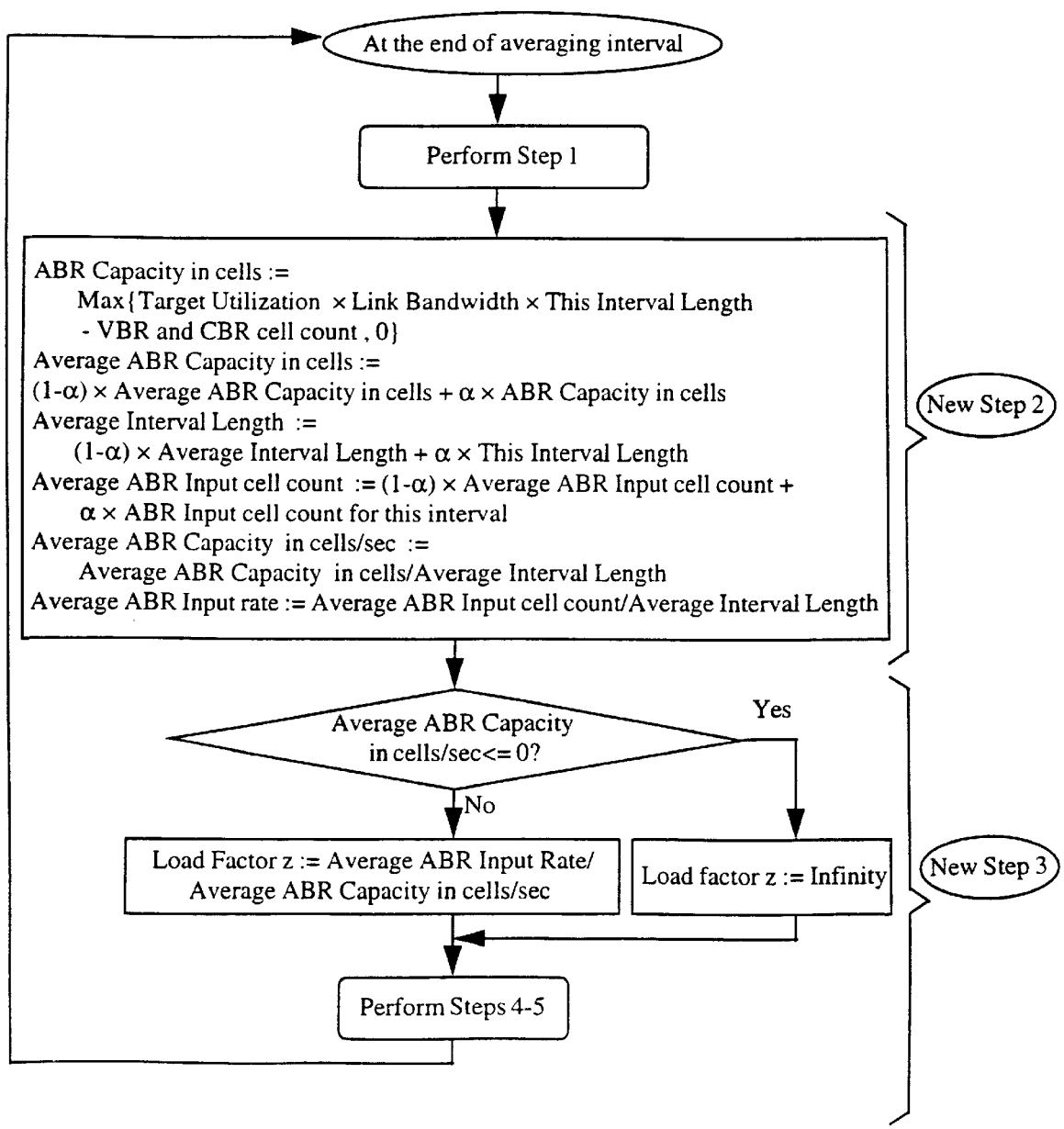
Figure 18A:
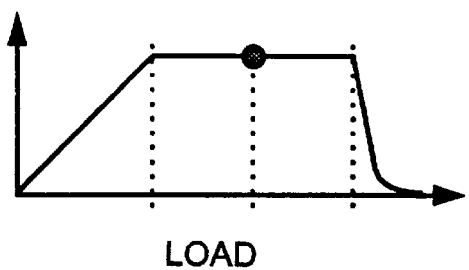
FIG. 18A is a graphical representation of throughput versus load in a queue control network.
Figure 18C:
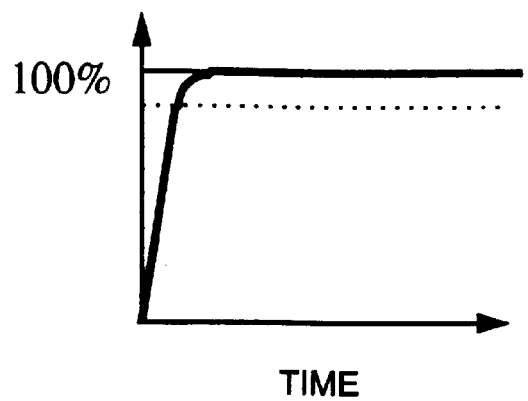
FIG. 18C is a graphical representation of link utilization versus time in a queue control network.
Figure 18B:
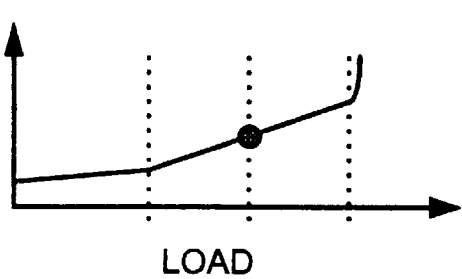
FIG. 18B is a graphical representation of delay versus load in a queue control network.
Figure 18D:
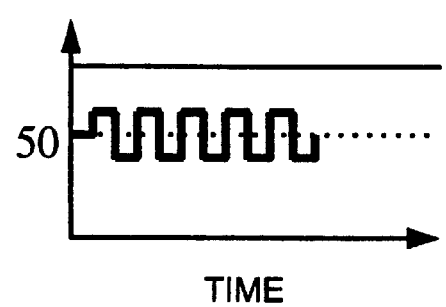
FIG. 18D is a graphical representation of queue length versus time in a queue control network.

FIGS. 16 and 17 show alternate methods for exponential averaging of the load factor.

Time+Count Based Averaging

The overload factor, available ABR capacity and the number of active sources need to be measured periodically. There is a need for an interval at the end of which the switch renews these quantities for each output port. The length of this interval determines the accuracy and the variance of the measured quantities. As mentioned before, longer intervals provide lower variance but result in slower updating of information. Alternatively, shorter intervals allow fast response but introduce greater variance in the response. This section proposes alternative intervals for averaging the quantities.

The averaging interval can be set as the time required to receive a fixed number of ABR cells (M) at the switch in the forward direction. While this definition is sufficient to correctly measure the load factor and the ABR capacity at the switch, it is not sufficient to measure the number of active VCs (N) or the CCR per VC accurately. This is because the quantities N and CCR depend upon the fact that at least one cell from the VC is encountered in the averaging interval. Moreover, when the rates are low, the time to receive M cells may be large. Hence the feedback in the reverse direction may be delayed.

An alternative way of averaging the quantities is by a fixed time interval, T. This ensures that any source sending at a rate greater than (one cell/T) will be encountered in the averaging interval. This interval is independent of the number of sources, but is dependent upon the minimum rate of the source. In addition to this, if the aggregate input rate is low, the fixed-time interval is smaller than the fixed-cells interval. However, when there is an overload, the fixed-cells interval provides faster response.

One way of combining these two kinds of intervals is to use the minimum of the fixed-cell interval and the fixed-time interval. This combination ensures quick response for both overload and underload conditions. But it still suffers from the disadvantages of a fixed-cell interval, where N and per-VC CCR cannot be measured accurately.

Another strategy for overcoming this limitation is to measure N and per-VC CCR over a fixed-time interval, and the capacity and load factor over the minimum of the fixed-cell and fixed-time interval. The time intervals can be different as long as some correlation exists between the quantities measured over the different intervals. Typically, the intervals to measure CCR and N would be larger to get more stable estimates.

A limitation of this strategy is that a sudden increase in the number of sources, N, or the measured CCRs cannot be sensed quickly. If we aim at allocating rates conservatively, the increase in CCRs does not pose a problem because we will use a smaller value of CCR in the ERICA formula, and give a smaller rate allocation. Rate increase will occur as soon as the fixed-time averaging interval yields a new value. However, the sudden increase in number of active sources (N) is of concern, since the allocation is inversely proportional to N. A smaller N may result in a larger allocation to all the sources and subsequent overload until the new value of N is calculated.

Scheduling of ABR and VBR

Since the switches provide multiple classes of service, they maintain multiple queues. The key question is how cells in these different queues are serviced. In this section, we describe a scheduling policy which allows the implementor (or user) to allocate "soft" percentages of link capacity for various classes. These allocations are soft in the sense that if one class does not use its allocation, it is automatically passed on to the other class(es).

For example, in the case of a simple two class (VBR and ABR) system, an implementor could decide to give VBR a maximum of 90% and ABR a minimum of 10% bandwidth. If total VBR load is only 20%, ABR gets the remaining 80%. On the other hand if VBR input rate is 110% and ABR input rate is 15%, VBR gets only 90% and ABR gets 10%. If VBR and ABR are 110% and 5%, VBR gets 95% and ABR gets 5%.

Notice that no class is starved and no bandwidth is wasted.

The idea can be easily extended to any number of classes. The pseudocode for a two-class system is given below. In the pseudo-code the following variables are used:

```
afrac = Minimum Fraction desired for ABR
vfrac = Maximum Fraction desired for VBR
(afrac ABR cells are transmitted for every vfrac VBR
cells)
    acredit = Current credit for ABR traffic
    vcredit = Current credit for VBR traffic
    (In general, the traffic with higher credit is
serviced next.)
        aqueue = Number cells in the ABR queue
        vqueue = Number cells in the VBR queue
        acount = Number of ABR cells served
        vcount = Number of VBR cells served
```

The pseudo code is as follows:

```
Initialization
vfrac, afrac = preassigned bandwidth fractions
vcredit = vfrac, acredit = afrac.
Algorithm
For each slot time do
    IF vcredit >= acredit THEN
        IF VBR Queue is Non-empty THEN
            Schedule VBR Cell
            If ABR Queue is Non-empty THEN
                vcredit := vcredit − 1
                vcredit := vcredit + vfrac
                acredit := acredit + afrac
            ENDIF
        ELSIF ABR Queue is Non-empty THEN
            Schedule ABR Cell
        ENDIF
    ELSE
        IF ABR Queue is Non-empty THEN
            Schedule ABR Cell
            If VBR Queue is Non-empty THEN
                acredit := acredit − 1
                acredit := acredit + afrac
                vcredit := vcredit + vfrac
            ENDIF
        ELSIF VBR Queue is Non-empty THEN
            Schedule VBR Cell
        ENDIF
    ENDIF
ENDFOR
```

Figure 41:
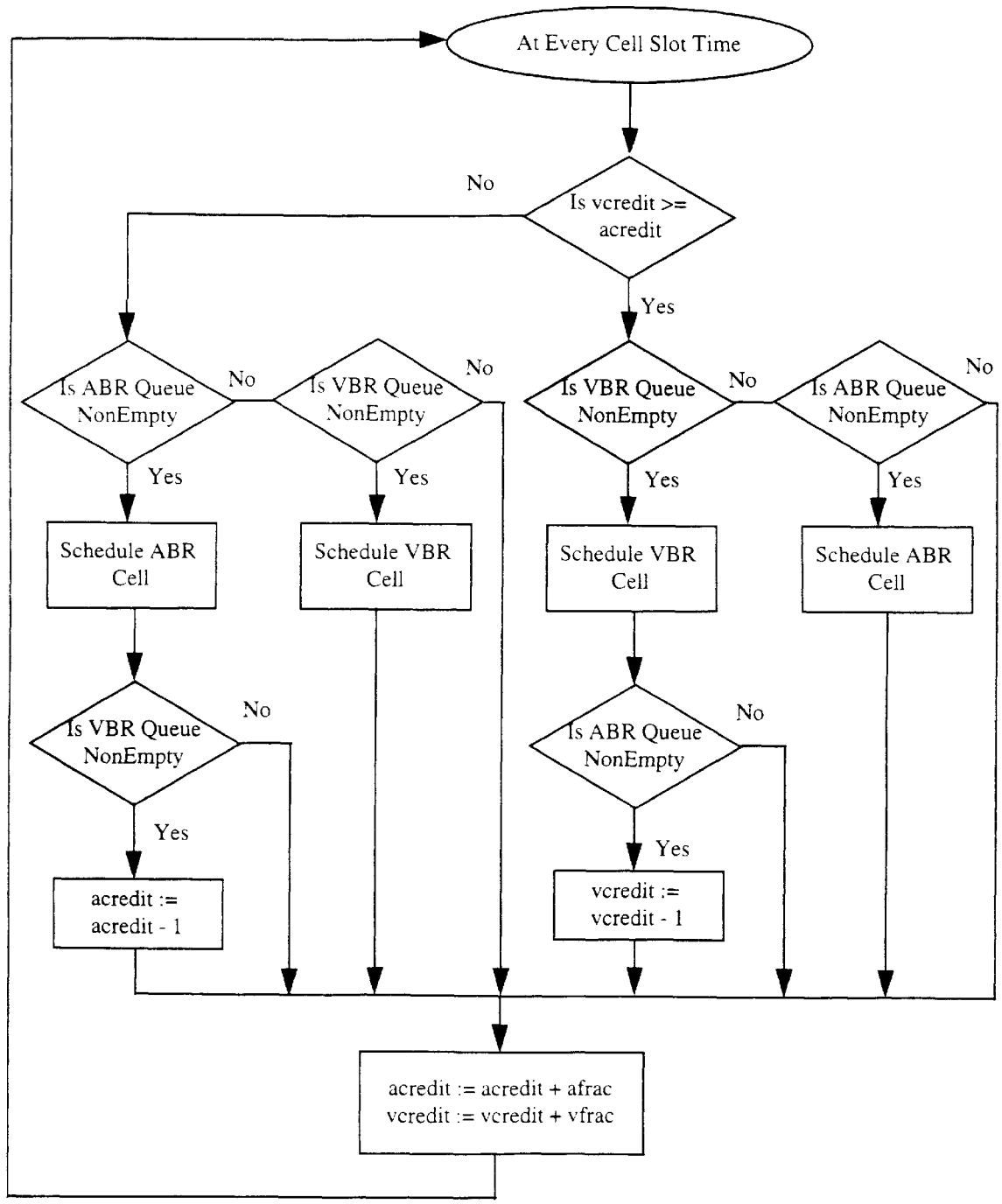

Referring to FIG. 41, the flow chart for 2-class scheduling is shown. As illustrated, at every time slot, a determination of whether vcredit is greater than or equal to acredit is made. Subsequent determinations are made on queue status before allocations of link capacity are made.

Queue length as a Secondary Metric

ERICA depends upon the measurement of metrics like the overload factor, and the number of active ABR sources. If there is a high error in the measurement, and the target utilization is set to very high values, ERICA may diverge, i.e., the queues may become unbounded, and the capacity allocated to drain the queues becomes insufficient. The solution, under such cases is to set the target utilization to a smaller value, allowing more bandwidth to drain queues. However, steady state utilization (utilization when there is no overload) is reduced because it depends upon the target utilization parameter.

One simple enhancement to ERICA is to have a queue threshold, and reduce the target utilization if the queue is greater than the threshold. Once the target utilization is low, the queues are drained out quickly. Hence, this enhancement maintains high utilization when the queues are small, and drains out queues quickly when they become large. Essentially, we are using the queue length as a secondary metric (input rate is the primary metric).

In other schemes queue length or queue delay were not considered as a possible metric. In fact, they were rejected, because it was felt they gave no indication of the correct rates of the sources. The correct rate assignments depend upon the aggregate input rate, rather than the queue length.

However, two facts about queues are important: a) non-zero queues imply 100% utilization, and, b) a system with very long queues is far away from the intended operating point. Hence in this embodiment, if the input rates are low and the queues are long, we recognize the need to reserve more capacity to drain the queues and allocate rates conservatively until the queues are under control. Further, keeping in line with the design principles of OSU scheme and ERICA, we use continuous functions of the queue length, rather than discontinuous functions. Since feedback to sources is likely to be regular (as long as queues last), the allocations due to a continuous function, in successive averaging intervals track the behavior of the queue, and reflect it in the rate allocations.

100% Utilization and Quick Drain of Queues

ERICA achieves high utilization in the steady state, but utilization is limited by the target utilization parameter. For expensive links, it is desirable to keep the steady state utilization at 100%. This is because a link being able to service 5% more cells can translate into 5% more revenue. The way to get 100% utilization in steady state, and quick draining of queues is to vary the target ABR rate dynamically. During steady state target ABR rate is 100% while it is lower during transient overloads. Higher overloads result in even lower target rates (thereby draining the queues faster).

In other words:

Target Rate =fn(queue length, link rate, VBR rate)

The "fn" above has to be a decreasing function of queue length.

Note that ERICA has a fixed target utilization, which means that the drain rate is independent of the queue size.

Maintain a "Pocket" of Queues

One feature of ABR is that its capacity varies dynamically, due to the presence of higher priority classes (CBR and VBR). Hence, if the higher priority classes are absent for a short interval (which may be smaller than the feedback delay), the remaining capacity is not utilized. In such situations, it useful to have a "pocket" full of ABR cells which use the available capacity while the RM cells are taking the "good news" to the sources and asking them to increase their rates.

One way to achieve this effect is to control the queues to a "target queue length." In the steady state, the link is 100% utilized, and the queue length is equal to the target queue length, which is the "pocket" of queues we desire. If the queue length falls below this value, the sources are encouraged to increase their rate and vice versa. In other words:

Target rate=fn(queue length, target queue length, Link rate, VBR rate)

Scalability to Various Link Speeds

The above function is not scalable to various link speeds because, queue length measured in cells translates to different drain times for different transmission speeds. For example, a queue length of 5 at a Ti link may be considered large while a queue length of 50 at an OC-3 link may be considered small. This point is significant due to varying nature of ABR capacity, especially in the presence of VBR sources.

To achieve scalability, we need to measure all queue lengths in units of time rather than cells. However, the queue is only directly measurable quantity at the switch. The queueing delay is then estimated using the measured ABR capacity value.

Hence the above function for target rate becomes:

Target Rate=fn(queue delay, target queue delay, Link Rate, VBR Rate)

There are two problems to be faced before reaching the new set of goals. First, there is a tradeoff in maintaining high utilization and low end-to-end delay in steady state. An additional dimension is added to this tradeoff when we want good transient performance from underload and overload conditions. The optimal operating point may now be shifted from the knee of the throughput-delay curve for these considerations.

Second, due to non zero feedback delays, the effect of the switch feedback in a cycle is observed only in the next cycle. If a larger fraction of link capacity is allocated for queue drain, then lesser capacity is allocated to the sources. This manifests as an underload in the next cycle and accelerates the process of queue drain. However, if the cycle length is large, then queues may quickly drop to zero and utilization drops to the input load level.

We also note that end-to-end delay is affected by queueing, propagation, transmission, switching and processing delays. Of these, the propagation, switching and processing delays are constant. The transmission delay is variable depending on VBR load. Therefore, any scheme must control the queueing delay to influence the end-to-end delay characteristics.

Target Operating Point of ERICA+

Queue Control for Congestion Avoidance ("ERICA+") uses a new target operating point, as shown in FIGS. 18A–D. The new target operating point has 100% utilization and a fixed non-zero queueing delay. This point differs from the knee point (congestion avoidance: 100% throughput, minimum delay) in that it has a fixed non-zero delay goal. This is due to non-zero queueing delay at the operating point. Note that the utilization remains 100% as long as the queue is non-zero. The utilization remains at 100% even if there are short transient underloads, or the output capacity increases (appearing as an underload).

We note that, non-zero queue values in steady state implies that the system is in an unstable equilibrium. Queues grow immediately during transient overloads. In contrast, the ERICA and OSU schemes could allow small load increases (5 to 10%) without queue length increases.

The challenge of ERICA+ is to maintain the unstable equilibrium of non-zero queues and 100% utilization. Specifically, when the queueing delay drops below the target value, T0, ERICA+ increases allocation of VCs to reach the optimum delay. Similarly, when the queueing delay increases beyond T0, the allocation to VCs is reduced and the additional capacity is used for queue drain in the next cycle. When the queueing delay is T0, 100% of the ABR capacity is allocated to the VCs.

ERICA+ hence, introduces a new parameter, T0 in place of the target utilization parameter of ERICA.

The ERICA+ Switch Scheme

As mentioned before, the ERICA+ scheme is a modification of the ERICA scheme. In addition to the suggested scheduling method between VBR and ABR classes, the following are the changes to ERICA.

1. The link utilization is no longer targeted at a constant Target Utilization as in ERICA and OSU schemes. Instead, the total ABR capacity is measured given the link capacity and the VBR bandwidth used in that interval.

Total ABR Capacity+VBR Capacity=Link Capacity

2. The target ABR capacity is a fraction of the total ABR capacity and this fraction is a function of the queueing delay $T_q$ at the switch.

Total ABR Capacity=$f(T_q)$ X Total ABR Capacity

This function must satisfy the following constraints:

1. It must have a value greater than or equal to 1 when the queuing delay, $T_q$ is 0 (zero queues). This allows the queues to increase and $T_q$ can go up to T0, the threshold value. A simple choice is to keep the value equal to one. The queue increases due to the slight errors in measurement. Another alternative is to have a linear function, with a small slope. Note that we should not use an aggressive increase function. Since queueing delay is a highly variant quantity, a small variance in delay values may cause large changes in rate allocations, and hence lead to instability.

2. It must have a value less than 1 when the queuing delay, $T_q$ is greater than T0. This forces the queues to decrease and $T_q$ can go down to T0. Since queue increases are due to traffic bursts, a more aggressive control policy is required for this case compared to the former case where we project a higher capacity than available. Since we project a lower capacity than what is available, the remaining capacity is used to drain the queues.

3. If the queues grow unboundedly, then we would like the function to go to zero. Since zero, or very low ABR capacity is unacceptable, we place a cutoff on the capacity allocated to queue drain. The cutoff is characterized by a parameter, called the queue drain limit factor (QDLF). A value of 0.5 for QDLF parameter is sufficient in practice.

4. When the queueing delay, $T_q$ is T0 we want $f(T_q)=1$.

Figure 19:
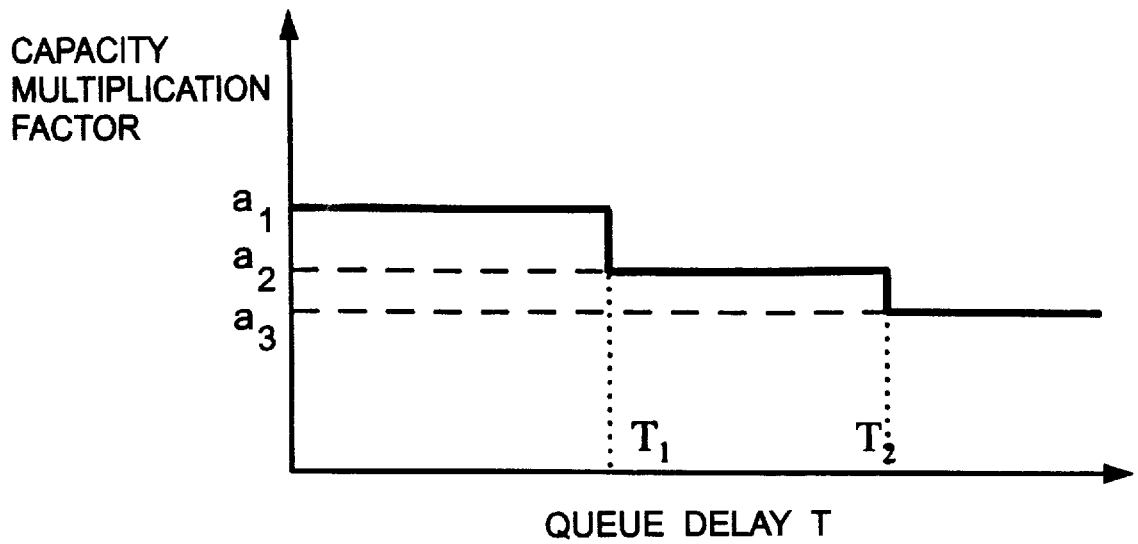
FIG. 19 illustrates step functions for queue control.
Figure 20:
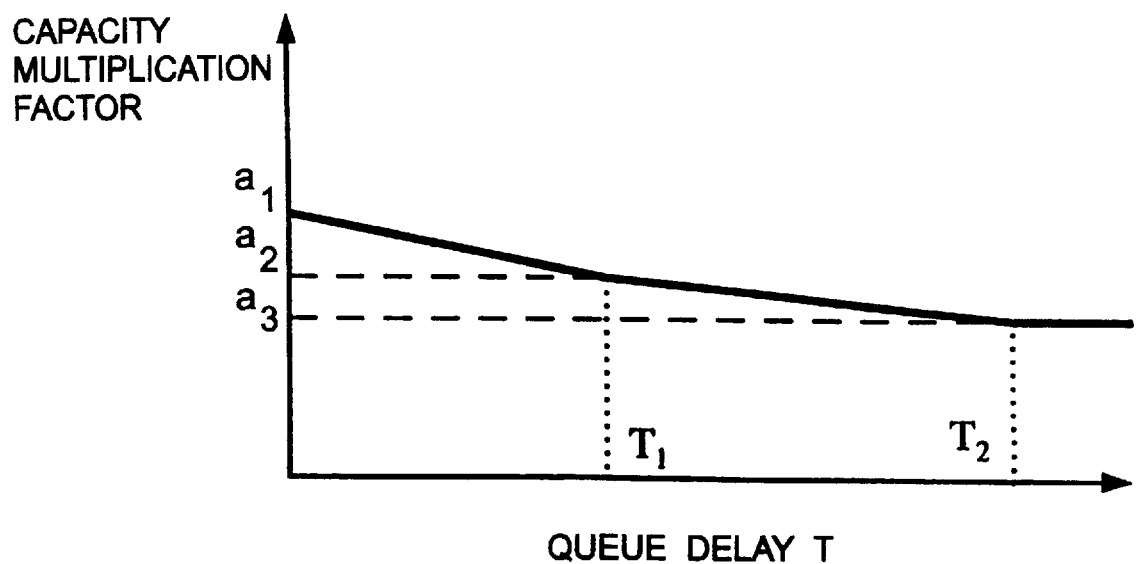
FIG. 20 illustrates linear functions for queue control.
Figure 21:
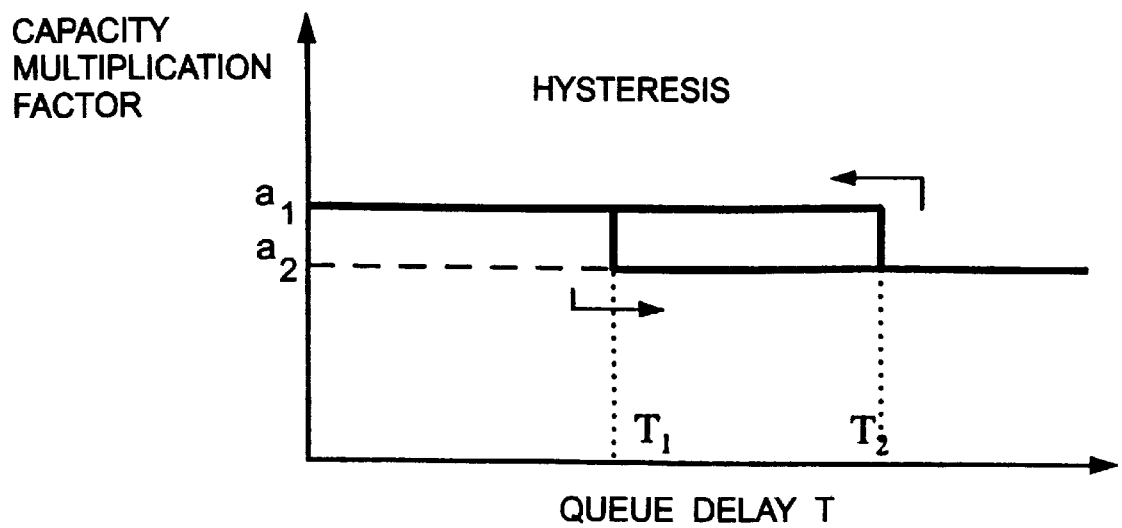
FIG. 21 illustrates hysteresis functions for queue control.

A step function which reduces the capacity in steps (down to the cutoff value) as the queueing delay exceeds thresholds is a possible choice. This is shown in FIG. 19. Linear segments as shown in FIG. 20 can be used in place of step functions. Hysteresis thresholds FIG. 21 can be used in place of using a single threshold to increase and decrease the capacity. Hysteresis implies that we use one threshold to increase the capacity and another to decrease the capacity. However, these functions require the use of multiple thresholds (multiple parameters). Further, the thresholds are points of discontinuity, i.e., the feedback given to the source will be very different if the system is on the opposite sides of the threshold.

However, it is possible to have a function with just 2 parameters, one for the two ranges: (0, Q0) and (Q0, infinity) respectively. The rectangular hyperbolic and the negative exponential functions are good choices to provide the aggressive control required when the queues grow. We choose the former which is the simpler of the two.

Since the portion T<T0 requires milder control, we can have a different hyperbola for that region. This requires an extra parameter for this region.

The queue control scheme uses a time (queueing delay) as a threshold value. Hence, depending upon the available capacity at the moment, this value T0 translates into a queue length Q0, as follows:

Q0=Total ABR Capacity×T0

Figure 22:
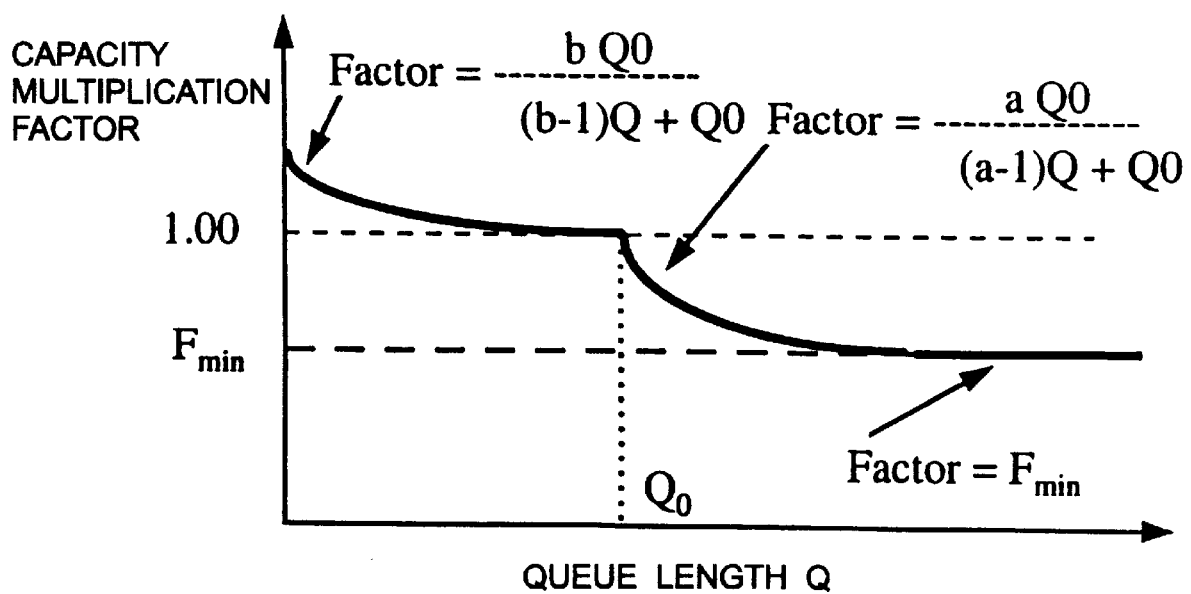
FIG. 22 illustrates a queue control function.

In the following discussion, we will refer to Q0 and queues alone, but Q0 is a variable dependent upon available capacity. The fixed parameter is T0. The queue control function, as shown in FIG. 22, is:

$$f(T_q) = \frac{a \times Q0}{(a-1) \times q + Q0} \text{ for } q > Q0$$

and, $$f(T_g) = \frac{b \times Q0}{(b-1) \times q + Q0} \text{ for } 0 \leq q \leq Q0$$

Note that $f(T_q)$ is a number between 1 and 0 in the range Q0 to infinity and between b and 1 in the range 0 to Q0. Both curves intersect at Q0, where the value is 1. These are simple rectangular hyperbolas which assume a value 1 at Q0.

This function is lower bounded by the queue drain limit factor (QDLF):

$$f(T_g) = \text{Max}\left( QDLF, \frac{a \times Q0}{(a-1) \times q + Q0} \right) \text{ for } q > Q0$$

Effect of Variance

ERICA+ calculates the target ABR capacity, which is the product of $f(T_q)$ and the ABR capacity. Now, both of these quantities are variant quantities (random variables), and the product of two random variables (say, A and B) results in a random variable (say, C) which has more variance either A or B. Feedback becomes less reliable as the variance increases.

For example, overload depends upon the ABR Capacity and is used in the formula to achieve max-min fairness. Since the ERICA+ algorithm changes the ABR Capacity depending upon the queue lengths, this formula needs to tolerate minor changes in overload factor. In fact, the formula applies hysteresis to eliminate the variance due to overload factor. Since, techniques like hysteresis and averaging can tolerate only a small amount of variance, we need to understand and reduce the variance in the target ABR capacity.

We examine the ABR capacity term first. ABR capacity is estimated over the averaging interval of ERICA. A simple estimation process is to count the VBR cells sent, calculate the VBR capacity, and subtract it from the link capacity. This process may have an error of one VBR cell divided by the averaging interval length. The error can be minimized by choosing longer averaging intervals.

We note, however, that measured ABR capacity has lesser variance than instantaneous queue lengths. This follows because, averages of samples have lesser variance than the samples themselves, and ABR capacity is averaged over an interval, whereas queue length is not. Note that, the quantity Q0=T0 x ABR Capacity has the same order of variance as that of the measured ABR capacity.

We now examine the function, $f(T_q)$. This function is bounded below by QDLF and above by b. Hence, its values lie in the range (QDLF, b) or in practice, in the range, (0.5, 1.05). Further, it has variance because it depends upon the queue length, q and the quantity Q0. Since the function includes a ratio of Q0 and q, it has higher variance than both quantities.

One way to reduce the variance is to use an averaged value of queue length (q), instead of the instantaneous queue length. A simple average is the mean of the queue lengths at the beginning and the end of a measurement interval. This is sufficient for small averaging intervals. If the averaging interval is long, a better average can be obtained by sampling the queue lengths during the interval and taking the average of the samples. Sampling of queues can be done in the background.

Another way to reduce variance is specify a constant Q0. This can be specified instead of specifying T0 if a target delay in the range of [Q0÷Minimum ABR capacity, Q0÷Maximum ABR capacity] is acceptable.

Parameters

Most congestion control schemes provide the network administrator with a number of parameters that can be set to adapt the behavior of the schemes to their needs. A good scheme must provide a small number of parameters that offer the desired level of control. These parameters should be relatively insensitive to minor changes in network characteristics.

ERICA provides a few parameters which are easy to set because the tradeoffs between their values are well understood. The simulation results have shown that slight mistuning of parameters does not significantly degrade the performance of the scheme. Two parameters are provided: the Target Utilization (U) and the Switch Measurement Interval.

The Target Utilization determines the link utilization during steady state conditions. If the input rate is greater than Target Utilization x Link Capacity, then the switch asks sources to decrease their rates to bring the total input rate to the desired fraction. If queues are present in the switch due to transient overloads, then (1−U) x Link Capacity is used to drain the queues. The network administrator is free to set the values of Target Utilization as desired.

Excessively high values of Target Utilization are undesirable because they lead to long queues and packet loss, while low Target Utilization values lead to link underutilization. The effectiveness of the value of Target Utilization depends on the feedback delay of the network. Transient overloads can potentially result in longer queues for networks with longer feedback delays. Due to this, smaller Target Utilization values are more desirable for networks with long propagation delays.

Our simulation results have determined that ideal values of Target Utilization are 0.95 and 0.9 for LANs and WANs respectively. Smaller values improve the performance of the scheme when the traffic is expected to be highly bursty.

The Switch Measurement Interval determines the accuracy of feedback. This interval is used to measure the load level, link capacity and the number of active VCs for an outgoing link. The length of the measurement interval establishes a tradeoff between accuracy and steady state performance.

The queue control function in ERICA+ has four parameters: T0, a, b, and QDLF.

The function $f(T_q)$ has three segments: a hyperbola characterized by the parameter b (called the b-hyperbola henceforth) between queueing delay of zero and To, another hyperbola characterized by the paramter a (called the a-hyperbola) from a queueing delay of T0 till $f(T_q)$ equals QDLF, and QDLF henceforth. Hence, the range of the function $f(T_q)$ is [QDLF, B].

Parameters a and b

Note that a and b are the intercepts of the a-hyperbola and b-hyperbola, i.e., the value of $f(T_q)$ when q=0. b determines how much excess capacity would be allocated when the queueing delay is zero. a and b also determine the slope of the hyperbola, or, in other words, the rate at which $f(T_q)$ drops as a function of queueing delay. Larger values of a and b make the scheme very sensitive to the queueing delay, whereas, smaller values increase the time required to reach the desired operating point.

The parameter b is typically smaller than a. b determines the amount of over-allocation required to reach the target delay T0 quickly in the steady state. Any small over-allocation above 100% of ABR capacity is sufficient for this purpose. The parameter a primarily determines how quickly the function $f(T_q)$ drops as a function of queueing delay. a should not be very different from b because, this can result in widely different allocations when the delay slightly differs from T0. At the same time, a should be high enough control the queues quickly.

Through simulation, we find that the values 1.15 and 1.05 for a and b respectively work well for all the workloads with which we have experimented. Hence, at zero queues, we over-allocate up to 5% excess capacity to get the queues up to Q0. Higher values of b would allow sources to overload to a higher extent. This can aggravate transient overloads and result in higher queue spikes. Using a value of 1 for b is also acceptable, but the "pocket" of queues builds up very slowly in this case. Further, these parameters values for a and b are relatively independent of T0 or QDLF. Given these values for a and b, the function depends primarily on the choice of T0 and QDLF.

Parameter T0

When the function $f(T_q)$ is one of the two hyperbolas, its slope (df/dq) is inversely proportional to the parameter T0. For a constant value of a, larger T0 reduces the slope of the function, and hence its effectiveness. The queueing delay required to reduce the ABR capacity by a fixed fraction is directly proportional to T0. It is also directly proportional to the ABR capacity. Hence, if the ABR capacity is high (as is the case in OC-3 and higher speed networks), the queues need to build up to a large value before the drain capacity is sufficient. Hence, the maximum value of T0 depends upon and how fast the transient queues need to be cleared.

The maximum value of To also depends on the buffer size at the switch, and must be set to allow the control of the queues before the buffer limit is reached. One strategy is to keep the buffer size at least the sum of the feedback delay and 8*T0 (assuming a =1.15 and QDLF =0.5, and ABR capacity is constant, and other factors like measurement interval length are negligible). One feedback delay is enough for the feedback to reach the sources and 8*T0 is enough for the function to reach QDLF. For other values of QDLF, the recommended buffer size is:

$$\frac{(a - QDLF) * T0}{[(a - 1) * QDLF]}$$

The maximum value of T0 can be calculated reversing the above formula, given the buffer size.

$$T0 = \frac{[(a - 1) * QDLF]}{(a - QDLF)}$$

A minimum value of To is also desired for stable operation. If T0 is very small, the function $f(T_q)$ can traverse the range [QDLF, B] in a time

[(a−QDLF) * T0]/[(a-1) * QDLF], assuming that capacity is constant over this period of time. This time can be shorter than the feedback delay, and lead to undesired oscillations in rates and queues. This is because the function changes from b to QDLF before feedback is effective. Such a behavior is undesired because, the scheme now is very sensitive to the changes in queue length. Recall that queue length is only a secondary metric, i.e., we want the input rate and not the queue length to be the primary metric of congestion. Further, the minimum T0 is the at least the "pocket" of queues desired. For WANs, To is at least [(a−1)*QDLF]/[(aQDLF] of the feedback delay, which is ⅛, assuming a =1.15, QDLF =0.5. For LANs we set T0 at least to one feedback delay, to reduce the sensitivity of the ABR capacity on small queue lengths.

This fraction is roughly the time required to drain the queues of ABR capacity times T0 at a rate 1−QDLF times ABR Capacity, divided by the feedback delay. Note that the feedback delay can roughly be estimated as the round trip time of the longest VC passing through the switch.

Parameter ODLF

QDLF ensures that there is enough drain capacity to drain out the transient queues. We recommend a value of 0.5 for WAN switches and 0.8 for LAN switches.

WAN switches need to have greater drain capacity because of the longer feedback delays of its VCs and consequently longer response times to transient overloads. If the fluctuations in load or capacity are of a time-scale much smaller than the feedback delay, the rate allocations using a high target rate may not be sufficient. Transient queues may build up in such cases unless there is sufficient capacity allocated to drain the queues. An example of such high variance workload is TCP traffic combined with a VBR load which has an ON-OFF period of 1 ms, whereas the feedback delay is 10 ms.

However, for LAN switches which can receive feedback rapidly, and T0 is small, the function can move quickly through the range [QDLF, B]. Given these conditions, a large drain capacity is not required, since large queues never build up. For such configurations, QDLF can have higher values like 0.8.

Since the QDLF parameter defines the lower bound of the function $f(T_q)$, we should ensure that this value is reached only for large queue values. This can be achieved by choosing small values for a, or large values for T0. Since large values of T0 reduce the effectiveness of the function $f(T_q)$, the parameter a is chosen small. This is another factor in the choice of a. It turns out that the recommended value 1.15 is small enough for the QDLF values recommended.

Figure 23:
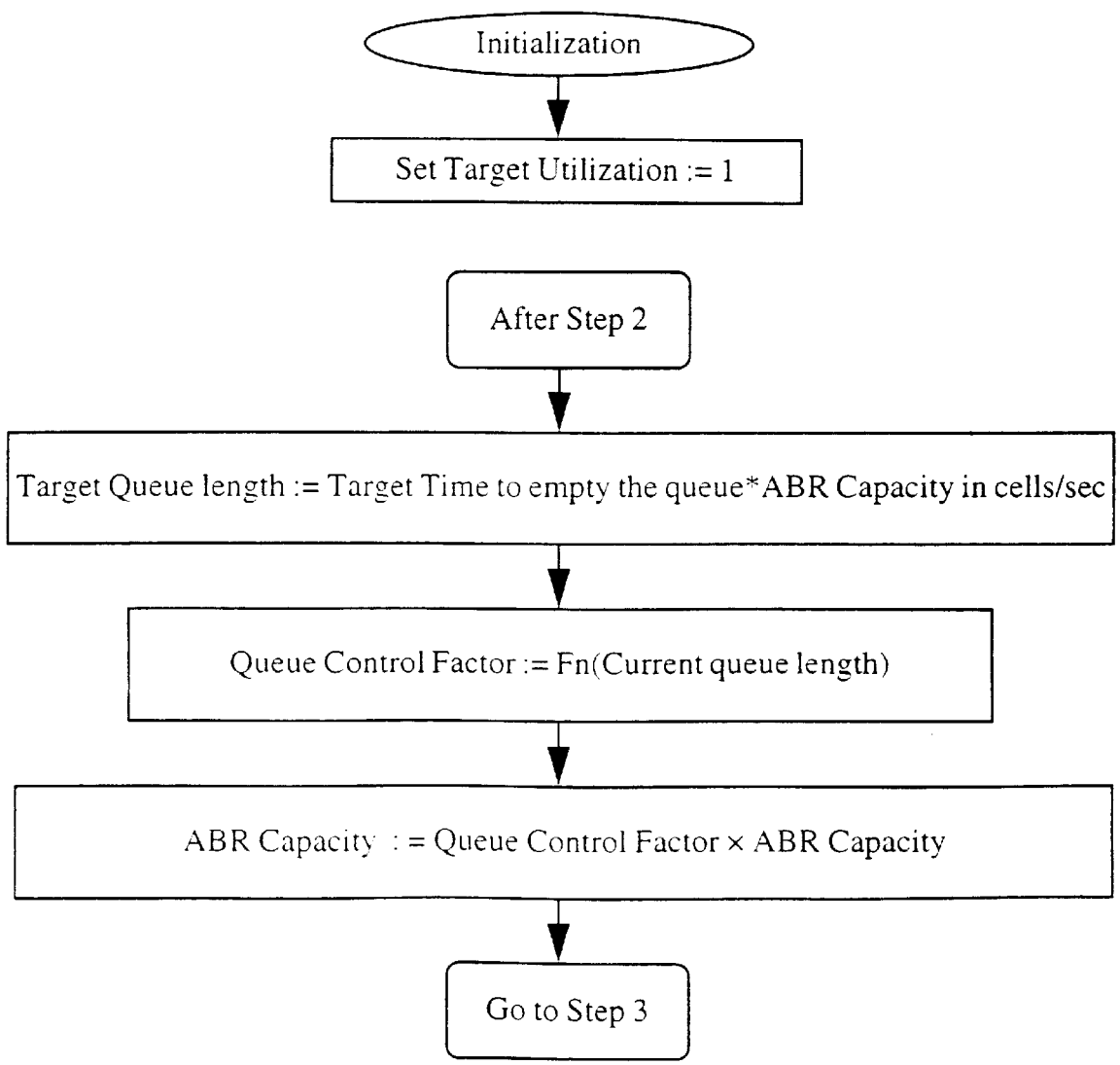
FIG. 23 is a flow chart representing a variation of the basic scheme—queue control option.

Thus, referring to FIG. 23, when queue control (or ERICA+) is used, the system is initialized to set target utilization to one and, after Step 2, the target queue length, the queue control factor and the ABR capacity are calculated. Step 3 is then executed.

Measurement Errors and Sensitivity

ERICA depends upon four quantities: the Current Cell Rate (CCR), the load factor, the available ABR capacity and the number of active sources. The last three of these quantities are measured quantities. If the measurement is erroneous, the calculated rates may not be accurate. This section discusses the sensitivity of the scheme to errors in measurement, and proposes some enhancements to the simple measurement techniques proposed earlier.

ERICA measures the required quantities over an averaging interval and uses the measured quantities to calculate the feedback in the next averaging interval. Averaging helps smooth out the variance in the measurements. However, the length of the averaging interval limits the amount of variance which can be eliminated. It also determines how quickly the feedback can be given to the sources, because ERICA gives at most one feedback per source per averaging interval. Longer intervals produce better averages, but slow down the rate of feedback. Shorter intervals may result in more variance in measurements, and may consistently underestimate the measured quantities.

ERICA assumes the correlation of the measured quantities. The measurement process must maintain this correlation between measured quantities. For example, if the different quantities are measured over different intervals, their correlation is lost.

The load factor and available capacity are random variables whose variance depends on the length of the averaging interval. In practice, the interval required to measure the number of active sources is sufficient for the measurement of the load factor and available capacity. Both of these averaged quantities are fairly accurate, with an error margin of (one cell/averaging interval). Setting the target utilization below 100% helps drain queues due to errors in measurement of all the quantities. Whenever the scheme faces tradeoffs due to high errors in measurement, the degree of freedom is to reduce the target utilization parameter, sacrificing some steady state utilization for convergence.

Performance Evaluation

ERICA has been tested for a variety of networking configurations using several performance metrics. Its performance in the presence of VBR sources and variable demand sources has also been examined. Simulation results for several configurations, which have been specifically selected to demonstrate particular aspects of the scheme, are presented below. Simple configurations are presented because they are more instructive in finding problems. The results are presented in the form of four graphs for each configuration:

1. Graph of Rate versus Time for each source;
2. Graph of ABR Queue lengths versus Time at each switch;
3. Graph of Link Utilization versus Time for each link;
4. Graph of Cells Received at Destination versus Time for each destination Default Settings The following parameter values are assumed:
1. All links have a bandwidth of 155.52 Mbps.
2. LAN links are 1 Km long and WAN links are 1000 Km long.
3. All sources, including VBR sources are deterministic, i.e., their start/stop times and their transmission rates are known. The bursty traffic sources send data in bursts, where each burst starts after a request has been received from the client.

One Source Configuration

Figure 24:
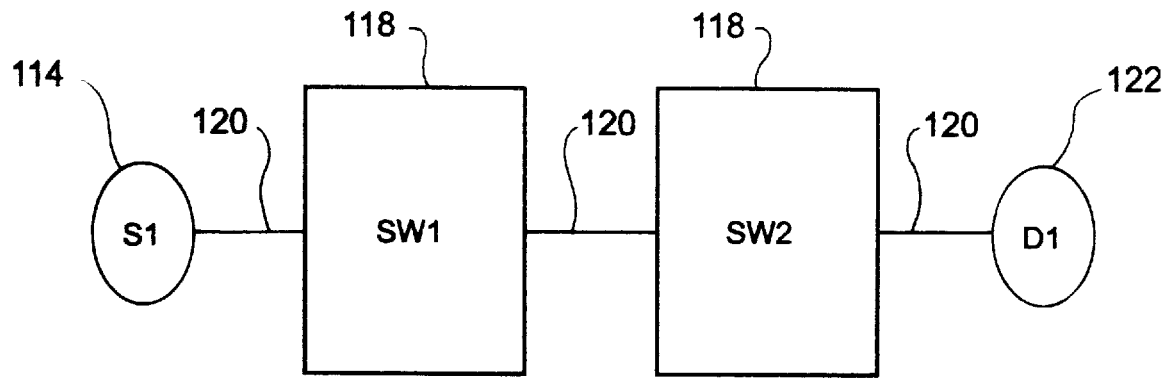
FIG. 24 illustrates a one source configuration for ERICA.

FIG. 24 illustrates a basic configuration where a single source 114 is active over the entire simulation period. FIGS. 25A–D illustrates the configuration, and FIGS. 25A–D show that the source rate rises to almost fully utilize the link.

Two Source Configuration

Figure 26:
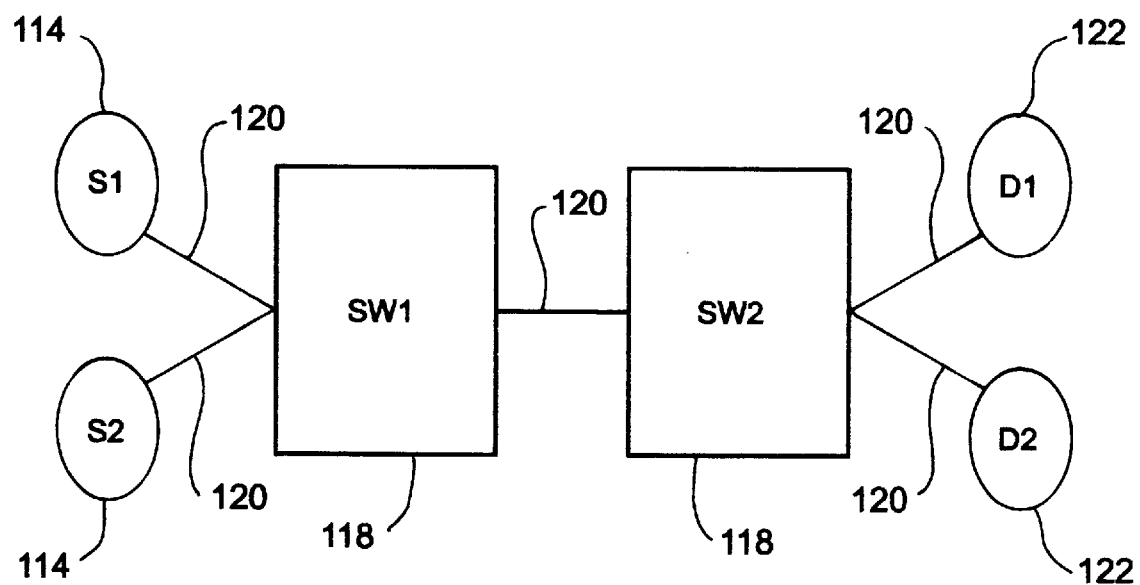
FIG. 26 illustrates a two source configuration for ERICA.
Figure 25A:
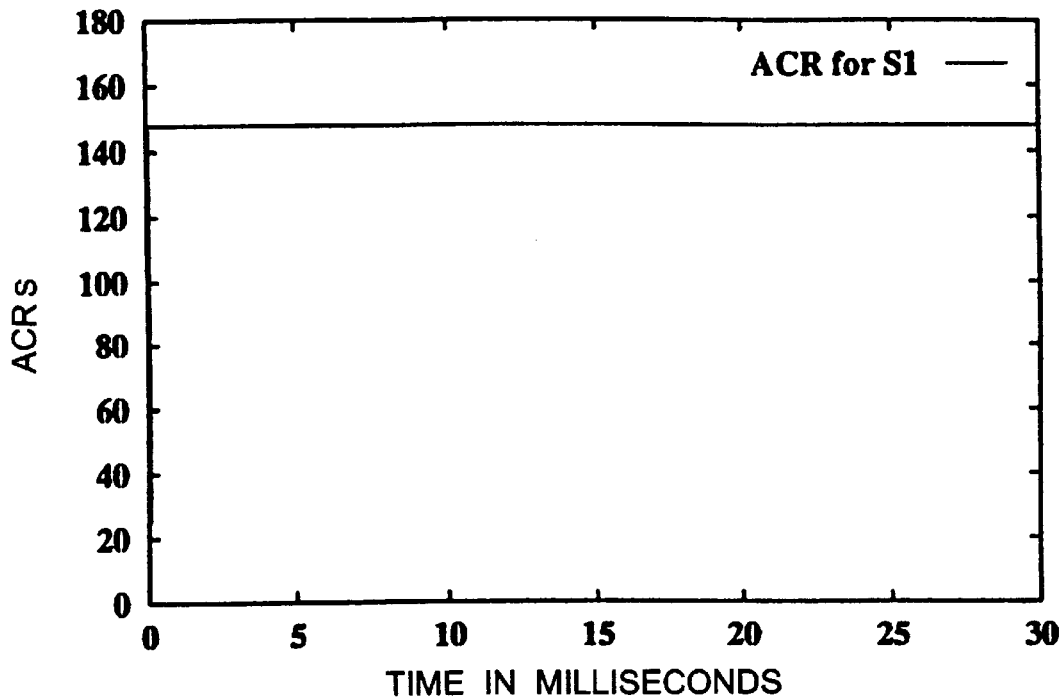
FIG. 25A is a graphical representation of the transmitted cell rate for the configuration of FIG. 24.
Figure 25B:
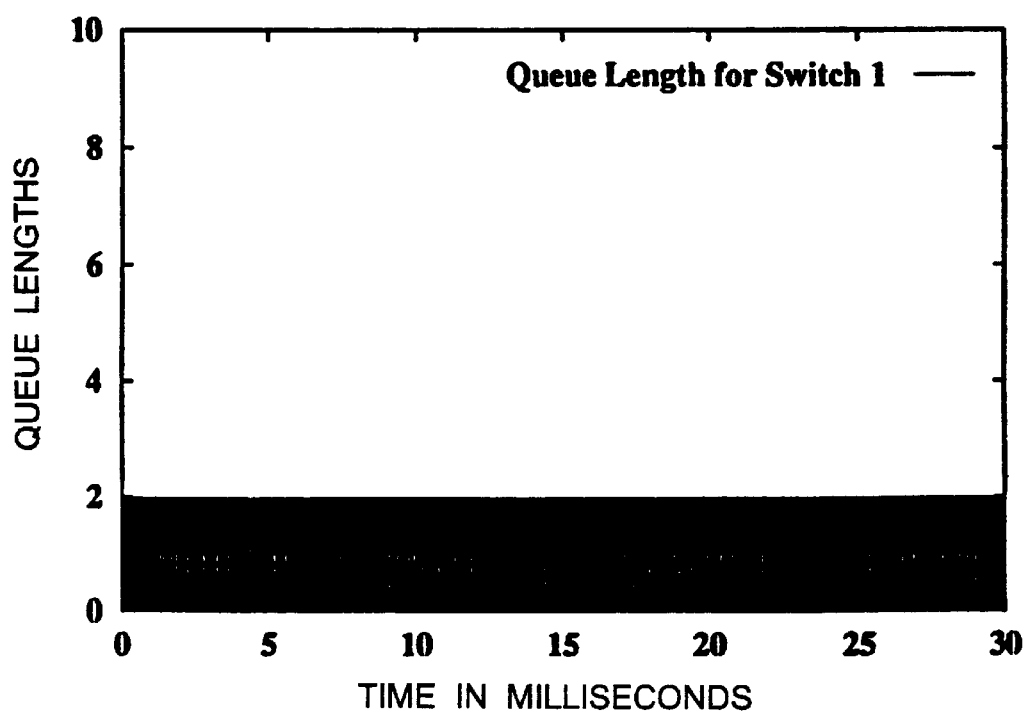
FIG. 25B is a graphical representation of the queue length for the configuration of FIG. 24.
Figure 25C:
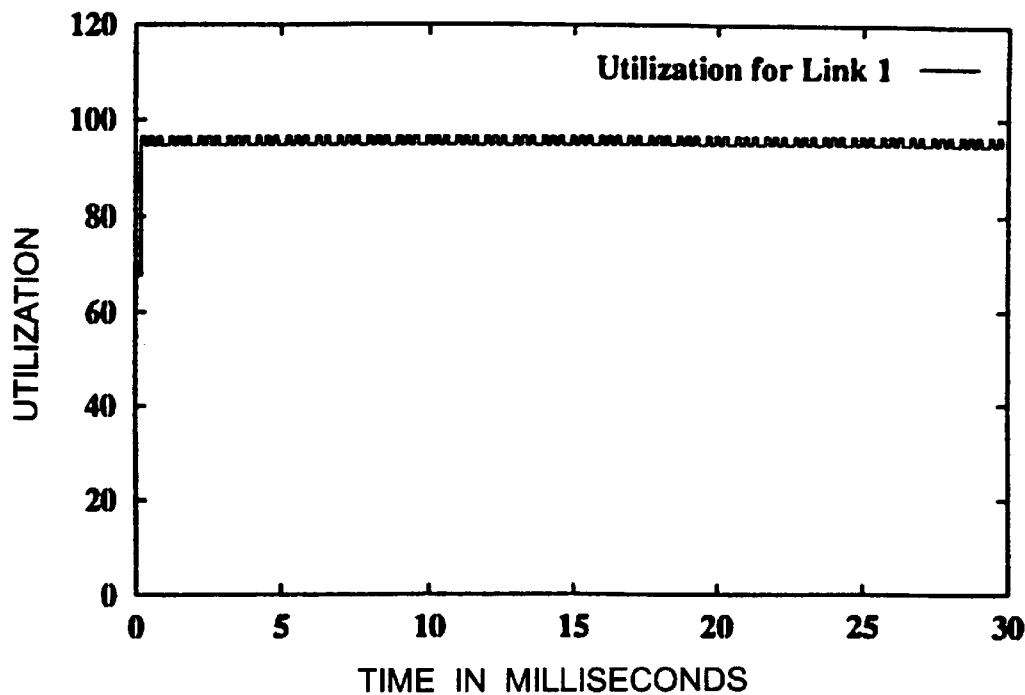
FIG. 25C is a graphical representation of the link utilization for the configuration of FIG. 24.
Figure 25D:
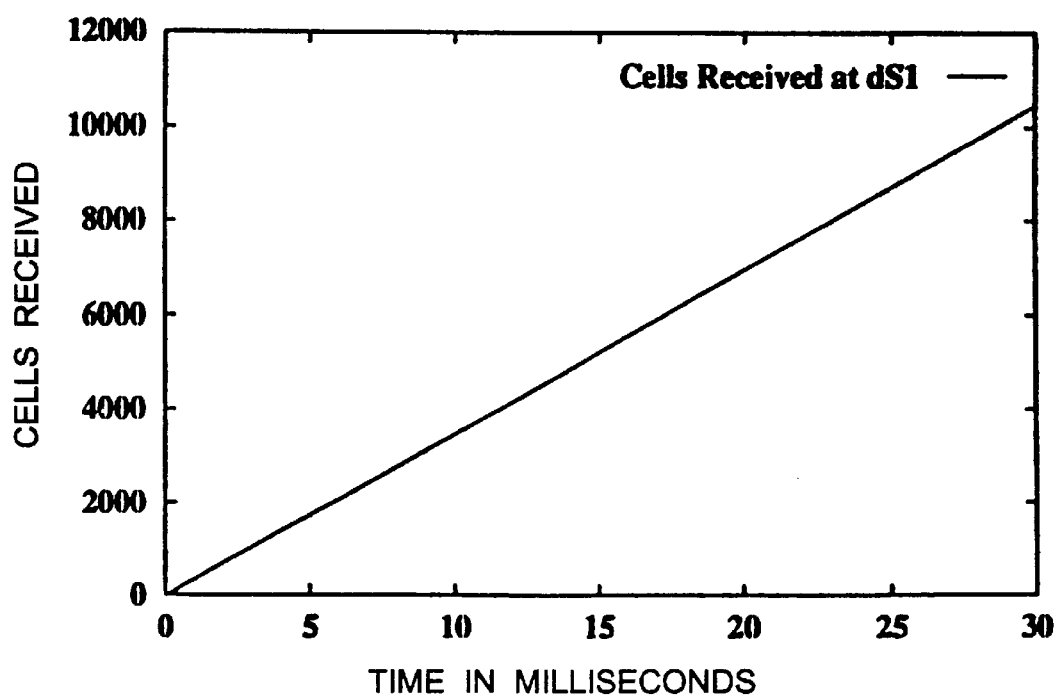
FIG. 25D is a graphical representation of the cells received for the configuration of FIG. 24.
Figure 27A:
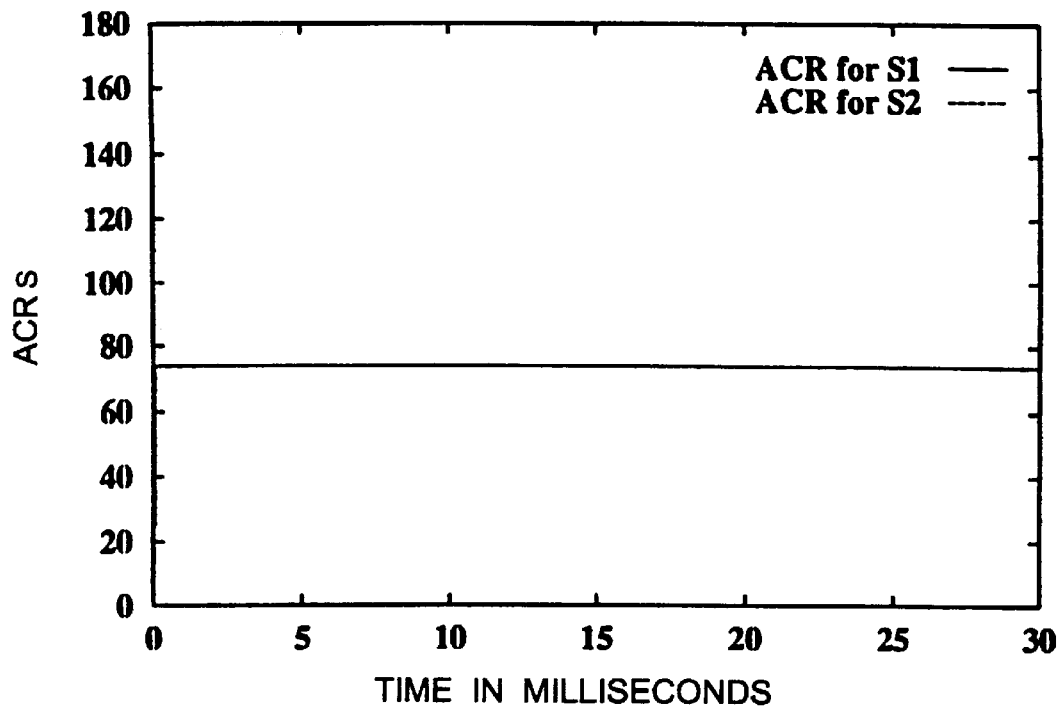
FIG. 27A is a graphical representation of the transmitted cell rate for the configuration of FIG. 26.
Figure 27B:
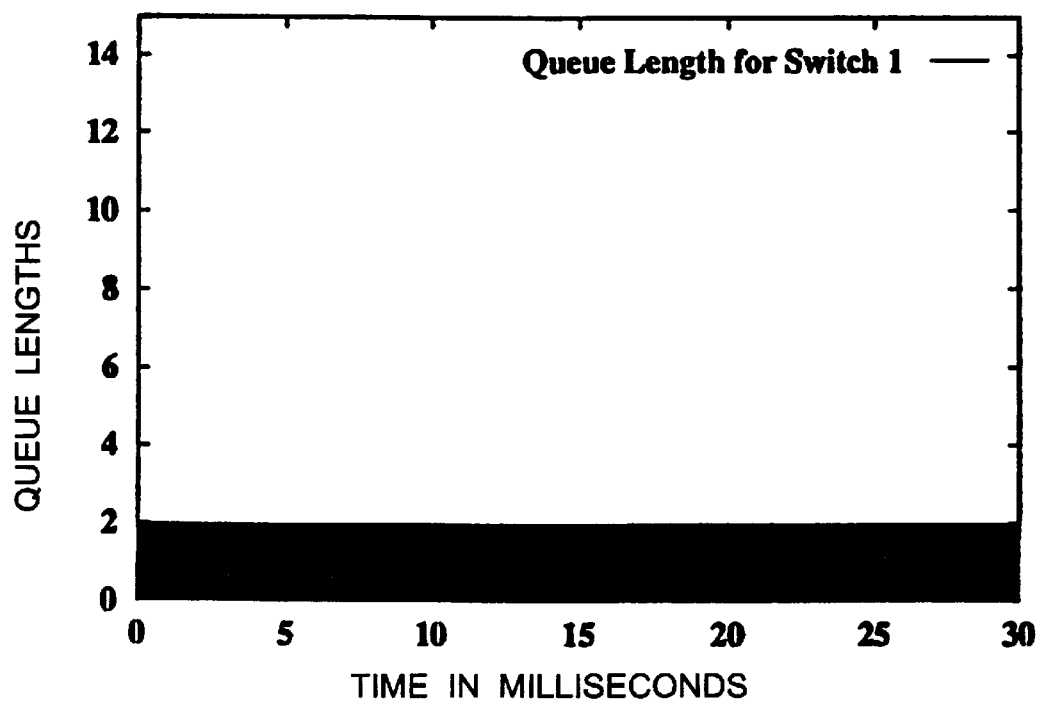
FIG. 27B is a graphical representation of the queue length for the configuration of FIG. 26.
Figure 27C:
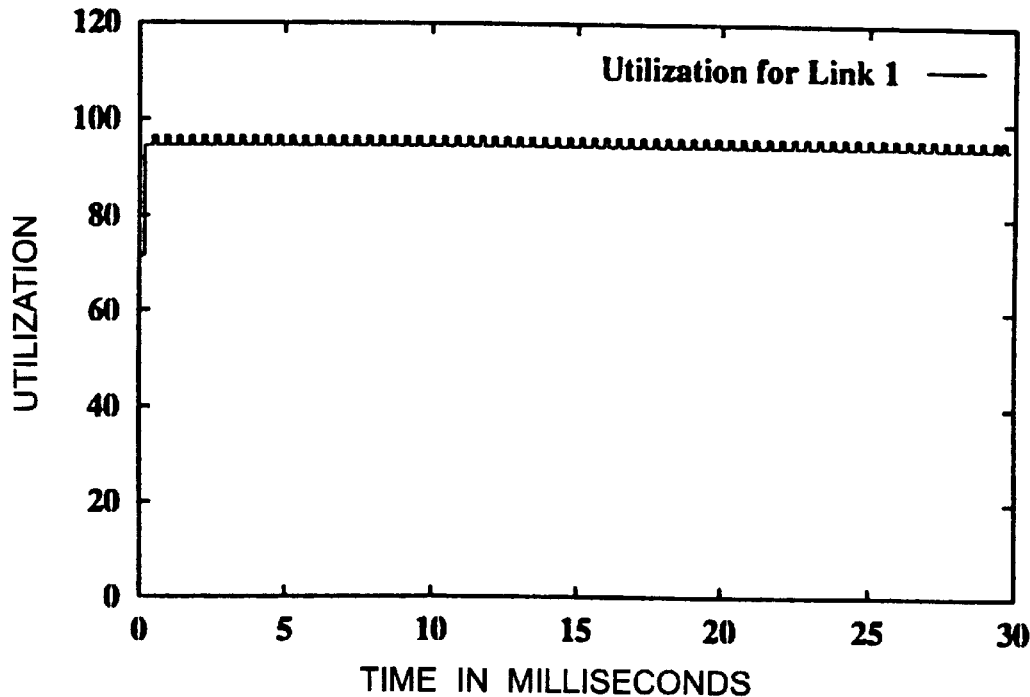
FIG. 27C is a graphical representation of the link utilization for the configuration of FIG. 26.
Figure 27D:
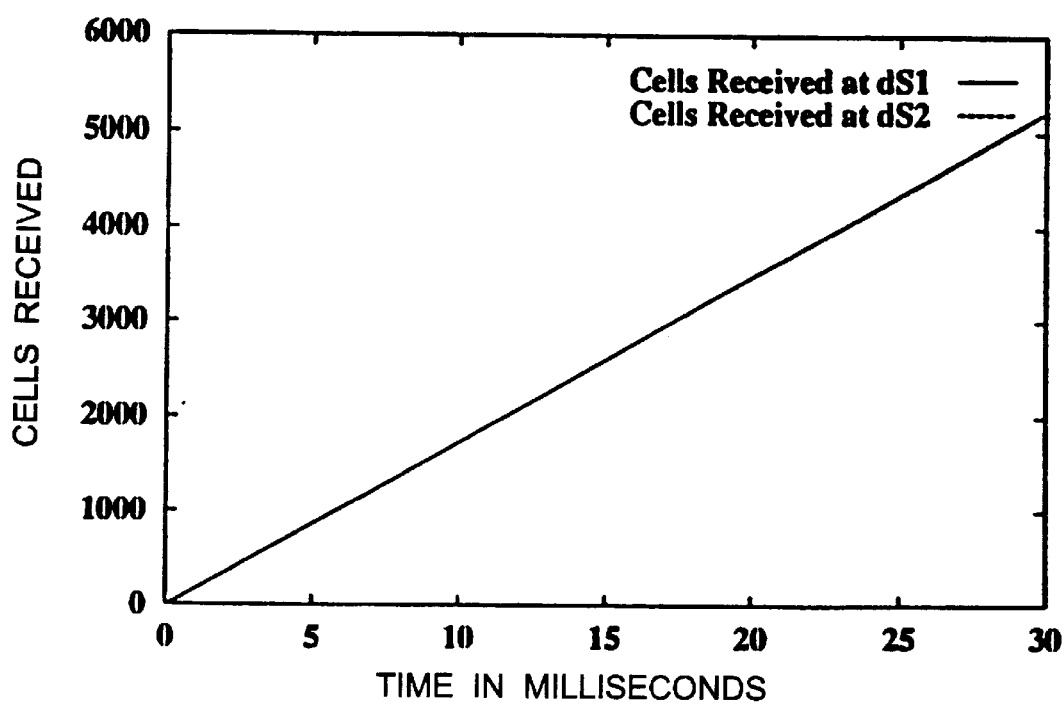
FIG. 27D is a graphical representation of the cells received for the configuration of FIG. 26.

FIG. 26 aids in studying the fairness of the scheme. Two sources 114 share a single link 120 as illustrated in FIG. 26. Each source must converge to almost half of the link rate, which is the max-min optimal allocation. FIGS. 27A–D show that the convergence is fast and steady state performance is good.

Fairness

Figure 28:
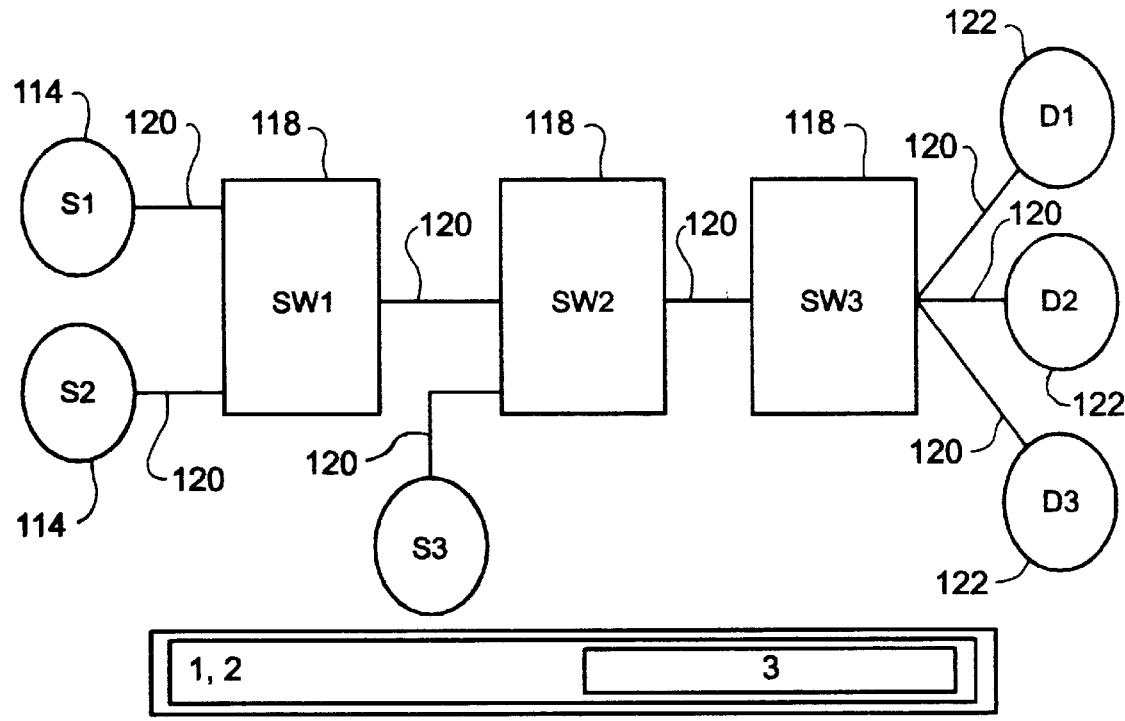
FIG. 28 illustrates a parking lot configuration for ERICA.

FIG. 28 illustrates a parking lot configuration is used for studying fairness. The configuration and its name were derived from theater parking lots, which consist of several parking areas connected via a single exit path. At the end of the show, congestion occurs as cars exiting from each parking area try to join the main exit stream.

For computer networks, an n-stage parking lot configuration consists of n switches 118 connected in series. There are n VCs 120. The first VC starts from the first switch and goes through the last one. For the remaining VCs, the ith VC starts at the (i-1)st switch. A 3-switch parking lot configuration is shown in FIG. 28. FIGS. 29A–D illustrate that ERICA achieves the desired max-min allocation.

We had observed that the basic ERICA algorithm does not converge to Max-Min fairness in certain situations. Such situations arise when the ERICA algorithm is executed in a state where some of the sources cannot fully utilize their allocated bandwidth on a certain link (because they are bottlenecked on another link, for example), and the rest of the sources contending for bandwidth have unequal CCR values, which are greater than the fair share value (first term in the maximum formula). The ERICA algorithm does not converge to Max-Min fairness in these situations because, after z converges to one, the second term in the maximum formula becomes $CCR_i/1=CCR_1$, and the first term is constant. The maximum of the two terms for the contending sources is the second term, because there are sources that are not fully utilizing their allocated bandwidth. Hence, the sources do not change their rates.

Figure 30:
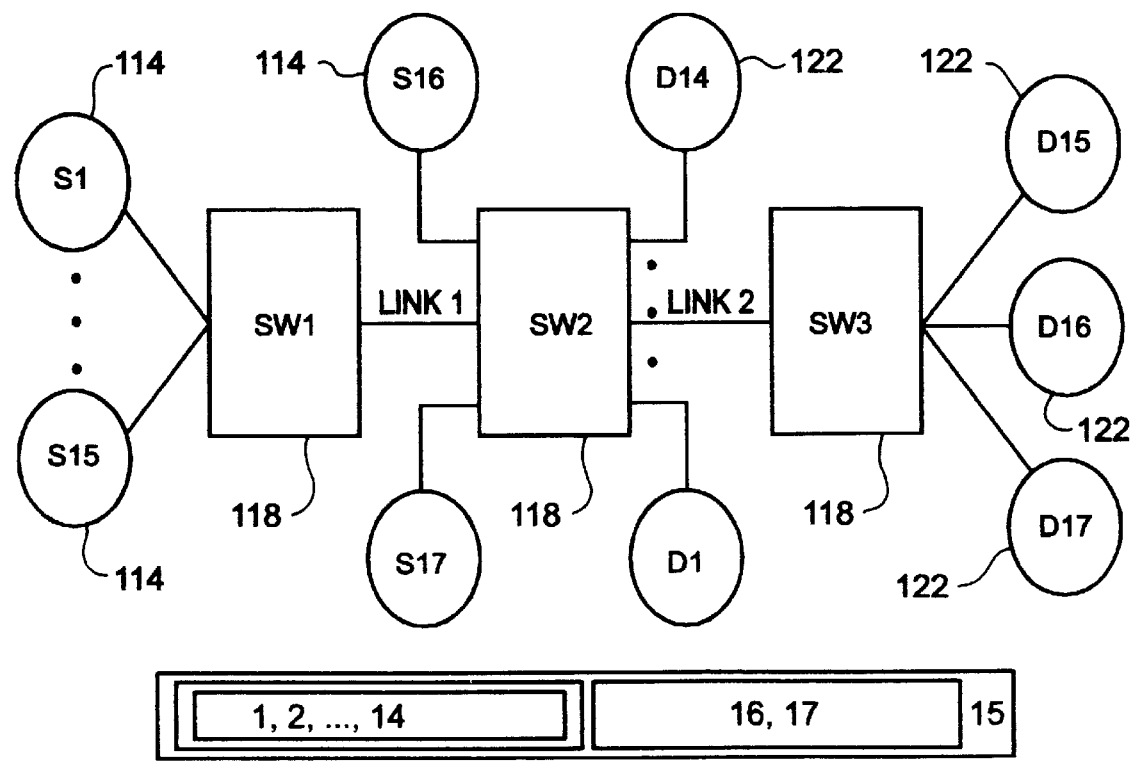
FIG. 30 illustrates an upstream configuration for ERICA.
Figure 29A:
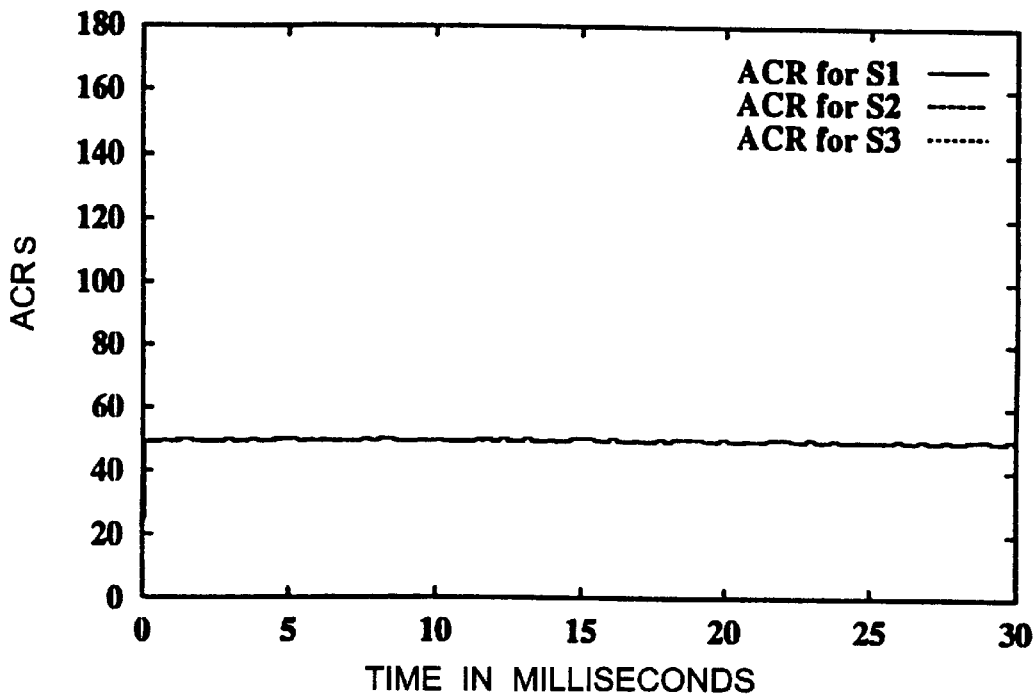
FIG. 29A is a graphical representation of the transmitted cell rate for the configuration of FIG. 28.
Figure 29B:
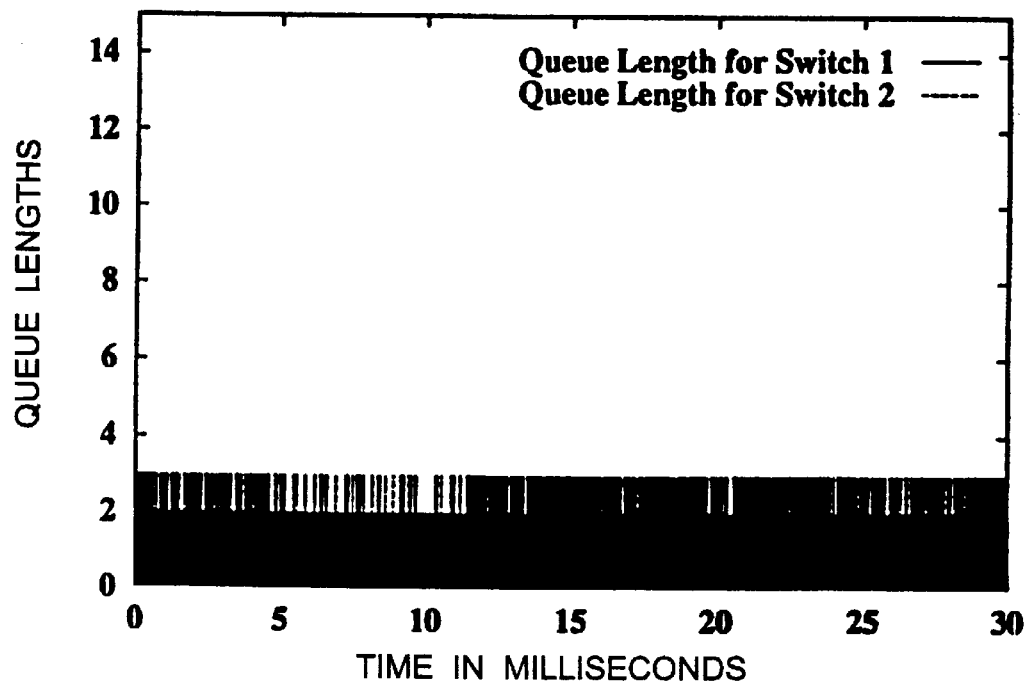
FIG. 29B is a graphical representation of the queue length for the configuration of FIG. 28.
Figure 29C:
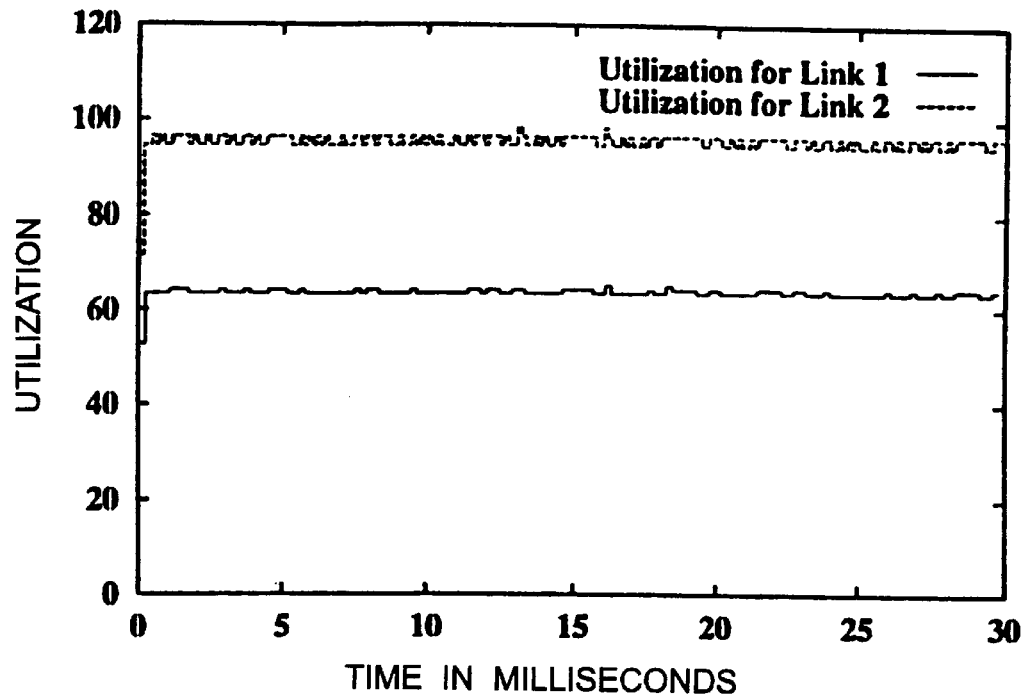
FIG. 29C is a graphical representation of the link utilization for the configuration of FIG. 28.
Figure 29D:
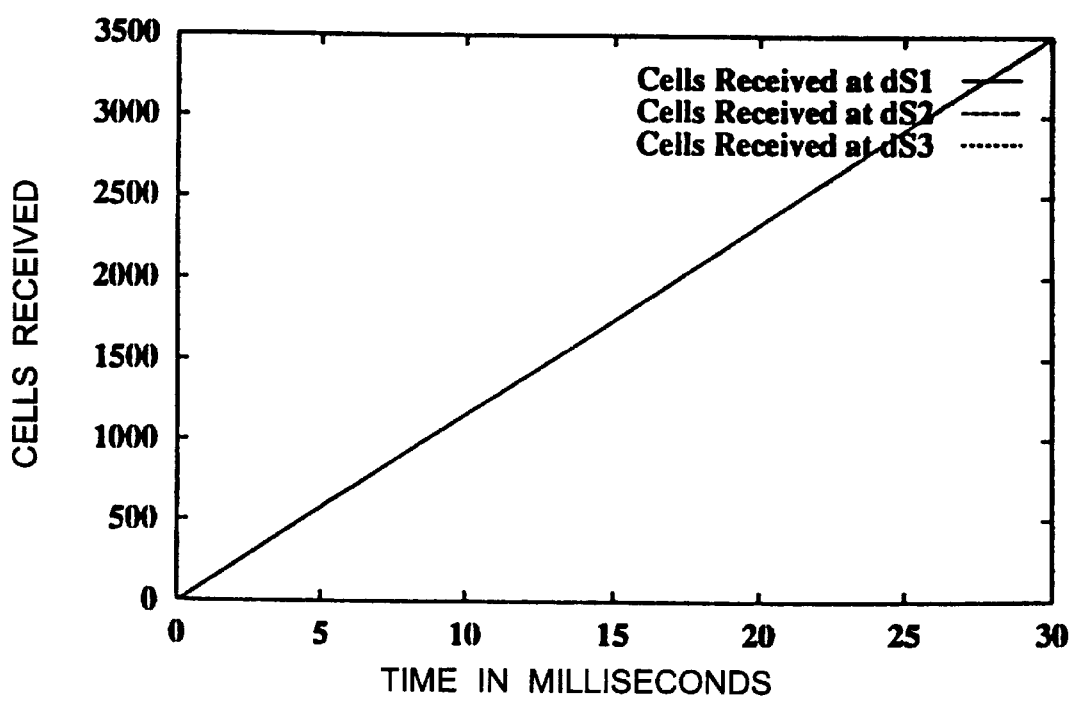
FIG. 29D is a graphical representation of the cells received for the configuration of FIG. 28.
Figure 31A:
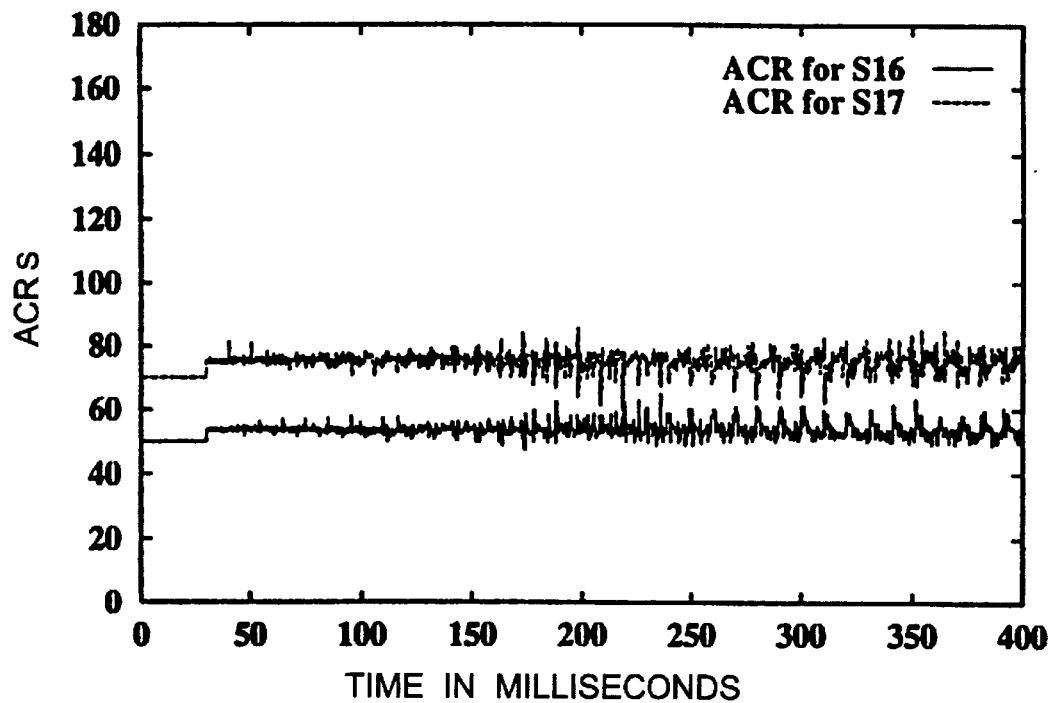
FIG. 31A is a graphical representation of the transmitted cell rate for the configuration of FIG. 30.
Figure 31B:
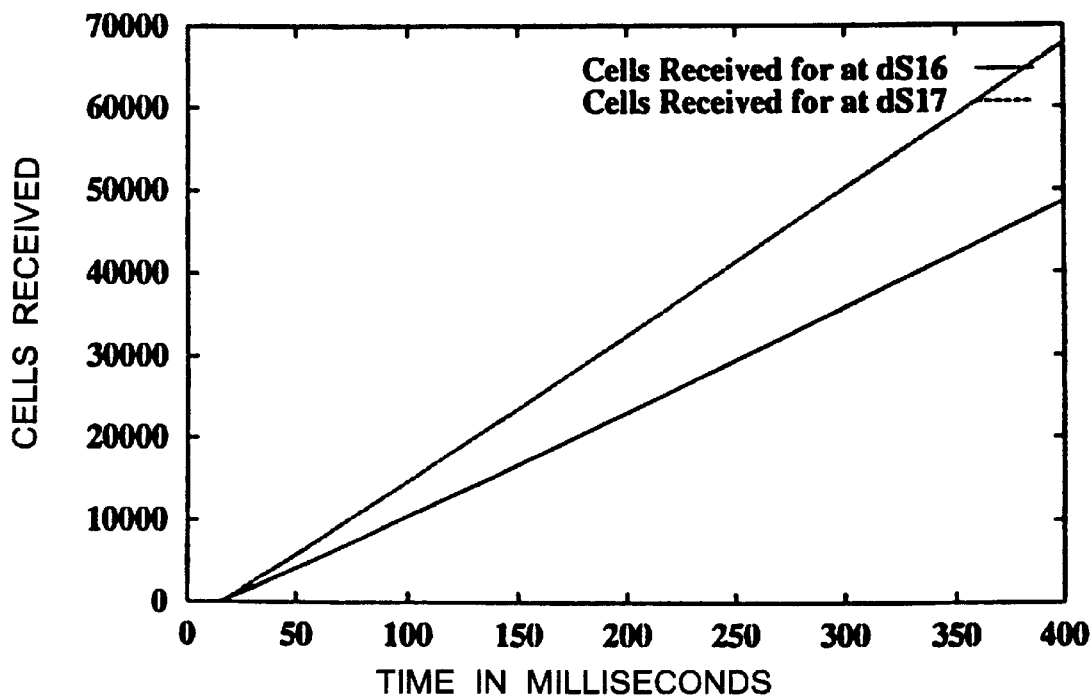
FIG. 31B is a graphical representation of the queue length for the configuration of FIG. 30.
Figure 31C:
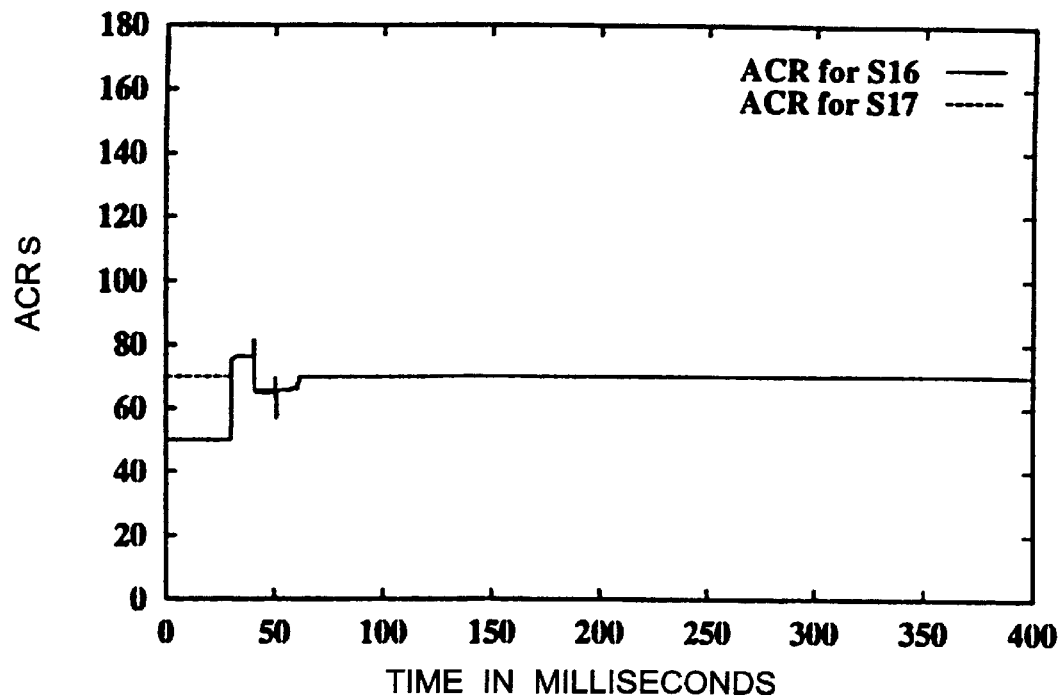
FIG. 31C is a graphical representation of the link utilization for the configuration of FIG. 30.
Figure 31D:
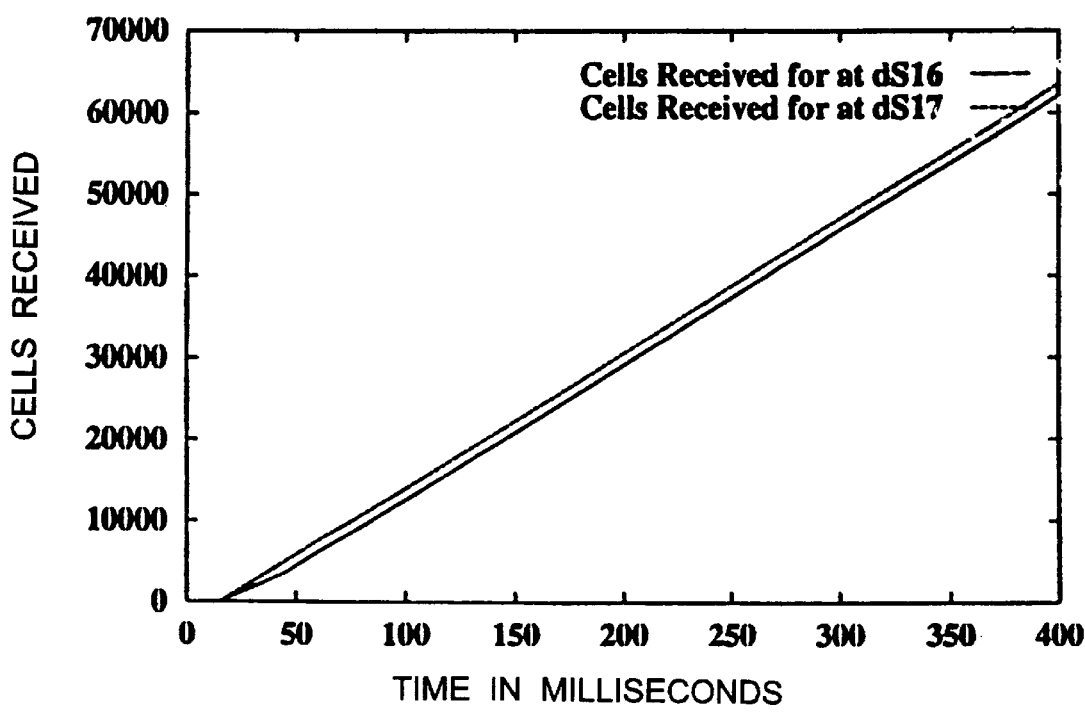
FIG. 31D is a graphical representation of the cells received for the configuration of FIG. 30.
Figure 32A:
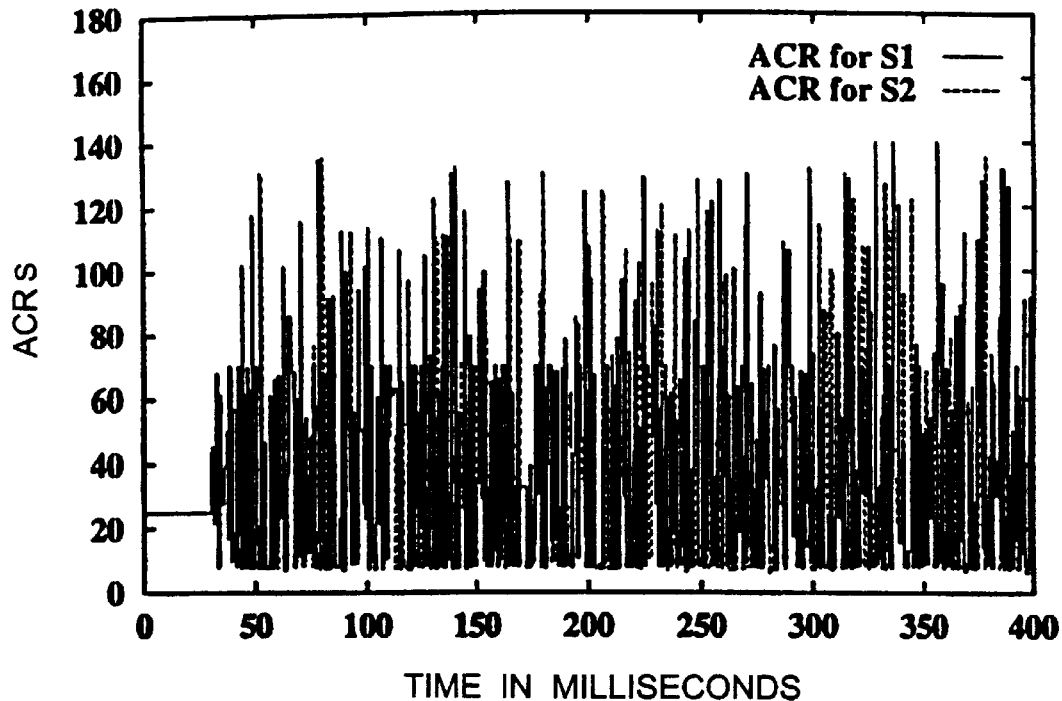
Figure 32B:
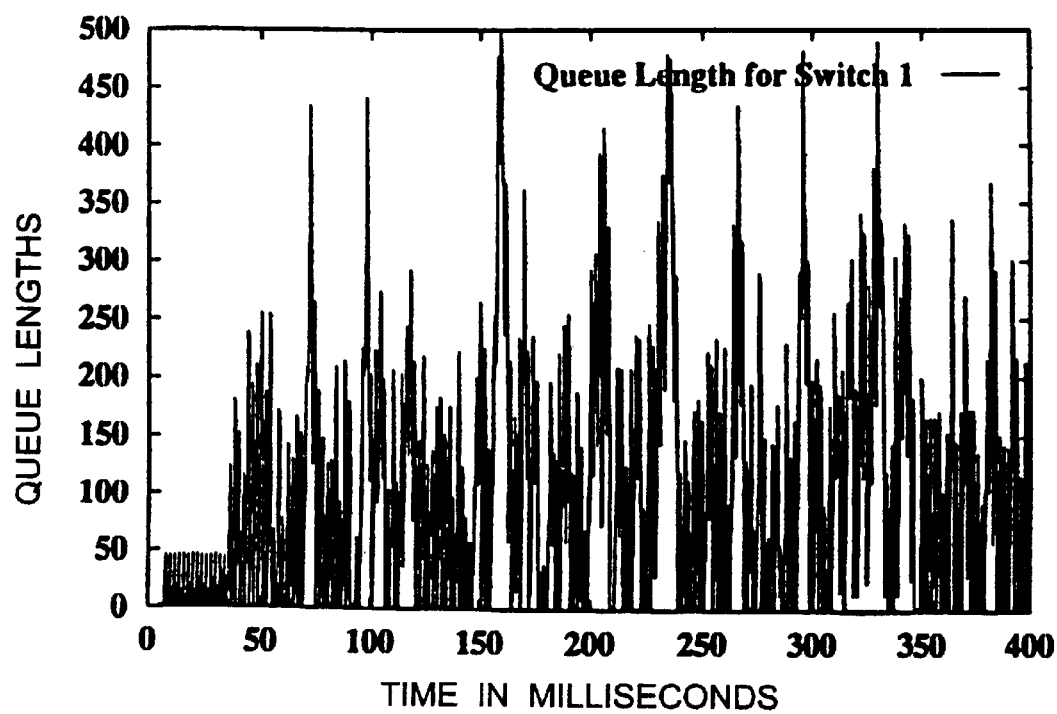
Figure 32C:
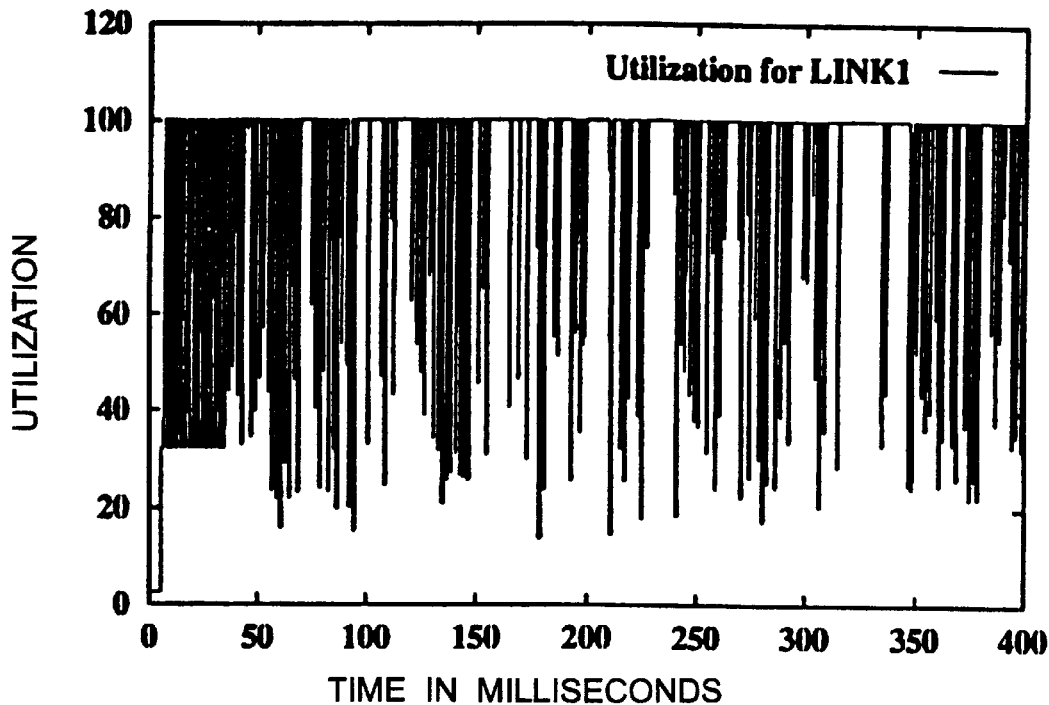
Figure 32D:
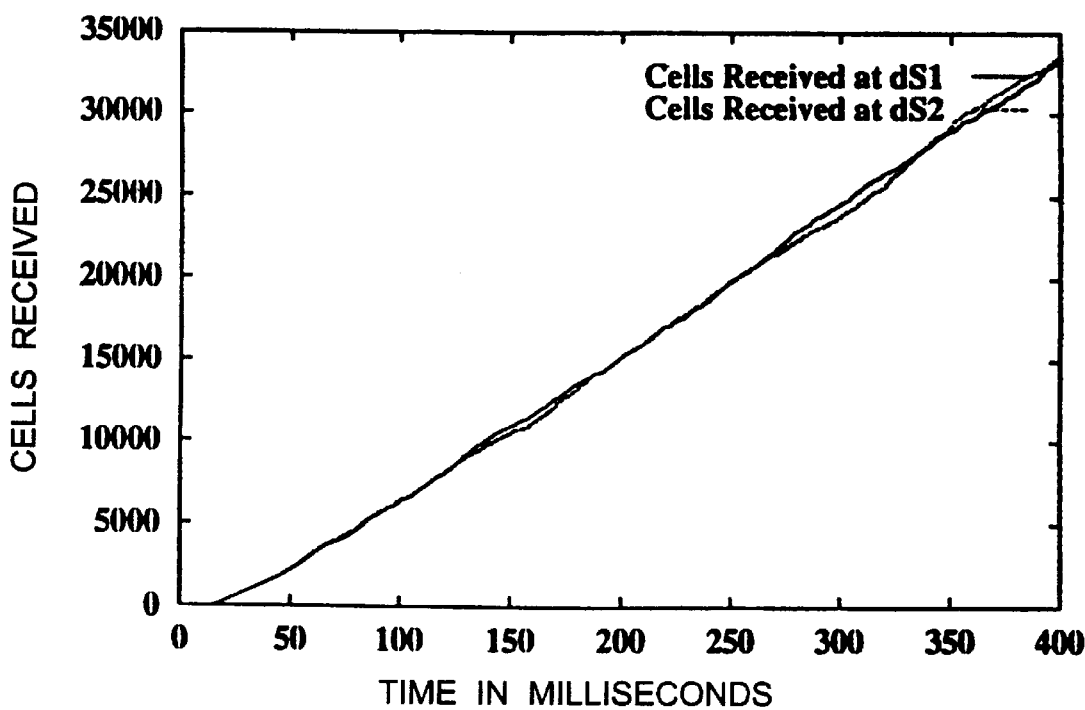
Figure 33A:
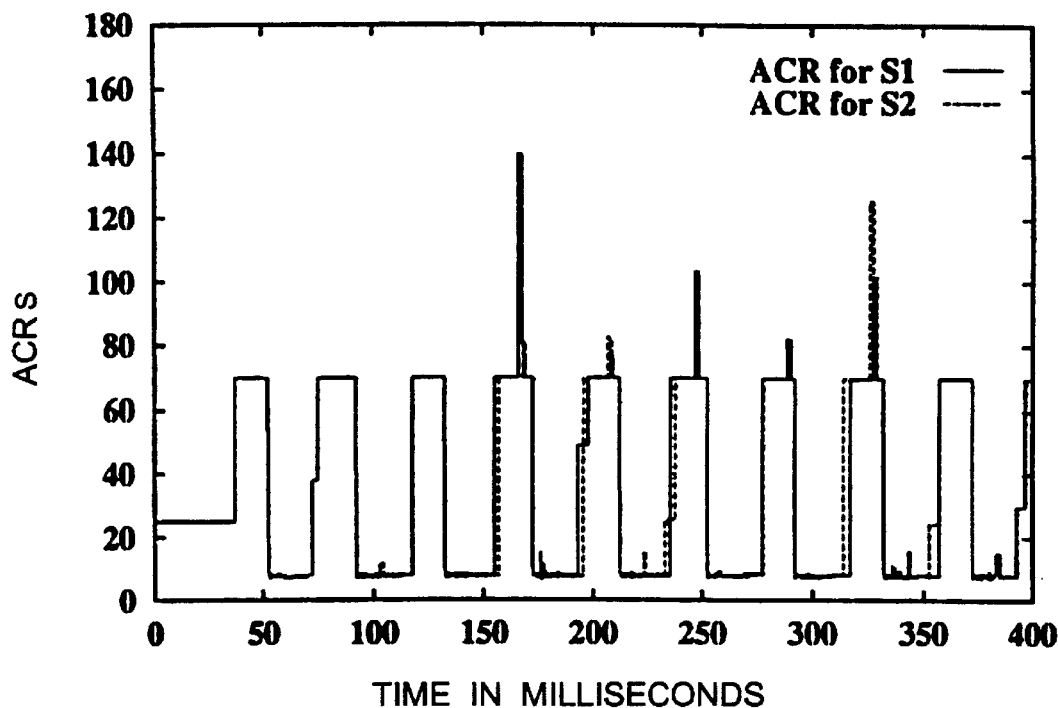
FIG. 33A is a graphical representation of the transmitted cell rate for the performance with VBR on/off periods of 20 ms.
Figure 33B:
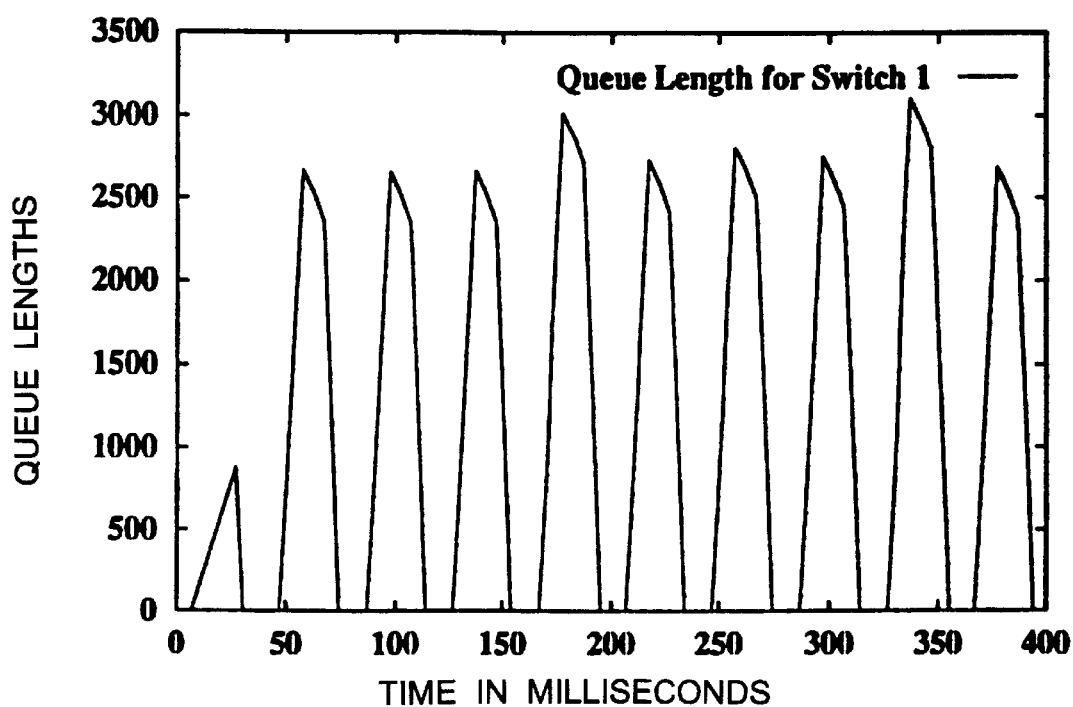
FIG. 33B is a graphical representation of the queue length for the performance with VBR on/off periods of 20 ms.
Figure 33C:
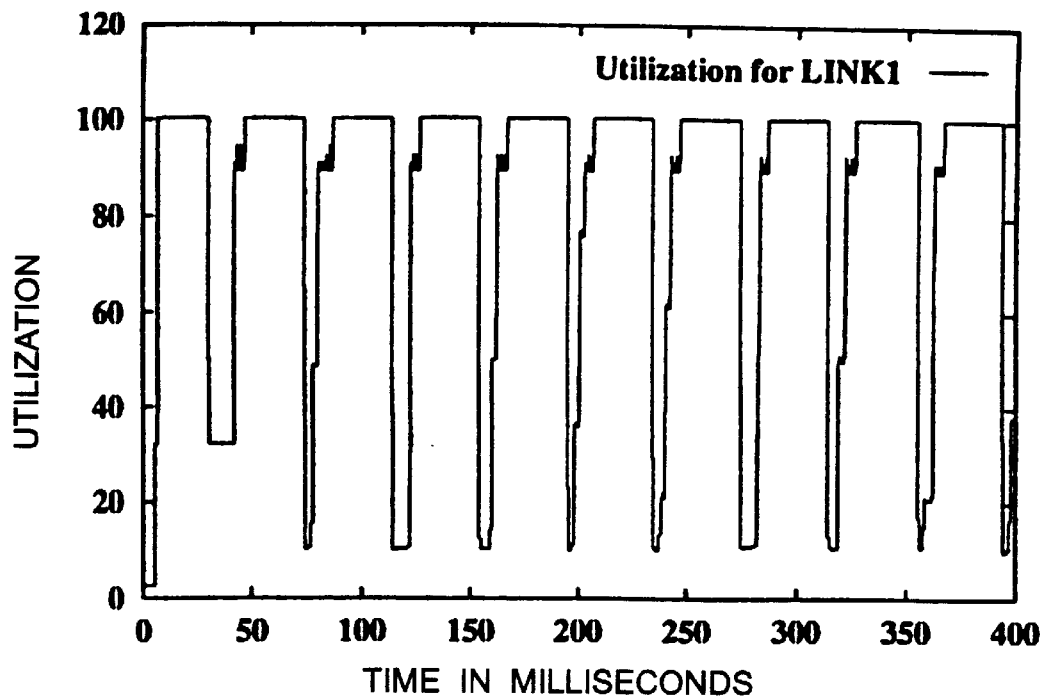
FIG. 33C is a graphical representation of the link utilization for the performance with VBR on/off periods of 20 ms.
Figure 33D:
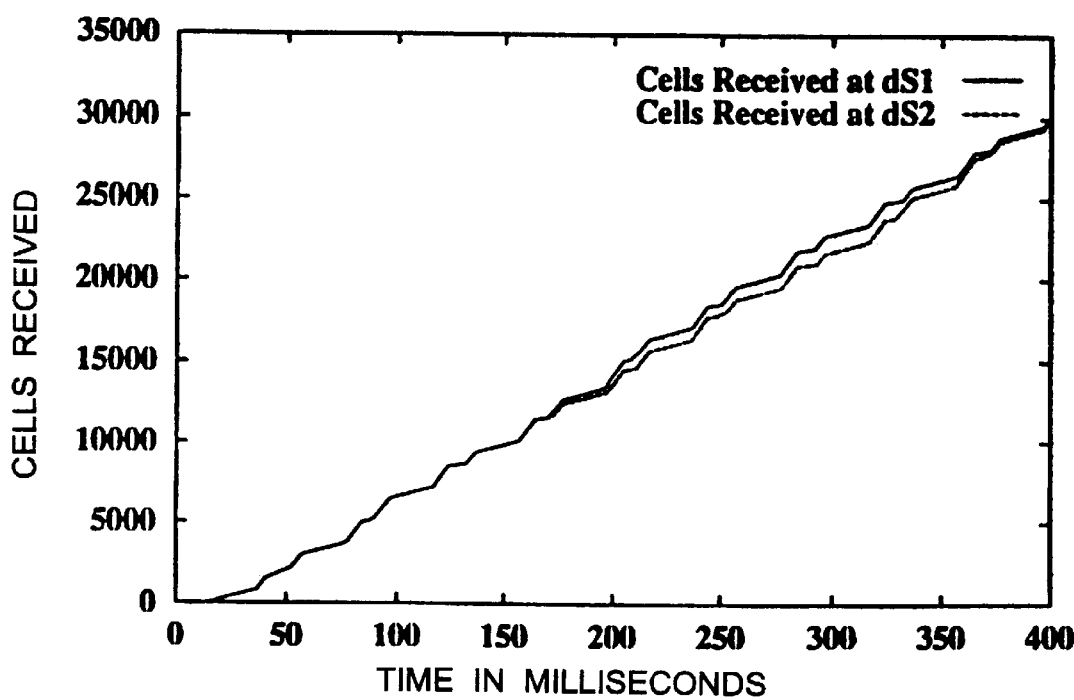
FIG. 33D is a graphical representation of the cell received for the performance with VBR on/off periods of 20 ms.
Figure 34A:
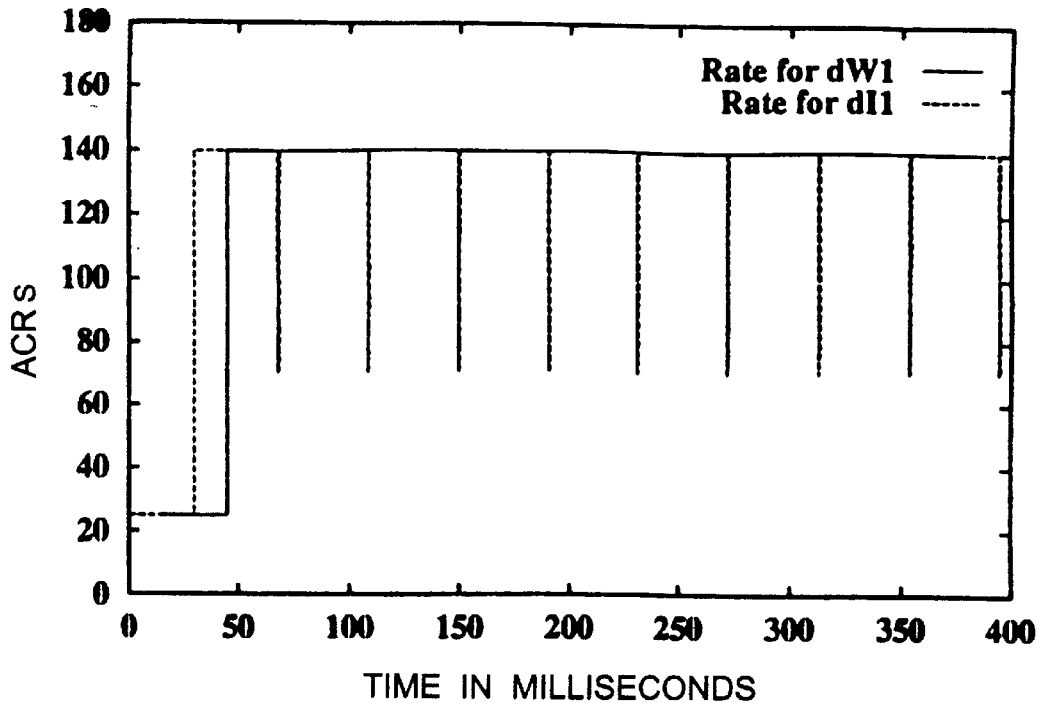
FIG. 34A is a graphical representation of the transmitted cell rate for small burst sizes.
Figure 34B:
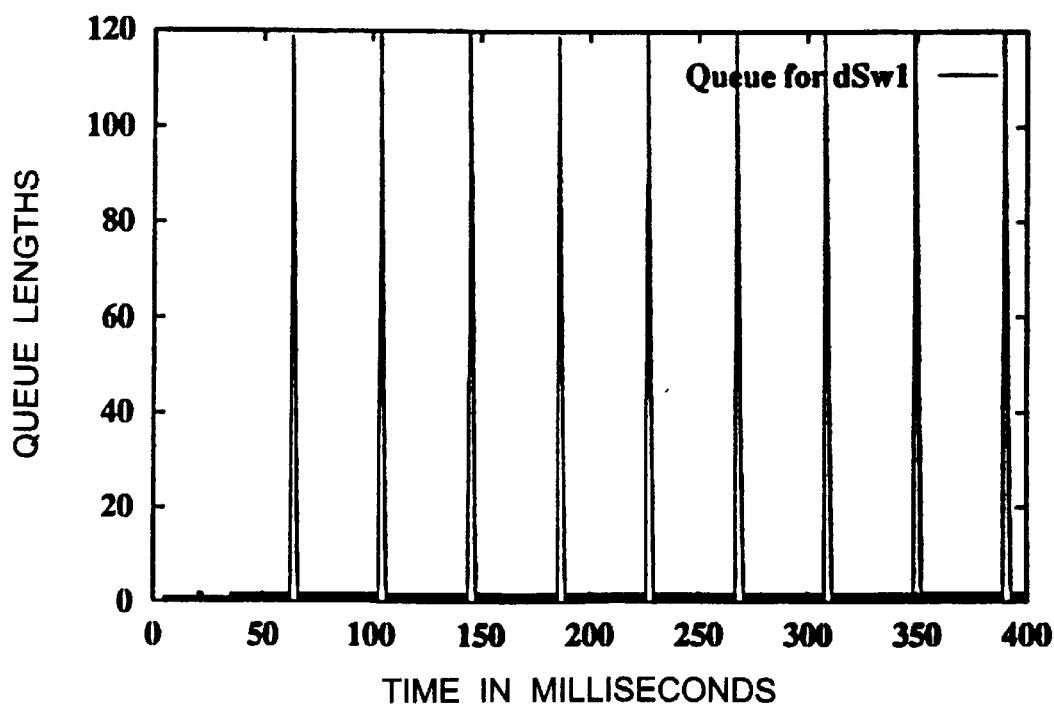
FIG. 34B is a graphical representation of the queue length for small burst sizes.
Figure 34C:
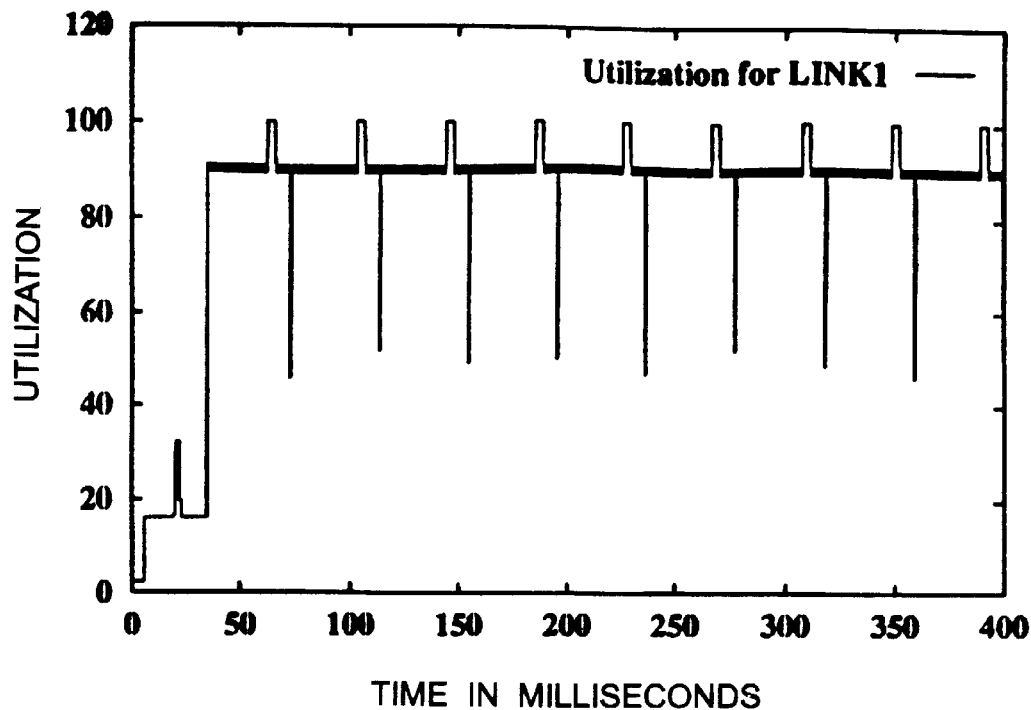
FIG. 34C is a graphical representation of the link utilization for small burst sizes.
Figure 34D:
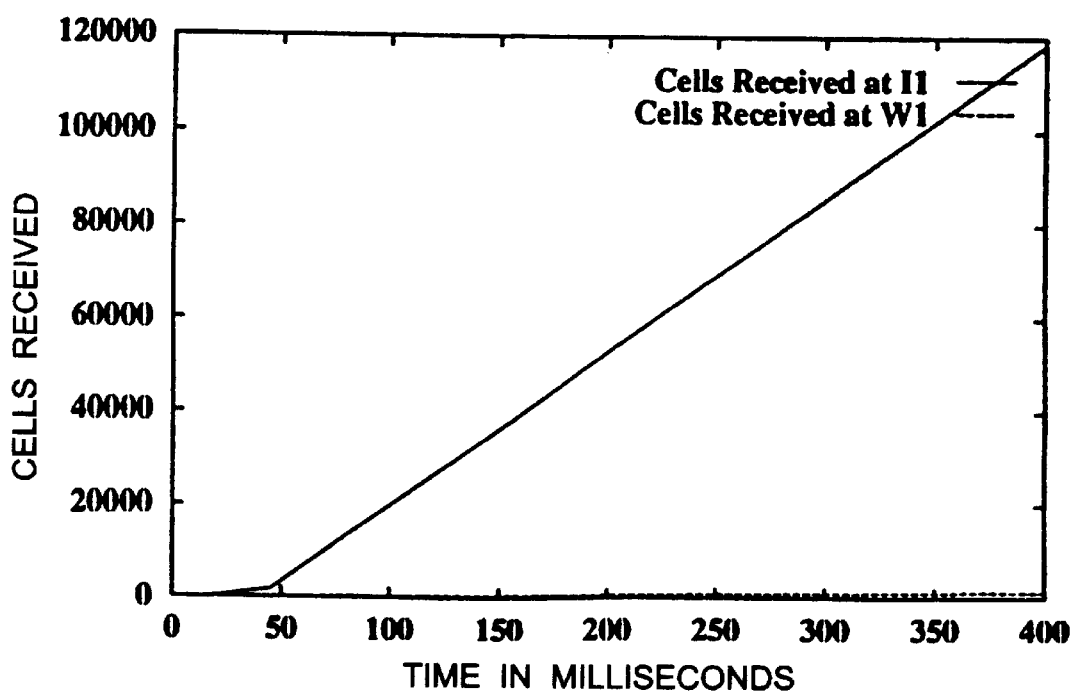
FIG. 34D is a graphical representation of the cell received for small burst sizes.
Figure 35A:
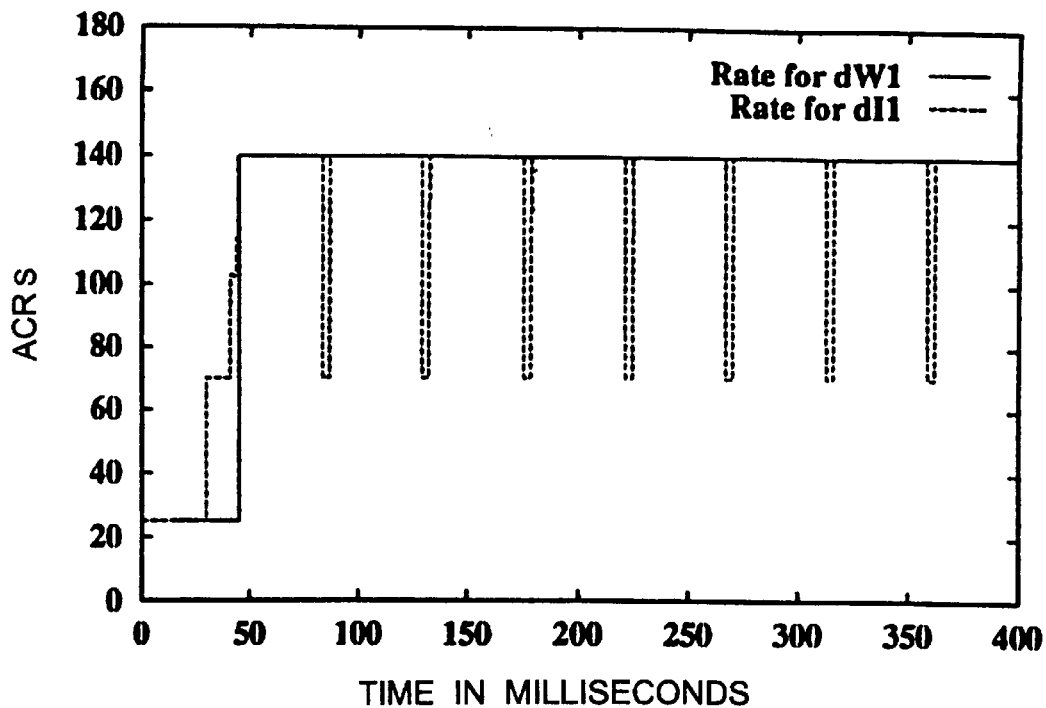
FIG. 35A is a graphical representation of the transmitted cell rate for medium burst sizes.
Figure 35B:
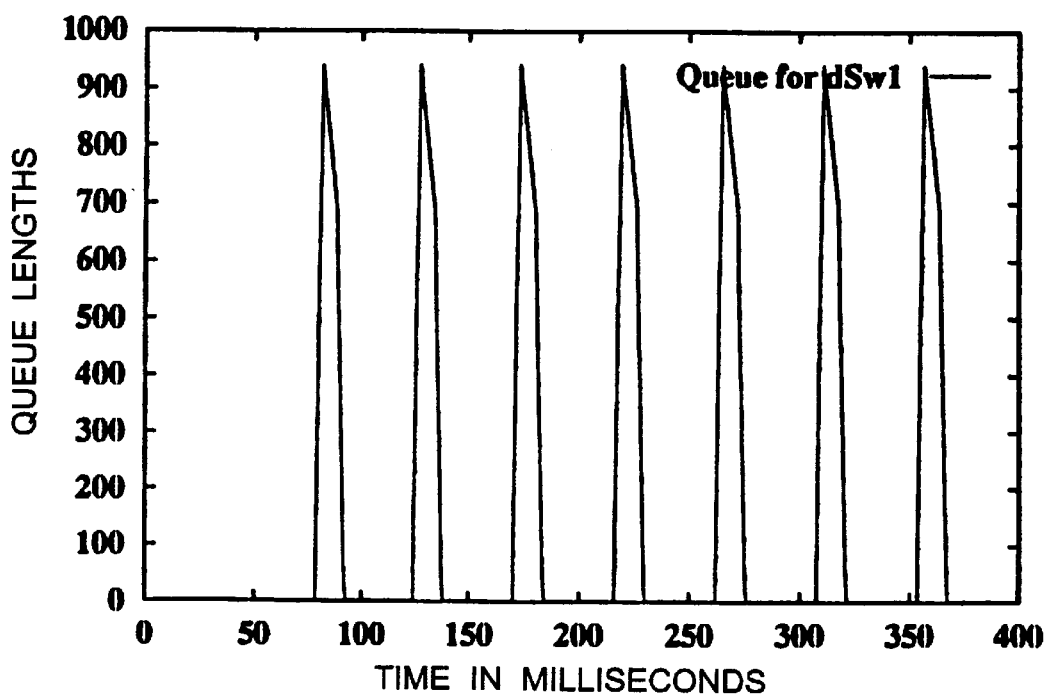
FIG. 35B is a graphical representation of the queue length for medium burst sizes.
Figure 35C:
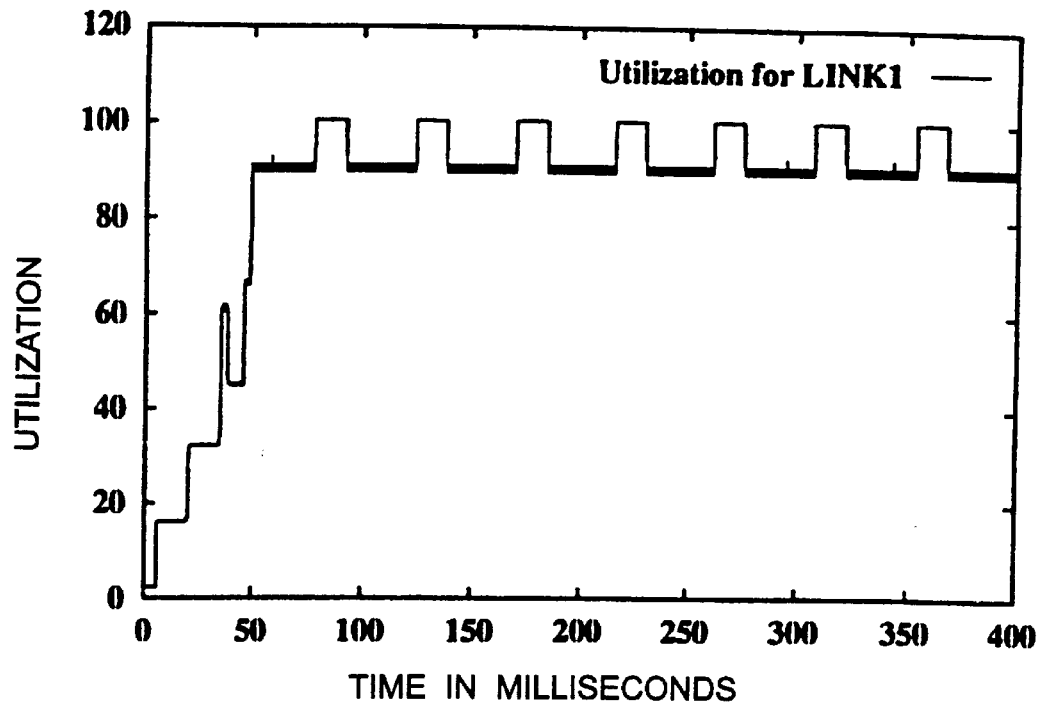
FIG. 35C is a graphical representation of the link utilization for medium burst sizes.
Figure 35D:
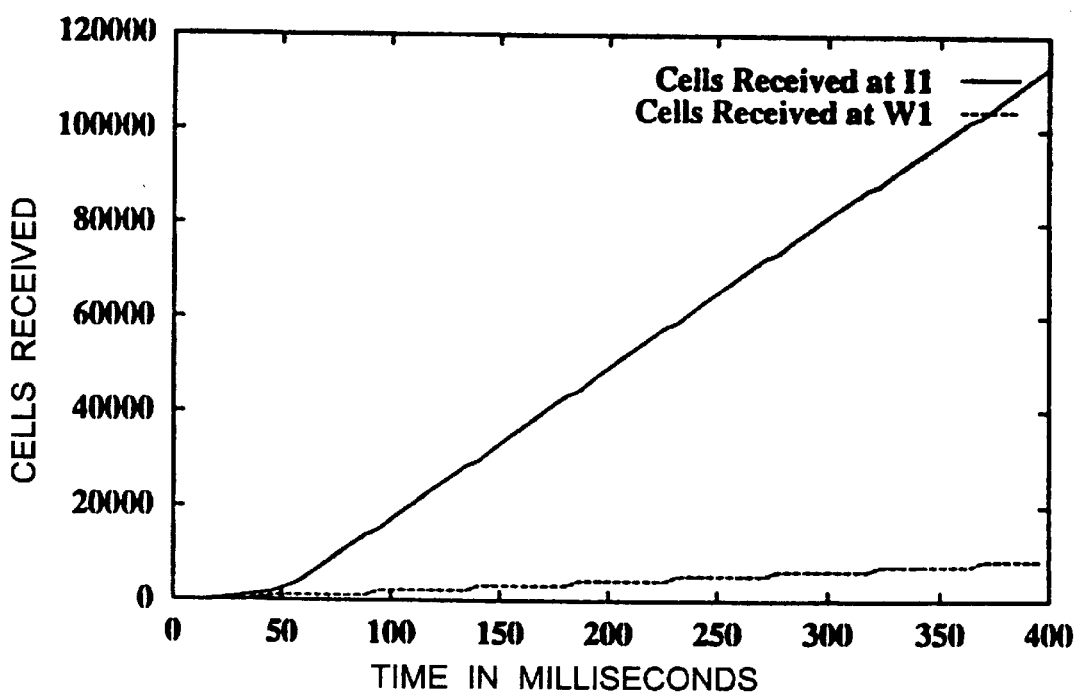
FIG. 35D is a graphical representation of the cell received for medium burst sizes.
Figure 36A:
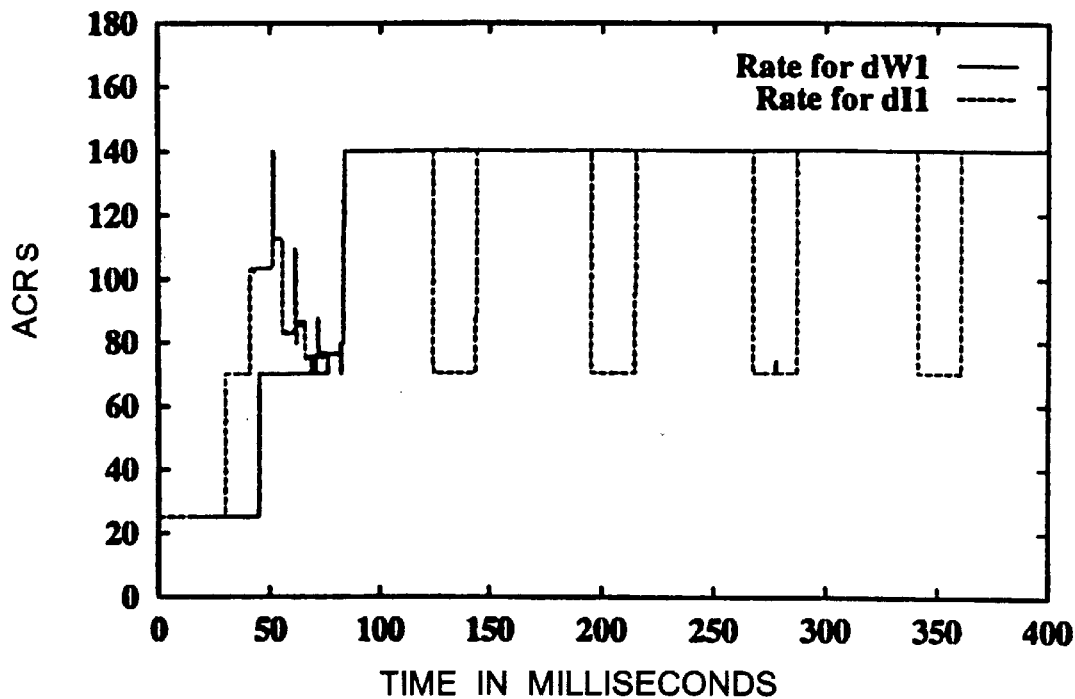
FIG. 36A is a graphical representation of the transmitted cell rate for large burst sizes.
Figure 36B:
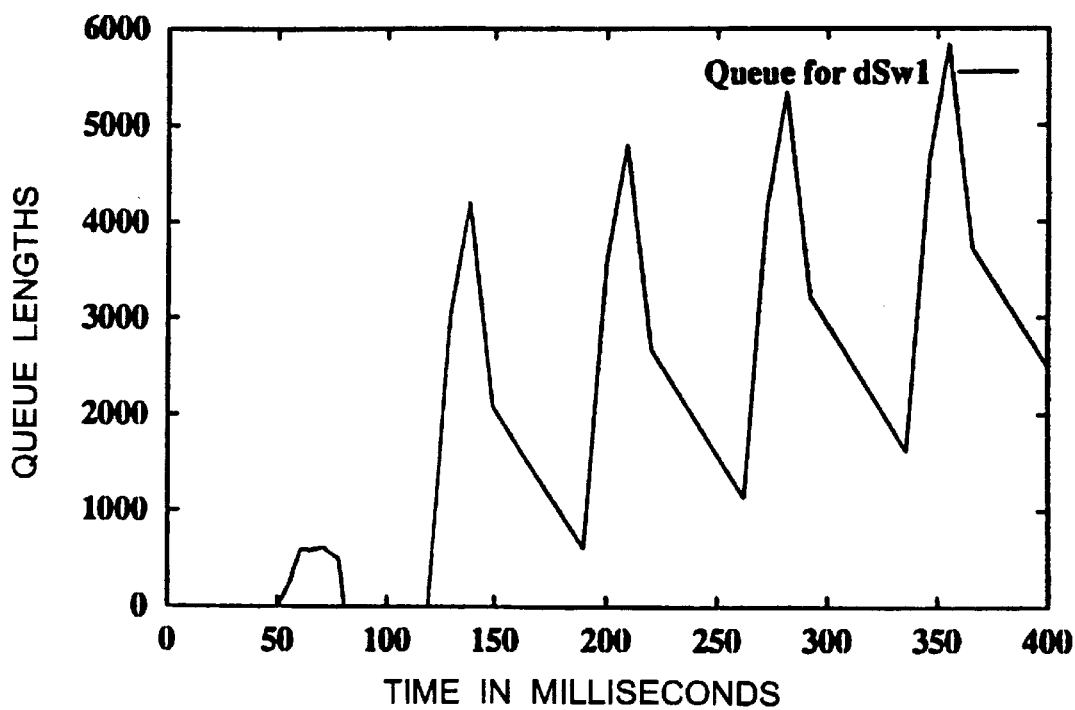
FIG. 36B is a graphical representation of the queue length for large burst sizes.
Figure 36C:
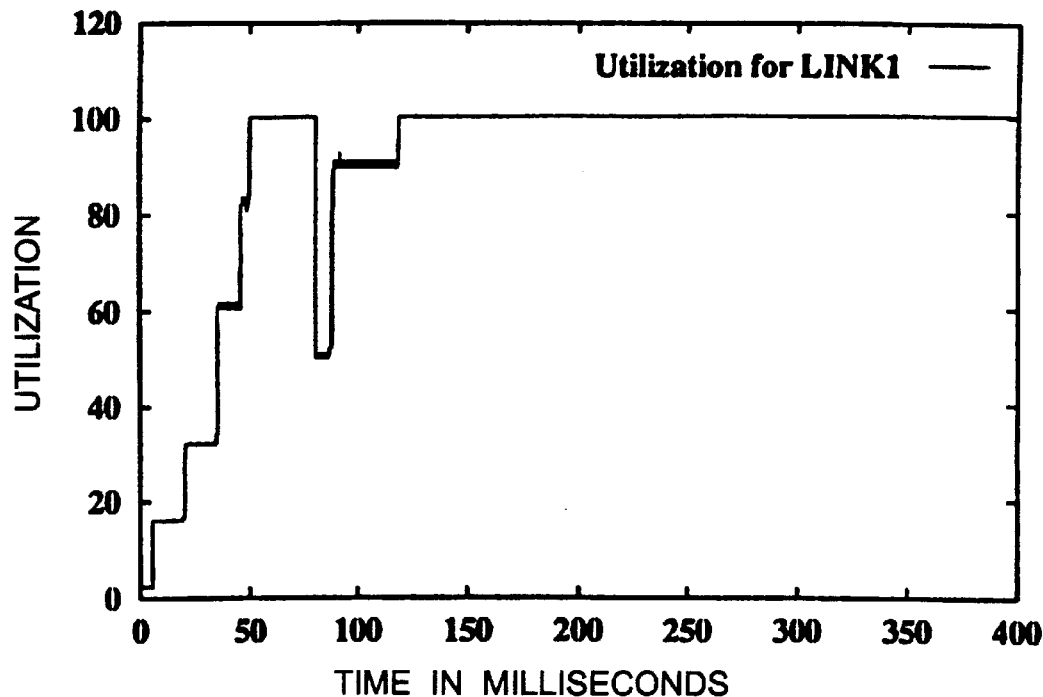
FIG. 36C is a graphical representation of the link utilization for large burst sizes.
Figure 36D:
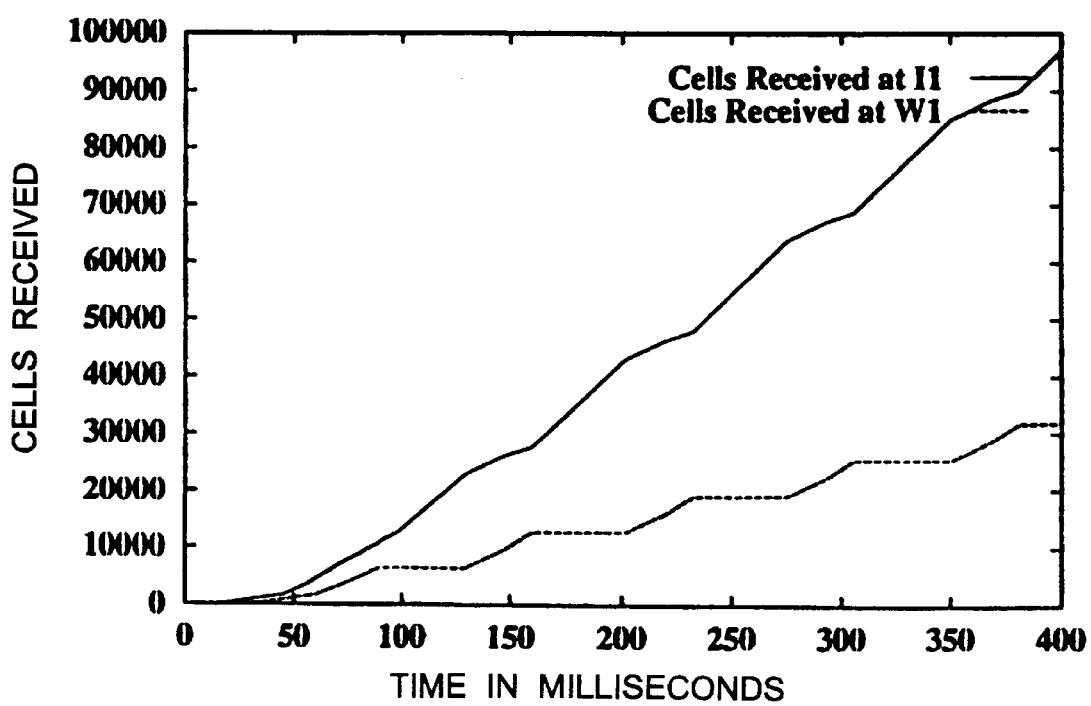
FIG. 36D is a graphical representation of the cell received for large burst sizes.
Figure 37A:
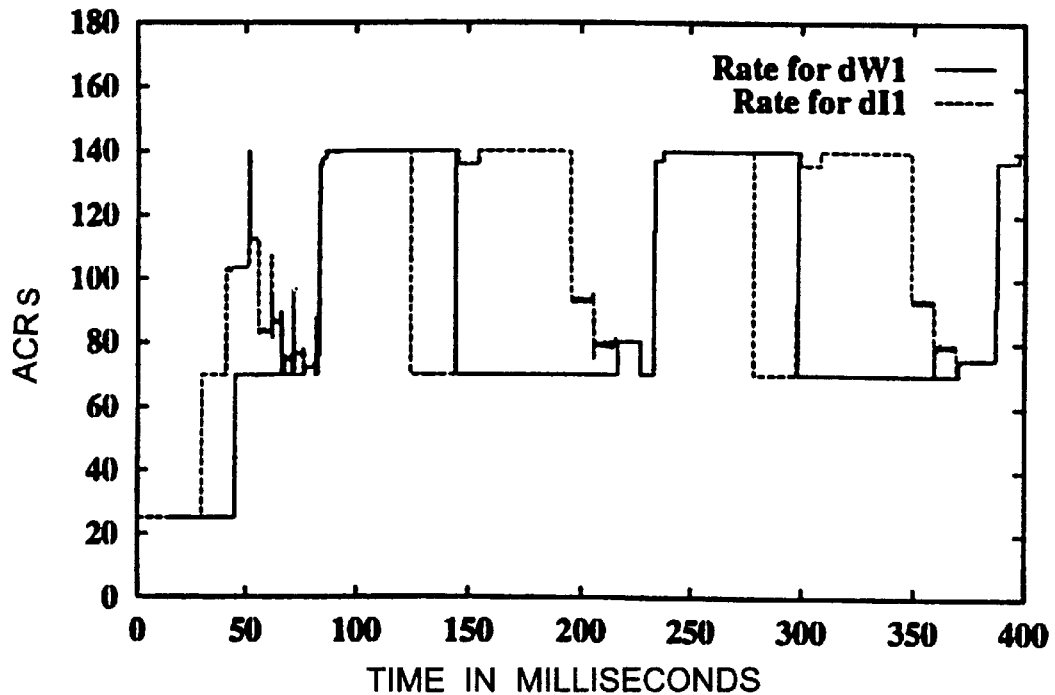
FIG. 37A is a graphical representation of the transmitted cell rate for one greedy source and one bursty source in a WAN (large bursts) with bi-directional counting.
Figure 37B:
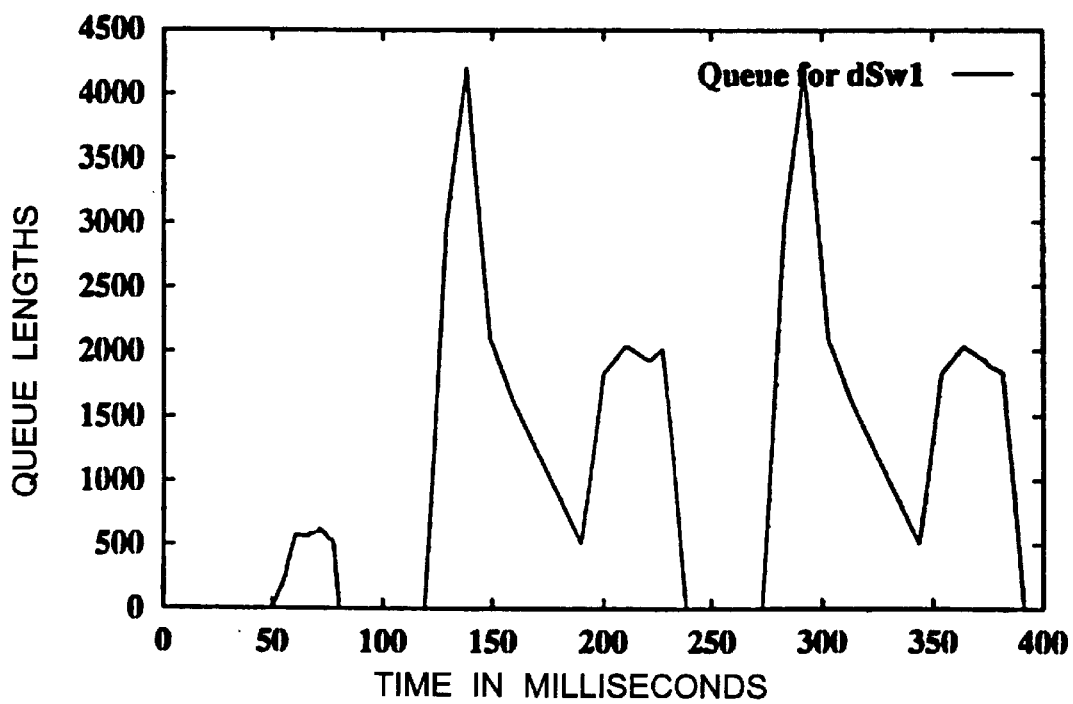
FIG. 37B is a graphical representation of the queue length for one greedy source and one bursty source in a WAN (large bursts) with bi-directional counting.
Figure 37C:
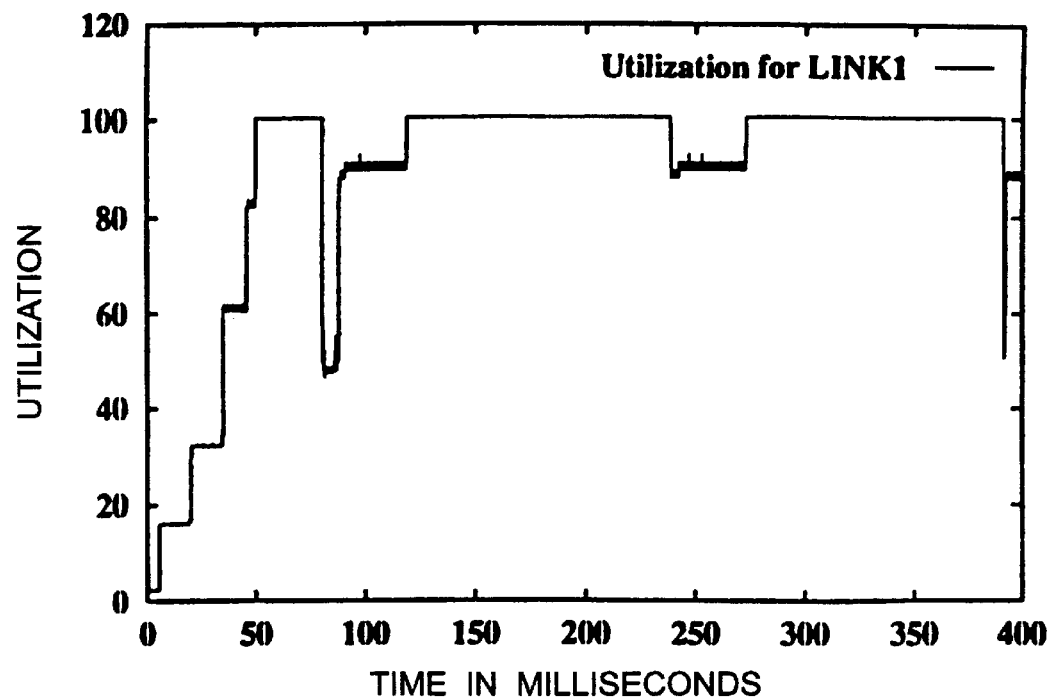
FIG. 37C is a graphical representation of the link utilization for one greedy source and one bursty source in a WAN (large bursts) with bi-directional counting.
Figure 37D:
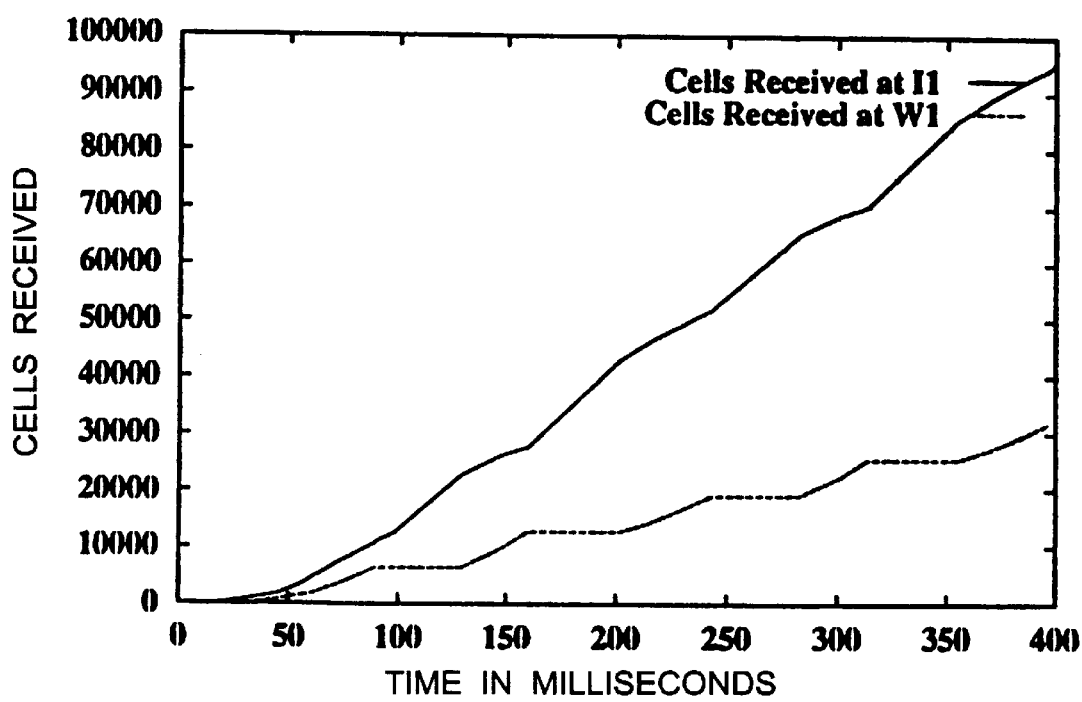
FIG. 37D is a graphical representation of the cell received for one greedy source and one bursty source in a WAN (large bursts) with bi-directional counting.
Figure 38A:
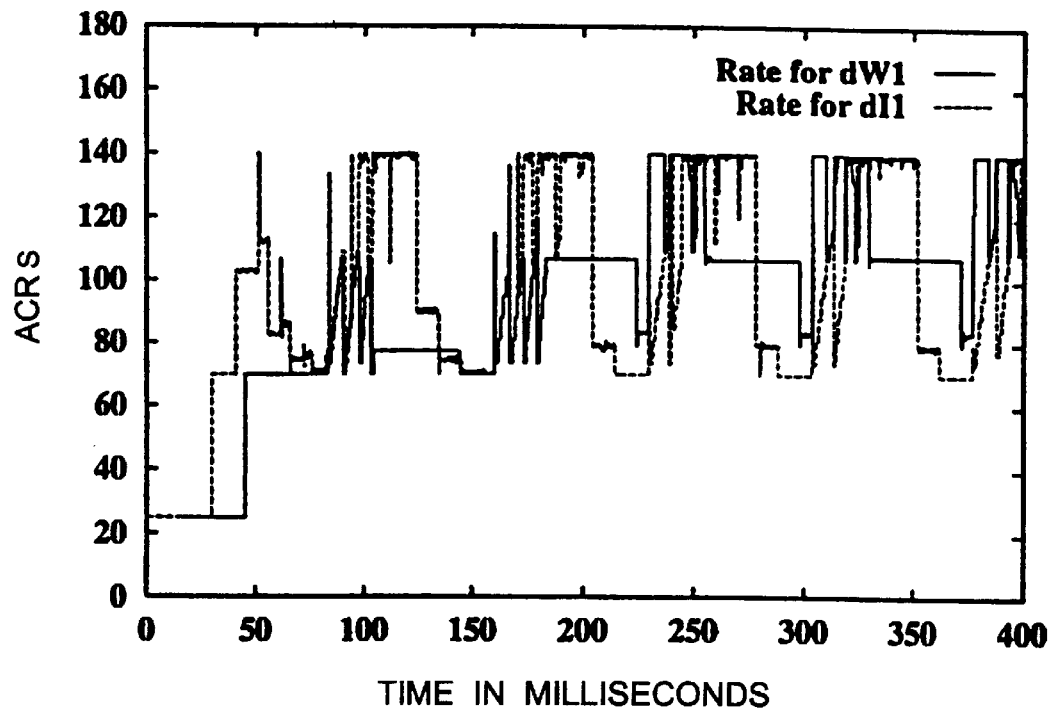
FIG. 38A is a graphical representation of the transmitted cell rate for one greedy source and one bursty source in a WAN (large bursts) with exponential averaging.
Figure 38B:
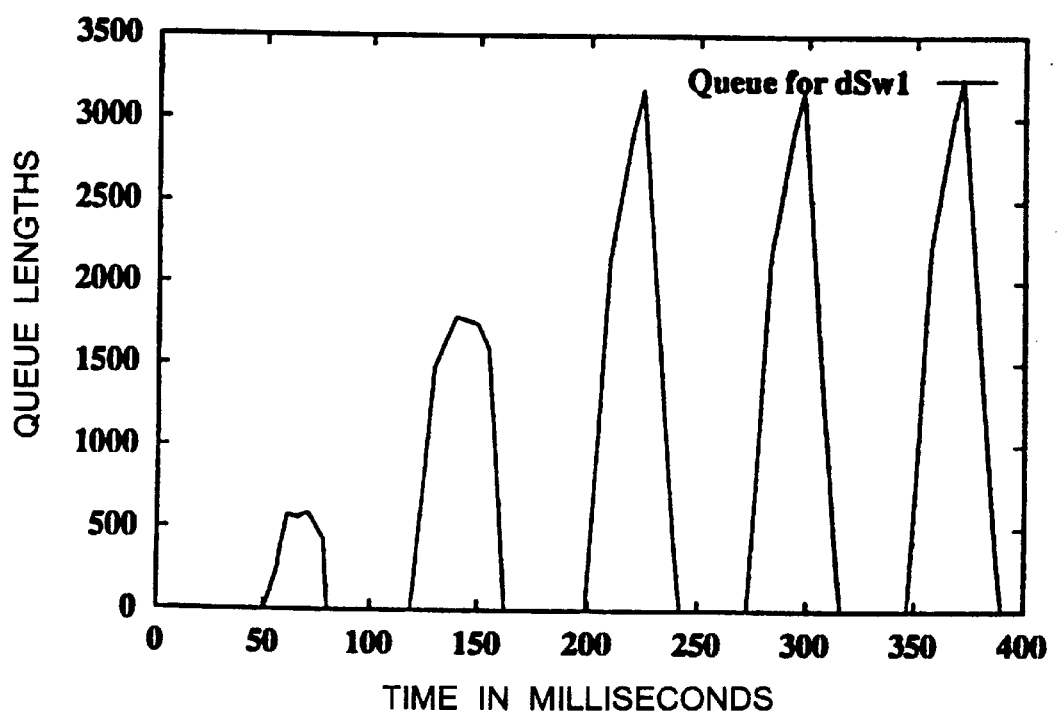
FIG. 38B is a graphical representation of the queue length for one greedy source and one bursty source in a WAN (large bursts) with exponential averaging.
Figure 38C:
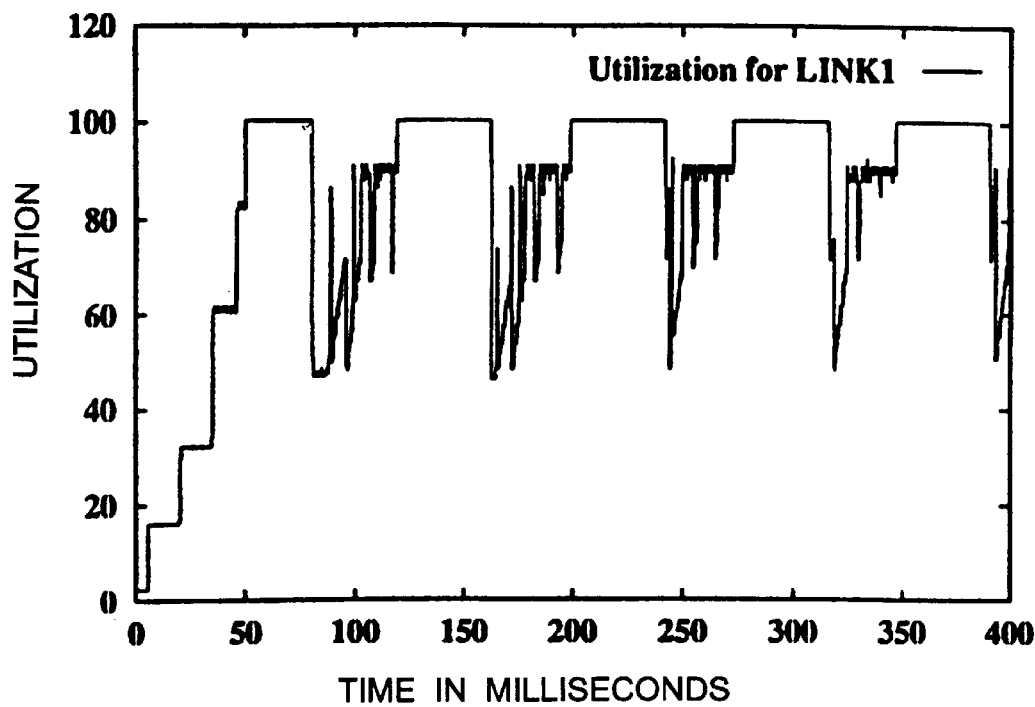
FIG. 38C is a graphical representation of the link utilization for one greedy source and one bursty source in a WAN (large bursts) with exponential averaging.
Figure 38D:
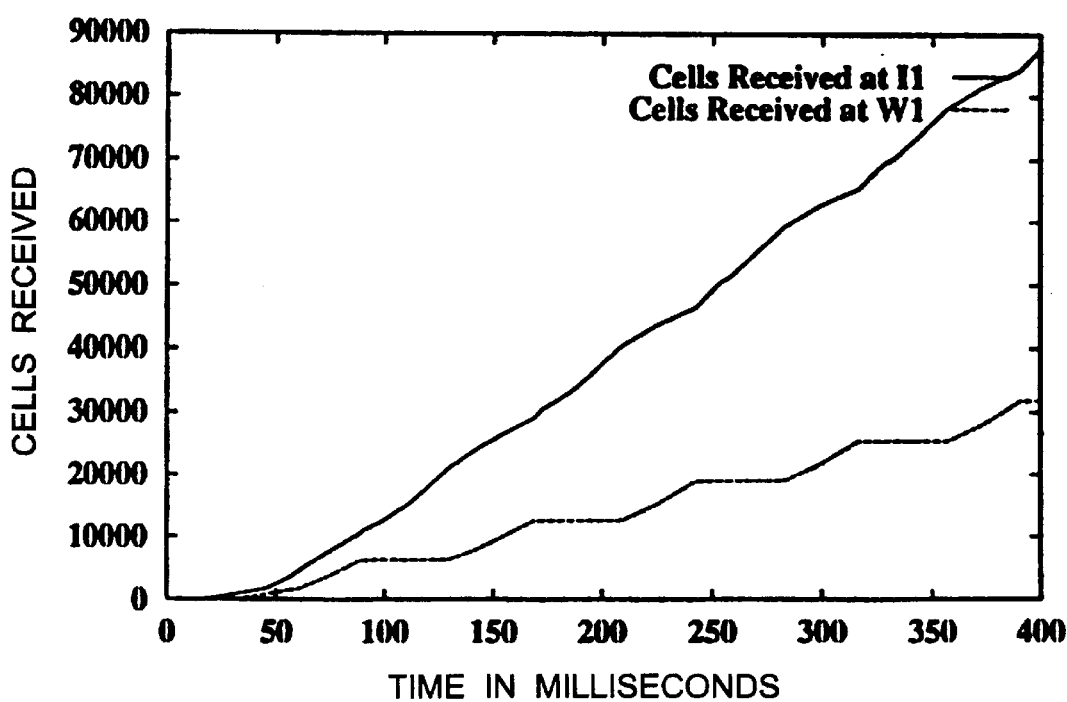
FIG. 38D is a graphical representation of the cell received for one greedy source and one bursty source in a WAN (large bursts) with exponential averaging.
Figure 39A:
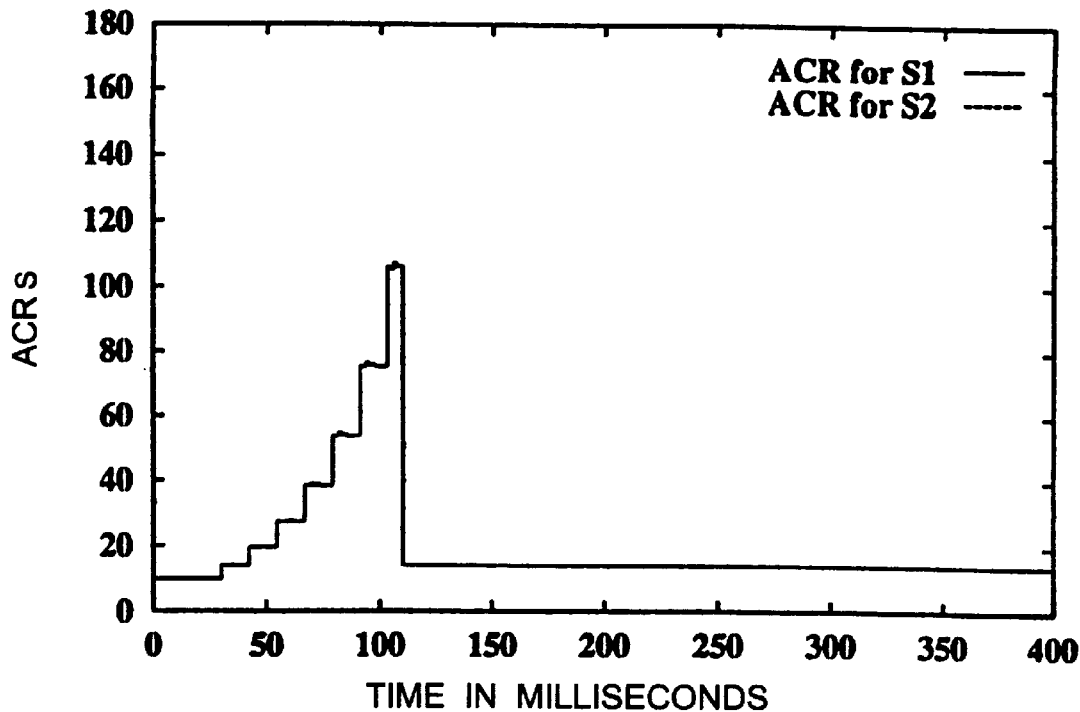
FIG. 39A is a graphical representation of the transmitted cell rate for ten ACR retaining sources in a WAN (effect of per-VC CCR)
Figure 39B:
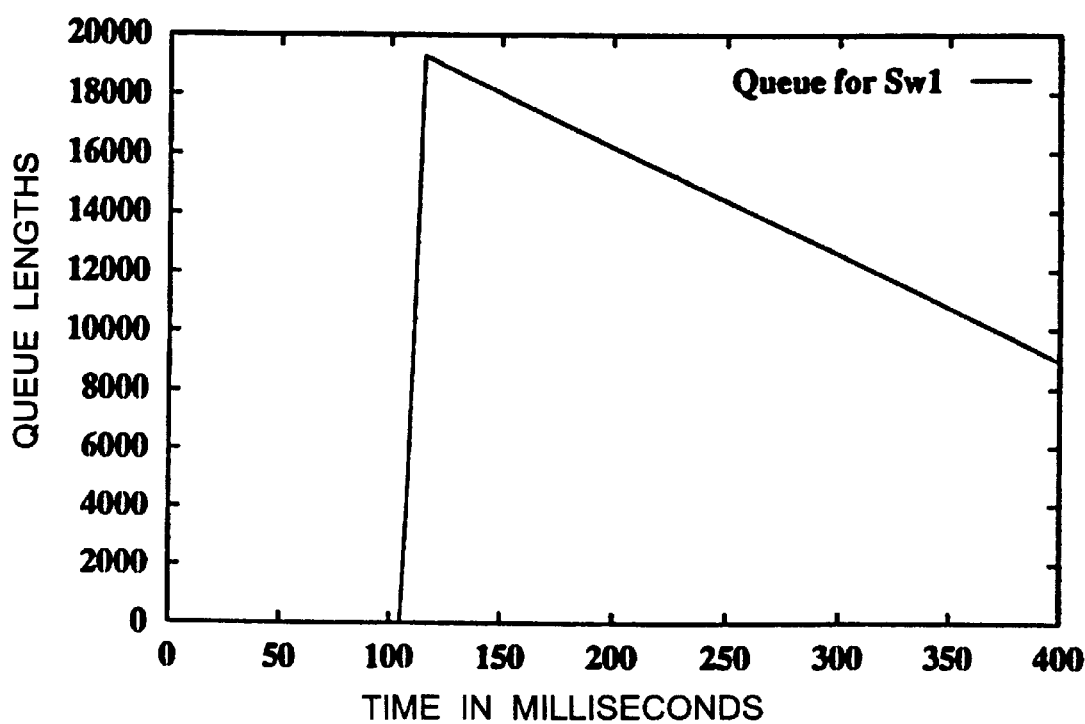
FIG. 39B is a graphical representation of the queue length for ten ACR retaining sources in a WAN (effect of per-VC CCR)
Figure 39C:
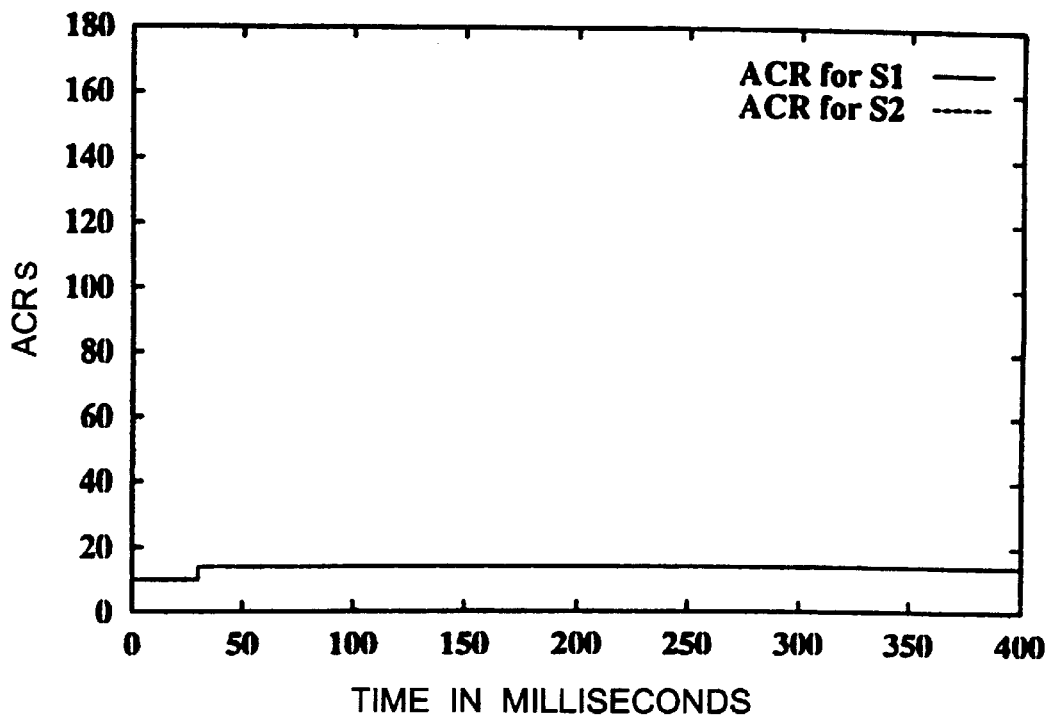
FIG. 39C is a graphical representation of the link utilization for ten ACR retaining sources in a WAN (effect of per-VC CCR)
Figure 39D:
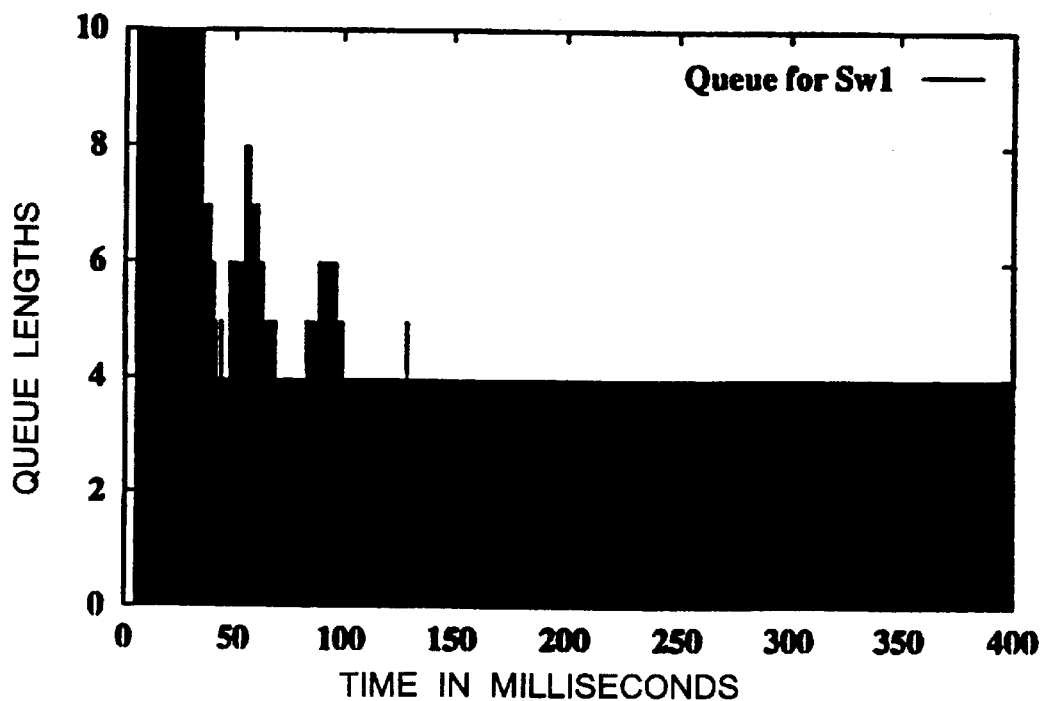
FIG. 39D is a graphical representation of the cell received for ten ACR retaining sources in a WAN (effect of per-VC CCR)
Figure 40A:
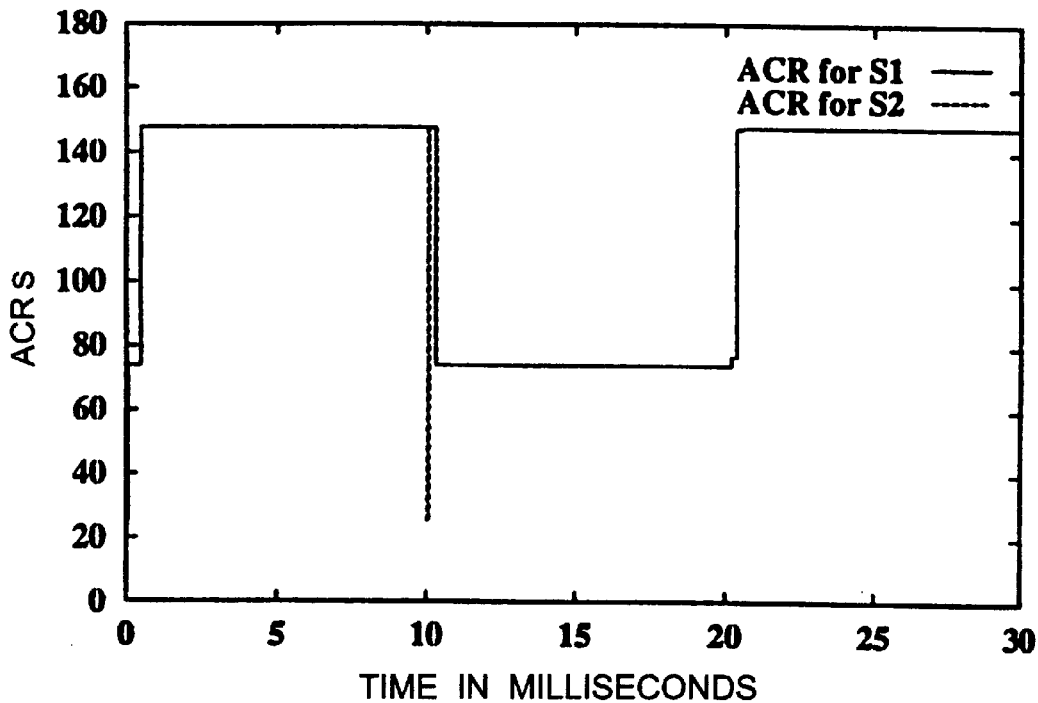
FIG. 40A is a graphical representation of the transmitted cell rate for a transient source configuration in a LAN (effect of 2-step increase)
Figure 40B:
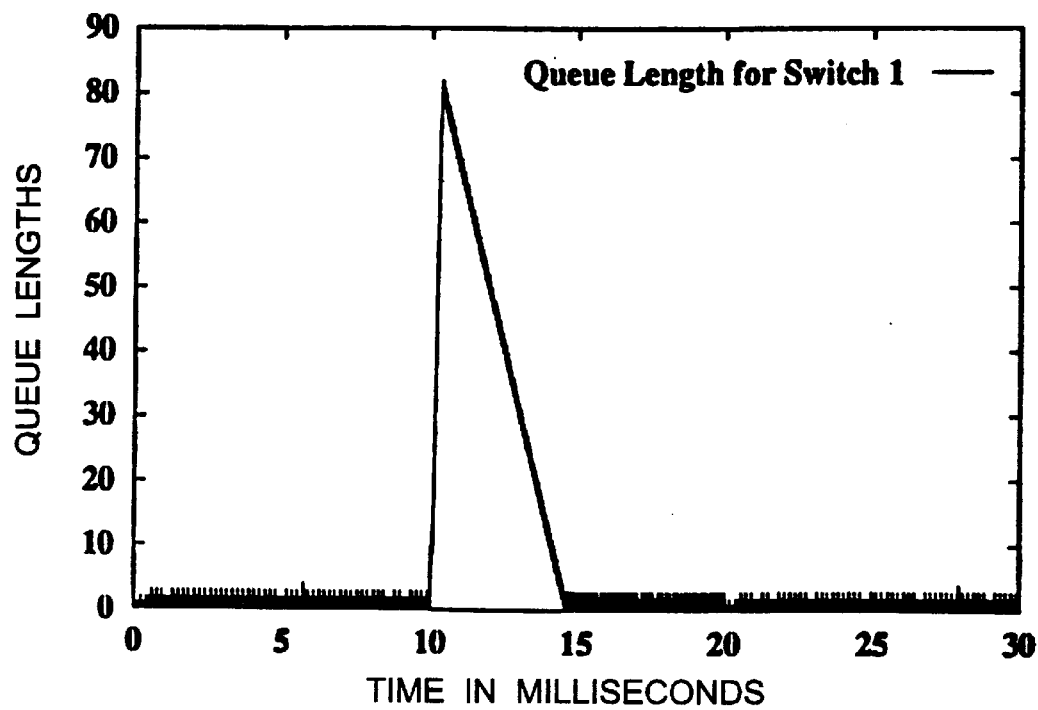
FIG. 40B is a graphical representation of the queue length for a transient source configuration in a LAN (effect of 2-step increase)
Figure 40C:
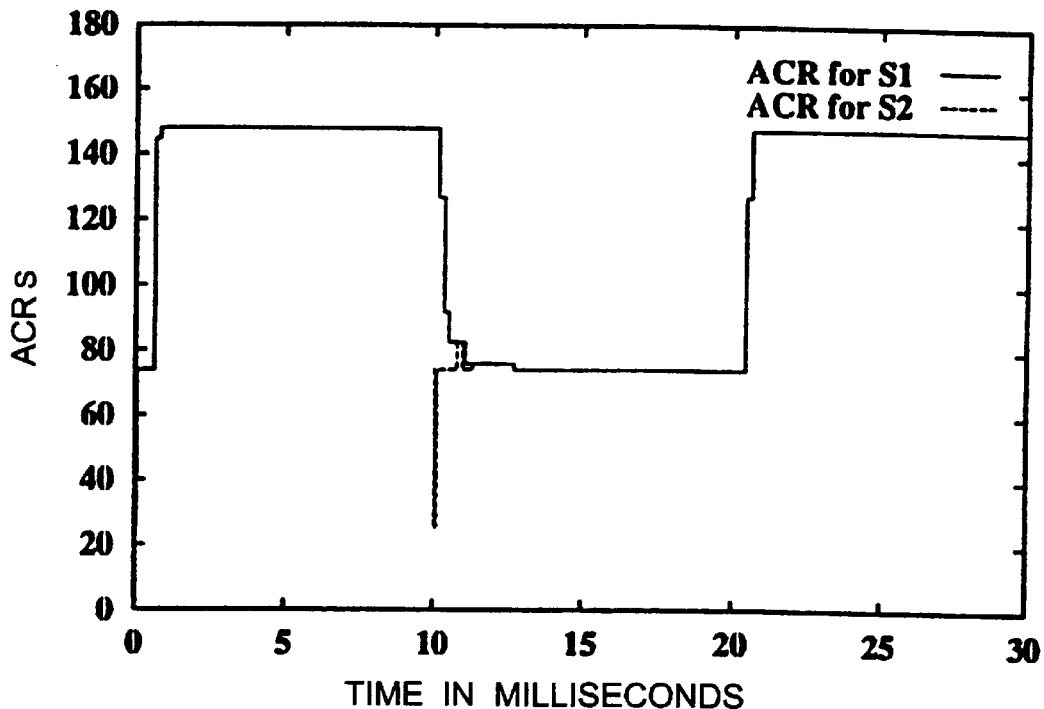
FIG. 40C is a graphical representation of the link utilization for a transient source configuration in a LAN (effect of 2-step increase)
Figure 40D:
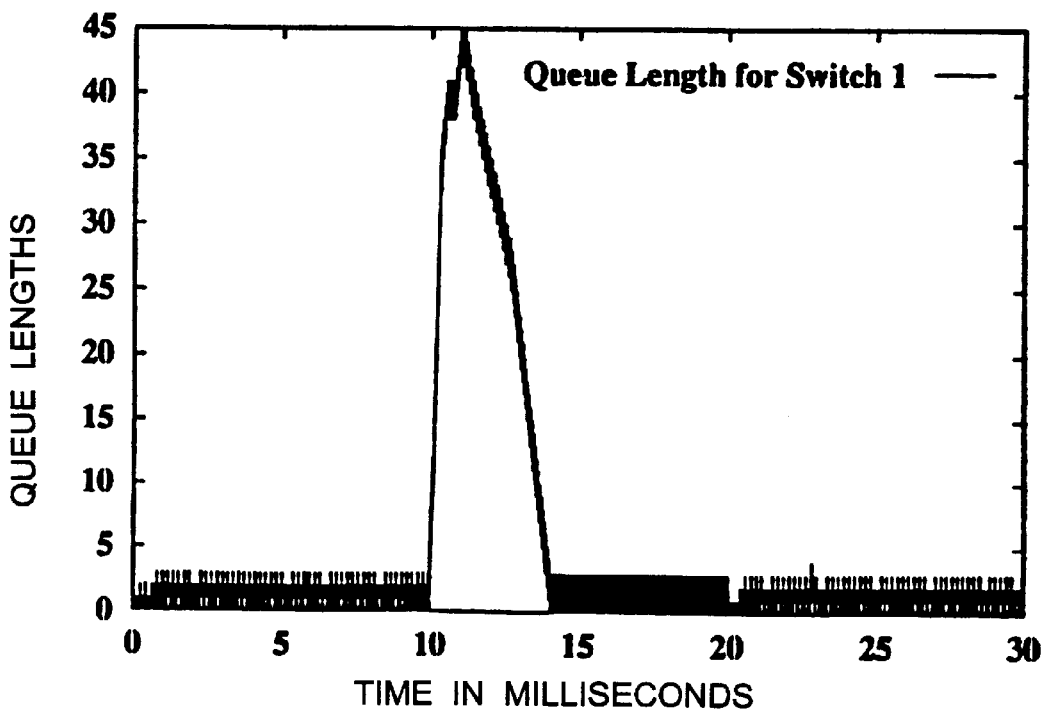
FIG. 40D is a graphical representation of the cell received for a transient source configuration in a LAN (effect of 2-step increase); and, FIG. 41 is a flowchart showing 2-class scheduling.

An example of this situation can be illustrated by an upstream configuration (see FIG. 30). The upstream configuration consists of three switches, and the second link is shared by $VC_{15}$, $VC_{16}$, and $VC_{17}$. Because there are 15 VCs on the first link, $VC_{15}$ is limited to a throughput of less than $\frac{1}{15}$ the link rate. $VC_{16}$ and $VC_{17}$ should, therefore, each converge to a little less than $\frac{7}{15}$ of the second link rate. FIGS. 31A–D illustrate that the ERICA algorithm converges to max-min allocations in this situation.

Regardless of the initial overload factor value, after a short certain transient period, all sources contending for bandwidth are allocated equal rates.

Variable Capacity

CBR and VBR services have a higher priority than the ABR service. In cases of VBR traffic, the ABR capacity becomes a variable quantity.

The two source configuration is used to demonstrate the behavior of ERICA in the presence of VBR sources. A deterministic VBR source was used whose PCR was 124.42 Mbps. FIGS. 32A–D illustrate the behavior of ERICA on a WAN where the VBR source was active for alternating periods of 1 ms with 1 ms inactive periods in between, while FIGS. 33A–D show the performance with VBR on/off periods of 20 ms. It is clear that ERICA rapidly detects the change in the available ABR capacity and gives the appropriate feedback to the sources.

Bursty Traffic

All the ABR sources in the previously described configurations are constant demand sources, also called infinite or greedy sources. This means that these sources have enough data to send at any allocated rate, and for any length of time. On the other hand, variable demand sources, or bursty sources, have active periods when they send data at the allocated rate, and idle periods when they do not send data and allocated rate is left unused.

FIGS. 34A–D, 35A–D, 36A–D and 37A–D illustrate the performance of ERICA in a two source configuration where one of the connections is a request-response type connection. FIGS. 34A–D illustrate the performance with small burst sizes, FIGS. 35A–D show the effect of medium burst sizes and FIGS. 36A–D illustrate the effect of large burst sizes. FIGS. 37A–D show that Bi-directional counting of the number of active sources (as discussed above) limits the queue sizes for large burst sizes. Finally, the effect of exponentially averaging the value of the number of active sources is illustrated in FIG. 38A–D. As previously explained, we should account for the presence of a source, even though it might be currently idle.

ACR Retention

The per-VC CCR measurement is especially useful in cases of "ACR retention". ACR retention occurs because sources may not be able to use their rate allocations. For example, the input to the ATM end-system can be steady, but have a rate lower than its ABR allocation. Another example is an end-system which supports multiple VCs (to possibly different destinations) on a single outgoing link. A VC may not be able to use its ACR allocation because the outgoing link is running at capacity.

In such situations, the switches reallocate the unused capacity to the other sources which are unconstrained. However, if the ACR retaining sources suddenly use their capacity, a potential overload situation exists.

FIGS. 39A–D illustrate the performance of the system when ten sources are retaining their ACRs, and cannot send at a rate of more than 10 Mbps. After 100 ms, all the sources suddenly start sending at their full capacities. ERICA detects the overload and gives the appropriate feedback asking sources to decrease their rates. The per-VC CCR measurement results in more conservative allocations, and hence smaller queues in this case.

Avoiding Transient Overloads

The enhancement previously discussed does not allow a low rate VC to spike up above fair share. This VC takes an extra round trip compared to the basic ERICA because it first comes to Fair share before rising further. The switch can use the extra round trip to give feedback to all the sources and measure a new load factor and reduce overloading sources earlier. The enhancement hence reduces the maximum queues in such situations. FIGS. 40A–D illustrate the effect of the enhancement on a transient configuration in a Local Area Network. The transient configuration is similar to the two source configuration because two sources share the same link, but one of the sources is only active from 10 ms to 20 ms while the other source is active throughout. It is clear that ERICA exhibits good transient response characteristics to changing load, and the enhancement mitigates sudden overloads.

The enhancement also protects the sources against cell loss, and the network against longer queues in certain cases of ACR retention. As mentioned in the previous subsection, ACR retention occurs when a VC is sending at a rate below its allocated ACR. To achieve high utilization, the switches may allocate the unused bandwidth to other sources, without changing the allocation of the ACR retaining source. This becomes a problem when the ACR retaining source(s) start suddenly sending data at their allocated ACRs. This may result in transient queues.

The ATM Forum has developed optional Source End System (SES) policies to tackle this problem. These policies reduce the ACR of a VC at the SES when the VC is sending at a rate much below the allocated ACR. However, these policies do not provide complete protection against ACR retention. After a certain rate threshold, the source is declared as "not ACR Retaining." In this state, it is possible that the network feedback may ask the source to increase its ACR (even though it cannot utilize the new ACR).

Our enhancement complements the SES mechanism and in certain cases allows ACR increase only up to the Fair share (a conservative rate increase). The SES mechanism immediately takes effect after the rate increase and starts reducing the ACR. Hence, any RM cell sent by this source will have a CCR value less than fair share. Now, due to the enhancement, the switch will limit its subsequent allocation to fair share, and the SES mechanism takes effect again. This process continues until the source bottleneck (ACR retention) goes away. Hence the ACR of such ACR retaining sources is limited to the fair share and, when the source bottleneck goes away, the network queues are limited.

The above description merely provides a disclosure of particular embodiments of the invention and is not intended for the purpose of limiting the same thereto. As such, the invention is not limited to only the above described embodiments. Rather, it is recognized that one skilled in the art could conceive alternative embodiments that fall within the scope of the invention.

Having thus described the invention, we now claim:

1. A method utilizing successive averaging intervals of fixed time duration adaptable for use in a network having at least one source and at least one destination between which data is transferred through a data link via a switch, the method comprising steps of:

determining a number of active sources at an end of each averaging interval;

determining an available bit rate capacity based on a product of a target utilization of the data link and an available bandwidth for the data link;

measuring an input rate of the data at the switch based on a total number of available bit rate cells input and counted from each of the at least one source and a last averaging interval;

determining an overload factor based on the input rate and the available bit rate capacity;

determining a fair share allocation of capacity based on the available bit rate capacity and the number of active sources in the last averaging interval;

resetting the available bit rate cell input count and a virtual channel activity;

upon receipt of a cell on a virtual channel, marking the respective virtual channel as active;

upon receipt of the cell, incrementing the count of the total number of cells input;

if the received cell is a backward control cell, determining a virtual channel share allocation for each of the at least one source based on a respective first transmission rate and the overload factor;

selecting a second transmission rate for each of the at least one source by selecting a maximum of the fair share allocation and the respective virtual channel allocation;

selecting an explicit rate for each of the at least one source by selecting the minimum of the respective second transmission rate and the available bit rate capacity; and, selectively adjusting the respective first transmission rate of each of the at least one source to the respective explicit transmission rate based on a minimum of the respective first transmission rate and the respective explicit transmission rate.

2. The method set forth in claim 1, further comprising the steps of:

determining whether a current cell rate is less than the fair share allocation and whether the second transmission rate is greater than or equal to the fair share allocation; and, adjusting the second transmission rate to the fair share allocation if the current cell rate is less than the fair share allocation and the second transmission rate is greater than or equal to the fair share allocation.

3. The method set forth in claim 2, further comprising the step of:

disabling feedback to the source for one measurement interval after the second transmission rate is adjusted.

4. The method set forth in claim 1, further comprising the steps of:

if the received cell in the switch is the backward control cell, determining whether a selected virtual channel is active in a forward direction during a current averaging interval; and, marking the selected virtual channel as active if it is determined that the selected virtual channel is inactive in a forward direction during a current averaging interval.

5. The method set forth in claim 4, further comprising the steps of:

determining whether a selected virtual channel was not active in a forward direction during a last averaging interval;

incrementing the count of the number of active sources in the last interval by one;

determining a fair share allocation of capacity based on the available bit rate capacity and the number of active sources in the last interval; and, marking the virtual channel as active in the last interval.

6. The method set forth in claim 1, further comprising steps of:

determining, at the end of each averaging interval, whether the number of active sources is less than one; and, setting the number of active sources to one if the number of active sources is less than one.

7. The method set forth in claim 1, further comprising steps of:

setting, at the end of each averaging interval, the overload factor to infinity if the available bit rate capacity is less than or equal to zero;

setting the overload factor based upon the available bit rate input rate and the available bit rate capacity if the available bit rate capacity is greater than zero and the overload factor in the last averaging interval is equal to infinity; and, determining the overload factor as an exponential average based upon the available bit rate input rate and the available bit rate capacity if the available bit rate capacity is greater than zero and the overload factor in the last averaging interval is not equal to infinity.

8. The method set forth in claim 1, further comprising the steps of:

determining, at the end of each averaging interval, the available bit rate capacity in cells based upon the target data link utilization, the data link bandwidth, the length of the current averaging interval, and the variable and the constat bit rate cell counts;

determining an exponential average of the available bit rate capacity in cells;

determining an exponential average of the length of the averaging interval;

determining an exponential average of the available bit rate input cell count;

determining an average available bit rate capacity based upon the exponential averages of the available bit rate capacity and the length of the averaging interval;

determining an average available bit rate input rate based upon the exponential averages of the available bit rate input cell count and the length of the averaging interval;

determining the overload factor to be infinity if the average available bit rate capacity is less than or equal to zero; and, determining the overload factor based upon the average available bit rate input rate and the average available bit rate capacity if the average available bit rate capacity is not less than or equal to zero.

9. The method set forth in claim 1, further comprising steps of:

setting the target utilization to an initial value of one;

determining a target queue length based on a time required to empty a queue and the available bit rate capacity;

determining a queue control factor as a function of queue length; and, adjusting the available bit rate capacity based on the queue control factor before determining the overload factor.

10. The method set forth in claim 1, further comprising steps of:

setting initial values of an available bit rate credit, and a variable bit rate credit to predetermined values of an available bit rate fraction and a variable bit rate fraction respectively;

scheduling, at each of at least one cell slot time, a variable bit rate cell if the variable bit rate credit is greater than or equal to the available bit rate credit and the variable bit rate queue is not empty, or if the variable bit rate credit is less than the available bit rate credit and the available bit rate queue is empty and the variable bit rate queue is not empty;

scheduling, at each of the cell slot times an available bit rate cell if the available bit rate credit is greater than or equal to the variable bit rate credit and the available bit rate queue is not empty, or if the available bit rate credit is less than the variable bit rate credit and the variable bit rate queue is empty and the available bit rate queue is not empty;

decrementing the available bit rate credit by one if the available bit rate cell was scheduled in the respective cell slot time and the available bit rate credit was greater than the variable bit rate credit and the variable bit rate queue was non empty;

decrementing the variable bit rate credit by one if the variable bit rate cell was scheduled in the respective cell slot time and the variable bit rate credit was greater than the available bit rate credit and the available bit rate queue was non empty;

incrementing the available bit rate credit by the available bit rate fraction; and, incrementing the variable bit rate credit by the variable bit rate fraction.

11. A method utilizing successive averaging intervals of fixed time duration adaptable for use in a network having at least one source and at least one destination between which data is transferred through a data link via a switch, the method comprising steps of:

determining a number of active sources at an end of each averaging interval;

determining an available bit rate capacity based on a product of a target utilization of the data link and an available bandwidth for the data link;

measuring an input rate of the data at the switch based on a total number of available bit rate cells input and counted from each of the at least one source and a last averaging interval;

determining an overload factor based on the input rate and the available bit rate capacity;

determining a fair share allocation of capacity based on the available bit rate capacity and the number of active sources in the last averaging interval;

resetting the available bit rate cell input count and a virtual channel activity;

determining a maximum of allocations to sources in a previous averaging interval;

upon receipt of a cell on a virtual channel, marking the respective virtual channel as active;

upon receipt of the cell, incrementing the count of the total number of cells input;

if the received cell is a backward control cell, determining a virtual channel share allocation for each of the at least one source based on a respective first transmission rate and the overload factor;

selecting a second transmission rate for each of the at least one source by selecting a maximum of the fair share allocation, the respective virtual channel allocation, and the maximum allocation value in the previous interval if the overload factor is less than or equal to the predetermined value;

selecting the second transmission rate for each of the at least one source by selecting a maximum of the fair share allocation and the respective virtual channel allocation if the overload factor is greater than the predetermined value;

maintaining a running maximum of allocations to sources in a current averaging interval;

selecting an explicit rate for each of the at least one source by selecting the minimum of the respective second transmission rate and the available bit rate capacity; and, selectively adjusting the respective first transmission rate of each of the at least one source to the respective explicit transmission rate based on a minimum of the respective first transmission rate and the respective explicit transmission rate.

12. The method set forth in claim 11, further comprising the steps of:

determining whether a current cell rate is less than the fair share allocation and whether the second transmission rate is greater than or equal to the fair share allocation; and, adjusting the second transmission rate to the fair share allocation if the current cell rate is less than the fair share allocation and the second transmission rate is greater than or equal to the fair share allocation.

13. The method set forth in claim 12, further comprising the step of:

disabling feedback to the source for one measurement interval after the second transmission rate is adjusted.

14. A method utilizing successive averaging intervals of fixed time duration adaptable for use in a network having at least one source and at least one destination between which data is transferred through a data link via a switch, the method comprising steps of:

determining a number of active sources at an end of each averaging interval;

determining an available bit rate capacity based on a product of a target utilization of the data link and an available bandwidth for the data link;

measuring an input rate of the data at the switch based on a total number of available bit rate cells input and counted from each of the at least one source and a last averaging interval;

determining an overload factor based on the input rate and the available bit rate capacity;

determining a fair share allocation of capacity based on the available bit rate capacity and the number of active sources in the last averaging interval;

resetting the available bit rate cell input count and a virtual channel activity;

upon receipt of a cell on a virtual channel, marking the respective virtual channel as active;

upon receipt of a cell, incrementing the count of the total number of cells input;

if the received cell is a forward control cell, recording a current cell rate for a corresponding virtual channel;

if the received cell is a backward control cell, determining a virtual channel share allocation for each of the at least one source based on the recorded current cell rate and the overload factor;

selecting a second transmission rate for each of the at least one source by selecting a maximum of the fair share allocation and the respective virtual channel allocation;

selecting an explicit rate for each of the at least one source by selecting the minimum of the respective second transmission rate and the available bit rate capacity; and, selectively adjusting the respective first transmission rate of each of the at least one source to the respective explicit transmission rate based on a minimum of the respective first transmission rate and the respective explicit transmission rate.

15. A method adaptable for use in a network having at least one source and at least one destination between which data is transferred through a data link via a switch, the method comprising steps of:

measuring an input rate of the data at the switch based on a sum of respective first transmission rates of each of the at least one source, the first transmission rates representing actual transmission rates;

determining an available bit rate capacity based on a product of a target utilization of the data link and an available bandwidth for the data link;

determining a number of active sources;

determining an overload factor based on the input rate and the available bit rate capacity;

is determining a fair share allocation of capacity based on the available bit rate capacity and the number of active sources;

selecting the second transmission rate for each of the at least one source by selecting a maximum of the fair share allocation and the respective virtual channel allocation;

selecting an explicit rate for each of the at least one source by selecting the minimum of the respective second transmission rate and the available bit rate capacity, and selectively adjusting the respective first transmission rate of each of the at least one source to the respective explicit transmission rate based on a minimum of the respective first transmission rate and the respective explicit transmission rate.

16. A method utilizing successive averaging intervals of fixed time duration adaptable for use in a network having at least one source and at least one destination between which available bit rate data cells, constant bit rate data cells and variable bit rate data cells are transferred through a data link via a switch, the method comprising steps of:

counting the constant bit rate data cells and the variable bit rate data cells received at the switch;

determining a number of active sources at an end of each averaging interval;

measuring a first input rate of the constant bit rate data cells and the variable bit rate data cells at the switch based on a result of the counting during an averaging interval;

determining an available bit rate capacity based on selecting a maximum of 1) a product of a target utilization of the data link and an available bandwidth for the data link less the first input rate, and 2) zero;

determining a second input rate based on a total number of available bit rate cells input and counted from each of the at least one source and a last averaging interval;

determining an overload factor based on the second input rate and the available bit rate capacity;

determining a fair share allocation of capacity based on the available bit rate capacity and the number of active sources in the last averaging interval;

resetting the constant and variable bit rate cell input counts;

resetting the available bit rate cell input count and a virtual channel activity;

upon receipt of a cell on a virtual channel, marking the respective virtual channel as active;

upon receipt of the cell, incrementing the count of the total number of cells input;

if the received cell is a backward control cell, determining a virtual channel share allocation for each of the at least one source based on a respective first transmission rate and the overload factor;

selecting a second transmission rate for each of the at least one source by selecting a maximum of the fair share allocation and the respective virtual channel allocation;

selecting an explicit rate for each of the at least one source by selecting the minimum of the respective second transmission rate and the available bit rate capacity; and, selectively adjusting the respective first transmission rate of each of the at least one source to the respective explicit transmission rate based on a minimum of the respective first transmission rate and the respective explicit transmission rate.

17. A method utilizing successive averaging intervals of fixed time duration adaptable for use in a network having at least one source and at least one destination between which data is transferred through a data link via a switch, the method comprising steps of:

determining a level of activity of each source based on its level of activity in a current averaging interval and a decay factor;

determining a number of active sources by adding the level of activity of all sources at an end of each averaging interval;

determining an available bit rate capacity based on a product of a target utilization of the data link and an available bandwidth for the data link;

measuring an input rate of the data at the switch based on a total number of available bit rate cells input and counted from each of the at least one source and a last averaging interval;

determining an overload factor based on the input rate and the available bit rate capacity;

determining a fair share allocation of capacity based on the available bit rate capacity and the number of active sources in the last averaging interval;

resetting the available bit rate cell input count and a virtual channel activity;

upon receipt of a cell in the forward direction on a virtual channel, determining the number of active sources in the current averaging interval based on the level of activity on the respective virtual channel;

determining whether a selected virtual channel was not active in a forward direction during a last averaging interval;

incrementing the count of the number of active sources in the last interval by one, and subtracting from it the activity level of the virtual channel in the last averaging interval;

determining a fair share allocation of capacity based on the available bit rate capacity and the number of active sources in the last averaging interval;

upon receipt of the cell on the virtual channel, updating the activity level of the respective virtual channel;

upon receipt of the cell, incrementing the count of the total number of cells input;

if the received cell is a backward control cell, determining a virtual channel share allocation for each of the at least one source based on a respective first transmission rate and the overload factor;

selecting a second transmission rate for each of the at least one source by selecting a maximum of the fair share allocation and the respective virtual channel allocation;

selecting an explicit rate for each of the at least one source by selecting the minimum of the respective second transmission rate and the available bit rate capacity; and, selectively adjusting the respective first transmission rate of each of the at least one source to the respective explicit transmission rate based on a minimum of the respective first transmission rate and the respective explicit transmission rate.

18. A method utilizing successive averaging intervals of fixed time duration adaptable for use in a network having at least one source and at least one destination between which data is transferred through a data link via a switch, the method comprising steps of:

- determining a number of active sources at an end of each averaging interval;
- determining an available bit rate capacity based on a product of a target utilization of the data link and an available bandwidth for the data link;
- measuring an input rate of the data at the switch based on a total number of available bit rate cells input and counted from each of the at least one source and the last averaging interval;
- determining an overload factor based on the input rate and the available bit rate capacity if the available bit rate capacity is greater than zero;
- determining the overload factor to be infinity if the available bit rate capacity is less than or equal to zero;
- determining a fair share allocation of capacity based on the available bit rate capacity and the number of active sources in the last interval;
- resetting the available bit rate cell input count and a virtual channel activity;
- upon receipt of a cell on a virtual channel, marking the respective virtual channel as active;
- upon receipt of the cell, incrementing the count of the total number of cells input;
- if the received cell is a backward control cell, determining a virtual channel share allocation for each of the at least one source based on a respective first transmission rate and the overload factor;
- selecting a second transmission rate for each of the at least one source by selecting a maximum of the fair share allocation and the respective virtual channel allocation;
- selecting an explicit rate for each of the at least one source by selecting the minimum of the respective second transmission rate and the available bit rate capacity; and,
- selectively adjusting the respective first transmission rate of each of the at least one source to the respective explicit transmission rate based on a minimum of the respective first transmission rate and the respective explicit transmission rate.

19. An apparatus utilizing successive averaging intervals of fixed time duration adaptable for use in a network having at least one source and at least one destination between which data is transferred through a data link via a switch, the apparatus comprising:

- means for determining a number of active sources at an end of each averaging interval;
- means for determining an available bit rate capacity based on a product of a target utilization of the data link and an available bandwidth for the data link;
- means for measuring an input rate of the data at the switch based on a total number of available bit rate cells input and counted from each of the at least one source and a last averaging interval;
- means for determining an overload factor based on the input rate and the available bit rate capacity;
- means for determining a fair share allocation of capacity based on the available bit rate capacity and the number of active sources in the last averaging interval;
- means for resetting the available bit rate cell input count and a virtual channel activity;
- means for marking a virtual channel as active upon receipt of a cell on the respective virtual channel;
- means for incrementing the count of the total number of cells input upon receipt of the cell;
- means for determining, if the received cell is a backward control cell, a virtual channel share allocation for each of the at least one source based on a respective first transmission rate and the overload factor;
- means for selecting a second transmission rate for each of the at least one source by selecting a maximum of the fair share allocation and the respective virtual channel allocation;
- means for selecting an explicit rate for each of the at least one source by selecting the minimum of the respective second transmission rate and the available bit rate capacity; and,
- means for selectively adjusting the respective first transmission rate of each of the at least one source to the respective explicit transmission rate based on a minimum of the respective first transmission rate and the respective explicit transmission rate.

20. The apparatus set forth in claim 19, further comprising:

- means for determining whether a current cell rate is less than the fair share allocation and whether the second transmission rate is greater than or equal to the fair share allocation; and,
- adjusting the second transmission rate to the fair share allocation if the current cell rate is less than the fair share allocation and the second transmission rate is greater than or equal to the fair share allocation.

21. The apparatus set forth in claim 20, further comprising:

- means for disabling feedback to the source for one measurement interval after the second transmission rate is adjusted.

22. The apparatus set forth in claim 19, further comprising:

- means for determining, if the received cell in the switch is a backward control cell, whether a selected virtual channel is active in a forward direction during a current averaging interval; and,
- means for marking the selected virtual channel as active if it is determined that the selected virtual channel is inactive in a forward direction during a current averaging interval.

23. The apparatus set forth in claim 22, further comprising:

- means for determining whether a selected virtual channel was not active in a forward direction during a last averaging interval;
- means for incrementing the count of the number of active sources in the last interval by one;
- means for determining a fair share allocation of capacity based on the available bit rate capacity and the number of active sources in the last interval; and,
- means for marking the virtual channel as active in the last interval.

24. The apparatus set forth in claim 19, further comprising:

- means for determining, at the end of each averaging interval, whether the number of active sources is less than one; and,
- means for setting the number of active sources to one if the number of active sources is less than one.

25. The apparatus set forth in claim 19, further comprising:

means for setting, at the end of each averaging interval, the overload factor to infinity if the available bit rate capacity is less than or equal to zero;

means for setting the overload factor based upon the available bit rate input rate and the available bit rate capacity if the available bit rate capacity is greater than zero and the overload factor in the last averaging interval is equal to infinity; and, means for determining the overload factor as an exponential average based upon the available bit rate input rate and the available bit rate capacity if the available bit rate capacity is greater than zero and the overload factor in the last averaging interval is not equal to infinity.

26. The apparatus set forth in claim 19, further comprising:

means for determining, at the end of each averaging interval, the available bit rate capacity in the received cells based upon the target data link utilization, the data link bandwidth, the length of the current averaging interval, and the variable and the constant bit rate cell counts;

means for determining an exponential average of the available bit rate capacity in cells;

means for determining an exponential average of the length of the averaging interval;

means for determining an exponential average of the available bit rate input cell count;

means for determining an average available bit rate capacity based upon the exponential averages of the available bit rate capacity and the length of the averaging interval;

means for determining an average available bit rate input rate based upon the exponential averages of the available bit rate input cell count and the length of the averaging interval;

means for determining the overload factor to be infinity if the average available bit rate capacity is less than or equal to zero; and, means for determining the overload factor based upon the average available bit rate input rate and the average available bit rate capacity if the average available bit rate capacity is not less than or equal to zero.

27. The apparatus set forth in claim 19, further comprising:

means for setting the target utilization to an initial value of one;

means for determining a target queue length based on a time required to empty a queue and the available bit rate capacity;

means for determining a queue control factor as a function of queue length; and, means for adjusting the available bit rate capacity based on the queue control factor before determining the overload factor.

28. The apparatus set forth in claim 19, further comprising:

means for setting initial values of an available bit rate credit, and a variable bit rate credit to predetermined values of an available bit rate fraction and a variable bit rate fraction respectively;

means for scheduling, at each of at least one cell slot time, a variable bit rate cell if the variable bit rate credit is greater than or equal to the available bit rate credit and the variable bit rate queue is not empty, or if the variable bit rate credit is less than the available bit rate credit and the available bit rate queue is empty and the variable bit rate queue is not empty;

means for scheduling, at each of the cell slot times, an available bit rate cell if the available bit rate credit is greater than or equal to the variable bit rate credit and the available bit rate queue is not empty, or if the available bit rate credit is less than the variable bit rate credit and the variable bit rate queue is empty and the available bit rate queue is not empty;

means for decrementing the available bit rate credit by one if an available bit rate cell was scheduled in the respective cell slot time and the available bit rate credit was greater than the variable bit rate credit and the variable bit rate queue was non empty;

means for decrementing the variable bit rate credit by one if an variable bit rate cell was scheduled in the respective cell slot time and the variable bit rate credit was greater than the available bit rate credit and the available bit rate queue was non empty;

means for incrementing the available bit rate credit by the available bit rate fraction; and, means for incrementing the variable bit rate credit by the variable bit rate fraction.

29. An apparatus utilizing successive averaging intervals of fixed time duration adaptable for use in a network having at least one source and at least one destination between which data is transferred through a data link via a switch, the apparatus comprising:

means for determining a number of active sources at an end of each averaging interval;

means for determining an available bit rate capacity based on a product of a target utilization of the data link and an available bandwidth for the data link;

means for measuring an input rate of the data at the switch based on a total number of available bit rate cells input and counted from each of the at least one source and a last averaging interval;

means for determining an overload factor based on the input rate and the available bit rate capacity;

means for determining a fair share allocation of capacity based on the available bit rate capacity and the number of active sources in the last averaging interval;

means for resetting the available bit rate cell input count and virtual channel activity;

means for determining a maximum of allocations to sources in a previous averaging interval;

means for marking, upon receipt of a cell on a virtual channel, the respective virtual channel as active;

means for incrementing, upon receipt of the cell, the count of the total number of cells input;

means for determining, if the received cell is a backward control cell, a virtual channel share allocation for each of the at least one source based on a respective first transmission rate and the overload factor;

means for selecting a second transmission rate for each of the at least one source by selecting a maximum of the fair share allocation, the respective virtual channel allocation, and the maximum allocation value in the previous interval if the overload factor is less than or equal to the predetermined value;

means for selecting the second transmission rate for each of the at least one source by selecting a maximum of the fair share allocation and the respective virtual channel allocation if the overload factor is greater than the predetermined value;

means for maintaining a running maximum of allocations to sources in a current averaging interval;

means for selecting an explicit rate for each of the at least one source by selecting the minimum of the respective second transmission rate and the available bit rate capacity; and, means for selectively adjusting the respective first transmission rate of each of the at least one source to the respective explicit transmission rate based on a minimum of the respective first transmission rate and the respective explicit transmission rate.

30. The apparatus set forth in claim 29, further comprising:

means for determining whether a current cell rate is less than the fair share allocation and whether the second transmission rate is greater than or equal to the fair share allocation; and, means for adjusting the second transmission rate to the fair share allocation if the current cell rate is less than the fair share allocation and the second transmission rate is greater than or equal to the fair share allocation.

31. The apparatus set forth in claim 30, further comprising:

means for disabling feedback to the source for one measurement interval after the second transmission rate is adjusted.

32. An apparatus method utilizing successive averaging intervals of fixed time duration adaptable for use in a network having at least one source and at least one destination between which data is transferred through a data link via a switch, the apparatus comprising:

means for determining a number of active sources at an end of each averaging interval;

means for determining an available bit rate capacity based on a product of a target utilization of the data link and an available bandwidth for the data link;

means for measuring an input rate of the data at the switch based on a total number of available bit rate cells input and counted from each of the at least one source and a last averaging interval;

means for determining an overload factor based on the input rate and the available bit rate capacity;

means for determining a fair share allocation of capacity based on the available bit rate capacity and the number of active sources in the last averaging interval;

means for resetting the available bit rate cell input count and virtual channel activity;

means for marking, upon receipt of a cell on a virtual channel, the respective virtual channel as active;

means for incrementing, upon receipt of the [a] cell, the count of the total number of cells input;

means for recording, if the received cell is a forward control cell, a current cell rate for a corresponding virtual channel;

means for determining, if the received cell is a backward control cell, a virtual channel share allocation for each of the at least one source based on the recorded current cell rate and the overload factor;

means for selecting a second transmission rate for each of the at least one source by selecting a maximum of the fair share allocation and the respective virtual channel allocation;

means for selecting an explicit rate for each of the at least one source by selecting the minimum of the respective second transmission rate and the available bit rate capacity; and, means for selectively adjusting the respective first transmission rate of each of the at least one source to the respective explicit transmission rate based on a minimum of the respective first transmission rate and the respective explicit transmission rate.

33. An apparatus adaptable for use in a network having at least one source and at least one destination between which data is transferred through a data link via a switch, the apparatus comprising:

means for measuring an input rate of the data at the switch based on a sum of respective first transmission rates of each of the at least one source, the first transmission rates representing actual transmission rates;

means for determining an available bit rate capacity based on a product of a target utilization of the data link and an available bandwidth for the data link;

means for determining a number of active sources;

means for determining an overload factor based on the input rate and the available bit rate capacity;

means for determining a fair share allocation of capacity based on the available bit rate capacity and the number of active sources;

means for selecting the second transmission rate for each of the at least one source by selecting a maximum of the fair share allocation and the respective virtual channel allocation, selecting an explicit rate for each of the at least one source by selecting the minimum of the respective second transmission rate and the available bit rate capacity, and, means for selectively adjusting the respective first transmission rate of each of the at least one source to the respective explicit transmission rate based on a minimum of the respective first transmission rate and the respective explicit transmission rate.

34. An apparatus utilizing successive averaging intervals of fixed time duration adaptable for use in a network having at least one source and at least one destination between which available bit rate data cells, constant bit rate data cells and variable bit rate data cells are transferred through a data link via a switch, the apparatus comprising:

means for counting the constant bit rate data cells and the variable bit rate data cells received at the switch;

means for determining a number of active sources at an end of each averaging interval;

means for measuring a first input rate of the constant bit rate data cells and the variable bit rate data cells at the switch based on a result of the counting during an averaging interval;

means for determining an available bit rate capacity based on selecting a maximum of 1) a product of a target utilization of the data link and an available bandwidth for the data link less the first input rate, and 2) zero;

means for determining a second input rate based on a total number of the available bit rate cells input and counted from each of the at least one source and a last averaging interval;

means for determining an overload factor based on the second input rate and the available bit rate capacity;

means for determining a fair share allocation of capacity based on the available bit rate capacity and the number of active sources in the last averaging interval;

means for resetting the constant and variable bit rate cell input counts;

means for resetting the available bit rate cell input count and a virtual channel activity;

means for marking, upon receipt of a cell on a virtual channel, the respective virtual channel as active;

means for incrementing, upon receipt of the cell, the count of the total number of cells input;

means for determining, if the received cell is a backward control cell, a virtual channel share allocation for each of the at least one source based on a respective first transmission rate and the overload factor;

means for selecting a second transmission rate for each of the at least one source by selecting a maximum of the fair share allocation and the respective virtual channel allocation;

means for selecting an explicit rate for each of the at least one source by selecting the minimum of the respective second transmission rate and the available bit rate capacity; and, means for selectively adjusting the respective first transmission rate of each of the at least one source to the respective explicit transmission rate based on a minimum of the respective first transmission rate and the respective explicit transmission rate.

35. An apparatus utilizing successive averaging intervals of fixed time duration adaptable for use in a network having at least one source and at least one destination between which data is transferred through a data link via a switch, the apparatus comprising:

means for determining a level of activity of each source based on its level of activity in a current averaging interval and a decay factor;

means for determining a number of active sources by adding the level of activity of all sources at an end of each averaging interval;

means for determining an available bit rate capacity based on a product of a target utilization of the data link and an available bandwidth for the data link;

means for measuring an input rate of the data at the switch based on a total number of available bit rate cells input and counted from each of the at least one source and a last averaging interval;

means for determining an overload factor based on the input rate and the available bit rate capacity;

means for determining a fair share allocation of capacity based on the available bit rate capacity and the number of active sources in the last averaging interval;

means for resetting the available bit rate cell input count and virtual channel activity;

means for determining upon receipt of a cell in the forward direction on a virtual channel, the number of active sources in the current averaging interval based on the level of activity on the respective virtual channel;

means for determining whether a selected virtual channel was not active in a forward direction during a last averaging interval;

means for incrementing the count of the number of active sources in the last interval by one, and subtracting from it the activity level of the virtual channel in the last averaging interval;

means for determining a fair share allocation of capacity based on the available bit rate capacity and the number of active sources in the last averaging interval;

means for updating upon receipt of the cell on the virtual channel, the activity level of the respective virtual channel;

means for incrementing upon receipt of the cell, the count of the total number of cells input;

means for determining, if the received cell is a backward control cell, a virtual channel share allocation for each of the at least one source based on a respective first transmission rate and the overload factor;

means for selecting a second transmission rate for each of the at least one source by selecting a maximum of the fair share allocation and the respective virtual channel allocation;

means for selecting an explicit rate for each of the at least one source by selecting the minimum of the respective second transmission rate and the available bit rate capacity; and, means for selectively adjusting the respective first transmission rate of each of the at least one source to the respective explicit transmission rate based on a minimum of the respective first transmission rate and the respective explicit transmission rate.

36. An apparatus utilizing successive averaging intervals of fixed time duration adaptable for use in a network having at least one source and at least one destination between which data is transferred through a data link via a switch, the apparatus comprising:

means for determining a number of active sources at an end of each averaging interval;

means for determining an available bit rate capacity based on a product of a target utilization of the data link and an available bandwidth for the data link;

means for measuring an input rate of the data at the switch based on a total number of available bit rate cells input and counted from each of the at least one source and the last averaging interval;

means for determining an overload factor based on the input rate and the available bit rate capacity if the available bit rate capacity is greater than zero;

means for determining the overload factor to be infinity if the available bit rate capacity is less than or equal to zero;

means for determining a fair share allocation of capacity based on the available bit rate capacity and the number of active sources in the last interval;

means for resetting the available bit rate cell input count and a virtual channel activity;

means for marking, upon receipt of a cell on a virtual channel, the respective virtual channel as active;

means for incrementing upon receipt of the cell, the count of the total number of cells input;

means for determining, if the received cell is a backward control cell, a virtual channel share allocation for each of the at least one source based on a respective first transmission rate and the overload factor;

means for selecting a second transmission rate for each of the at least one source by selecting a maximum of the fair share allocation and the respective virtual channel allocation;

means for selecting an explicit rate for each of the at least one source by selecting the minimum of the respective second transmission rate and the available bit rate capacity; and, means for selectively adjusting the respective first transmission rate of each of the at least one source to the respective explicit transmission rate based on a minimum of the respective first transmission rate and the respective explicit transmission rate.

* * * * *

UNITED STATES PATENT AND TRADEMARK OFFICE
CERTIFICATE OF CORRECTION

PATENT NO. : 5,805,577
DATED : September 8, 1998
INVENTOR(S) : Raj Jain et al.

It is certified that error appears in the above-identified patent and that said Letters Patent is hereby corrected as shown below:

Title Page, insert the following priority information:

--[60] U.S. Provisional Application Serial No. 60/001,259, filed July 20, 1995; and, U.S. Provisional Application Serial No. 60/001,286, filed July 20, 1995.---

Signed and Sealed this

Seventh Day of December, 1999

*Attest:*

Q. TODD DICKINSON

*Attesting Officer*     *Acting Commissioner of Patents and Trademarks*